(12) United States Patent
Iwasaki et al.

(10) Patent No.: US 12,472,198 B2
(45) Date of Patent: *Nov. 18, 2025

(54) RIG-I AGONISTS AND TREATMENTS USING SAME

(71) Applicant: YALE UNIVERSITY, New Haven, CT (US)

(72) Inventors: Akiko Iwasaki, Guilford, CT (US);
Anna Marie Pyle, Guilford, CT (US);
Xiaodong Jiang, New Haven, CT (US);
Olga Fedorova, Hamden, CT (US)

(73) Assignee: Yale University, New Haven, CT (US)

( * ) Notice: Subject to any disclaimer, the term of this patent is extended or adjusted under 35 U.S.C. 154(b) by 1098 days.

This patent is subject to a terminal disclaimer.

(21) Appl. No.: 17/251,921

(22) PCT Filed: Jun. 20, 2019

(86) PCT No.: PCT/US2019/038323
§ 371 (c)(1),
(2) Date: Dec. 14, 2020

(87) PCT Pub. No.: WO2019/246450
PCT Pub. Date: Dec. 26, 2019

(65) Prior Publication Data
US 2021/0260093 A1    Aug. 26, 2021

Related U.S. Application Data

(60) Provisional application No. 62/815,870, filed on Mar. 8, 2019, provisional application No. 62/743,369, filed on Oct. 9, 2018, provisional application No. 62/687,606, filed on Jun. 20, 2018.

(51) Int. Cl.
| *A61K 31/712* | (2006.01) |
| *A61K 31/713* | (2006.01) |
| *A61K 39/395* | (2006.01) |
| *A61K 45/06* | (2006.01) |
| *A61P 35/00* | (2006.01) |

(52) U.S. Cl.
CPC .......... *A61K 31/712* (2013.01); *A61K 31/713* (2013.01); *A61K 39/3955* (2013.01); *A61P 35/00* (2018.01); *A61K 45/06* (2013.01)

(58) Field of Classification Search
CPC ............... A61K 31/712; A61K 31/713; A61K 39/3955; A61K 2039/572; A61P 35/00
USPC ..................... 435/6.1, 91.1, 91.31, 455, 458; 514/44 A, 44 R; 536/23.1, 24.5
See application file for complete search history.

(56) References Cited

U.S. PATENT DOCUMENTS

| 10,947,543 | B2 | 3/2021 | Pyle et al. | |
| 11,382,966 | B2* | 7/2022 | Feld | A61K 31/7088 |
| 2007/0224186 | A1 | 9/2007 | Kulaksiz et al. | |
| 2007/0269448 | A1 | 11/2007 | Schramm et al. | |
| 2007/0270360 | A1 | 11/2007 | Mcswiggen et al. | |
| 2008/0293053 | A1 | 11/2008 | Keller et al. | |
| 2009/0123501 | A1 | 5/2009 | Levitt et al. | |
| 2009/0247613 | A1 | 10/2009 | Mcswiggen et al. | |
| 2011/0097390 | A1 | 4/2011 | Ambati | |
| 2011/0123520 | A1 | 5/2011 | Manoharan et al. | |
| 2011/0165123 | A1 | 7/2011 | Hartmann et al. | |
| 2011/0251258 | A1 | 10/2011 | Samarsky et al. | |
| 2012/0088815 | A1 | 4/2012 | Liang | |
| 2012/0329857 | A1 | 12/2012 | Ge et al. | |
| 2014/0024819 | A1 | 1/2014 | Ludwig et al. | |
| 2016/0040161 | A1 | 2/2016 | Packard et al. | |
| 2016/0046943 | A1 | 2/2016 | Pyle et al. | |
| 2017/0232071 | A1 | 8/2017 | Parker | |
| 2017/0333552 | A1 | 11/2017 | Dubensky et al. | |
| 2019/0184006 | A1 | 6/2019 | Chan | |
| 2019/0184600 | A1 | 6/2019 | Tall et al. | |
| 2020/0063141 | A1 | 2/2020 | Krieg et al. | |
| 2021/0054380 | A1* | 2/2021 | Pyle | A61K 45/06 |

FOREIGN PATENT DOCUMENTS

| JP | 2017524033 A | 8/2017 |
| WO | 2014159990 A1 | 10/2014 |
| WO | 2016019472 A1 | 2/2016 |
| WO | 2019136432 A1 | 7/2016 |
| WO | 2019143297 A1 | 7/2016 |
| WO | 2017/173427 A1 | 10/2017 |
| WO | 2018033254 A2 | 2/2018 |
| WO | 2019126240 A1 | 6/2019 |

OTHER PUBLICATIONS

Preventable Cancers, https://www.kucancercenter.org/outreach/prevention/preventable-cancers, publicly available May 19, 2020, printed as pp. 1/7-7/7 (Year: 2020).*
Schwingshackl et al. Dietary supplements and risk of cause-specific death, cardiovascular disease, and cancer: a systematic review and meta-analysis of primary prevention trials. Advances in Nutrition, vol. 8, pp. 27-39, Jan. 2017. (Year: 2017).*
Heidegger et al. Tumor- and host-intrinsic RIG-I signaling promote anticancer immunity by CLTA-4 blockade. Cancer Immunology Research, vol. 4, Supplement 11, abstract A005, Oct. 31, 2016, printed as pp. 1/2-2/2. (Year: 2016).*
Besch et al. Proapoptotic signaling induced by RIG-I and MDA-5 results in type I interferon-independent apoptosis in human melanoma cells. The Journal of Clinical Investigation, vol. 119, No. 8, pp. 2399-2411, 2009. (Year: 2009).*

(Continued)

*Primary Examiner* — Jane J Zara
(74) *Attorney, Agent, or Firm* — Saul Ewing LLP; Kathryn Doyle; Domingos J. Silva

(57) ABSTRACT

The present invention provides combination therapies that are useful for treating, ameliorating, and/or preventing certain cancers. In certain embodiments, the therapy comprises an immune-checkpoint inhibitor and a RIG-I agonist. In other embodiments, the therapy comprises a RIG-I agonist.

13 Claims, 28 Drawing Sheets
Specification includes a Sequence Listing.

(56) References Cited

OTHER PUBLICATIONS

Van den Boom et al. Turning tumors into vaccines: Co-opting the innate immune system. Immunity, vol. 39, pp. 37-37, Jul. 2013 . (Year: 2013).*
Neville et al. Anti-tumour effects of interleukin 1beta: In vivo induction of immunity to B16 melanoma, a non-immunogenic tumour. Cytokine, vol. 6, No. 3, pp. 310-317 May 1994. (Year: 1994).*
Hornung et al. 5'-Triphosphate RNA is the ligand for RIG-I. Science, vol. 314, pp. 994-997, Nov. 2006 (Year: 2006).*
U.S. Appl. No. 17/864,199 (Year: 2022).*
5'ppp-dsRNA, Technical Data Sheet, Invivogen (http://www.invivogen.com/PDF/5pppRNA TDS.pdf), accessed Jan. 2013.
International Search Report and Written Opinion for PCT International Application No. PCT/US2019/038323 issued Sep. 13, 2019.
Abdullah , et al., "RIG-I detects infection with live Listeria by sensing secreted bacterial nucleic acids", EMBO J. 31 (21), Nov. 2012, 4153-4164.
Ablasser , et al., "RIG-I-dependent sensing of poly(dA:dT) through the induction of an RNA polymerase III-transcribed RNA intermediate", Nat Immunol. 10(10), Oct. 2009, 1065-1072.
Bamming , et al., "Regulation of signal transduction by enzymatically inactive antiviral RNA helicase proteins MDA5, RIG-I, and LGP2", J Biol Chem. 284(15), Apr. 2009, 9700-9712.
Beckham , et al., "Conformational rearrangements of RIG-I receptor on formation of a multiprotein:dsRNA assembly", Nucleic Acids Res. 41(5), Mar. 2013, 3436-3445.
Berke , et al., "MDA5 assembles into a polar helical filament on dsRNA", Proc Natl Acad Sci U S A 109(45), Nov. 2012, 18437-18441.
Berke , et al., "MDA5 cooperatively forms dimers and ATP-sensitive filaments upon binding double-stranded RNA", EMBO J. 31(7), Apr. 2012, 1714-1726.
Binder , et al., "Molecular mechanism of signal perception and integration by the innate immune sensor retinoic acid-inducible gene-I (RIG-I)", J Biol Chem. 286(31), Aug. 2011, 27278-27287.
Chiu , et al., "RNA polymerase III detects cytosolic DNA and induces type I interferons through the RIG-I pathway", Cell 138(3), Aug. 2009, 576-591.
Civril , et al., "The RIG-I ATPase domain structure reveals insights into ATP-dependent antiviral signalling", EMBO Rep. 12(11), Oct. 2011, 1127-1134.
Deguzman , et al., "Sequence-dependent gating of an ion channel by DNA hairpin molecules", Nucleic Acids Res. 34 (22), 2006, 6425-6437.
Feng , et al., "Structural and biochemical studies of RIG-I antiviral signaling", Protein Cell 4(2), Feb. 2013, 142-154.
Gack , et al., "TRIM25 RING-finger E3 ubiquitin ligase is essential for RIG-I-mediated antiviral activity", Nature 446 (7138), Apr. 2007, 916-920.
Ge , et al., "Effects of chemical modification on the potency, serum stability, and immunostimulatory properties of short shRNAs", RNA 16(1), Jan. 2010, 118-130.
Ge , et al., "Minimal-length short hairpin RNAs: the relationship of structure and RNAi activity", RNA 16(1), Jan. 2010, 106-117.
Guo , et al., "Transfection reagent Lipofectamine triggers type I interferon signaling activation in macrophages", Immunol Cell Biol. 97(1), Jan. 2019, 92-96.
Hwang , et al., "5'-Triphosphate-RNA-independent activation of RIG-I via RNA aptamer with enhanced antiviral activity", Nucleic Acids Res. 40(6), Mar. 2012, 2724-2733.
Jiang , et al., "Structural basis of RNA recognition and activation by innate immune receptor RIG-I", Nature 479 (7373), Sep. 2011, 423-427.
Jiang , et al., "Ubiquitin-induced oligomerization of the RNA sensors RIG-I and MDA5 activates antiviral innate Immune response", Immunity 36(6), Jun. 2012, 959-973.
Kageyama , et al., "55 Amino acid linker between helicase and carboxyl terminal domains of RIG-I functions as a critical repression domain and determines inter-domain conformation", Biochem Biophys Res Commun. 415(1), Nov. 2011, 75-81.
Kato , et al., "Length-dependent recognition of double-stranded ribonucleic acids by retinoic acid-inducible gene-I and melanoma differentiation-associated gene 5", J Exp Med. 205(7), Jul. 2008, 1601-1610.
Kato , et al., "RIG-I-like receptors: cytoplasmic sensors for non-self RNA", Immunol Rev. 243(1), Sep. 2011, 91-98.
Kohlway , et al., "Defining the functional determinants for RNA surveillance by RIG-I", EMBO Rep. 14(9), Sep. 2013, 772-779.
Kolakofsky , et al., "A structure-based model of RIG-I activation", RNA 18(12), Dec. 2012, 2118-2127.
Kowalinski , et al., "Structural basis for the activation of innate immune pattern-recognition receptor RIG-I by viral RNA", Cell 147(2), Oct. 2011, 423-435.
Li , et al., "Adjuvant effects of plasmid-generated hairpin RNA molecules on DNA vaccination", Vaccine 25(39-40), Sep. 2007, 6992-7000.
Linehan , et al., "A minimal RNA ligand for potent RIG-I activation in living mice", Sci Adv. 4(2), Feb. 2018, e1701854.
Lu , et al., "Crystal structure of RIG-I C-terminal domain bound to blunt-ended double-strand RNA without 5' triphosphate", Nucleic Acids Res. 39(4), Mar. 2011, 1565-1575.
Lu , et al., "The structural basis of 5' triphosphate double-stranded RNA recognition by RIG-I C-terminal domain", Structure 18(8), Aug. 2010, 1032-1043.
Luo , et al., "Duplex RNA activated ATPases (DRAs): platforms for RNA sensing, signaling and processing", RNA Biol. 10(1), Jan. 2013, 111-120.
Luo , et al., "Structural insights into RNA recognition by RIG-I", Cell 147(2), Oct. 2011, 409-422.
Luo , et al., "Visualizing the determinants of viral RNA recognition by innate immune sensor RIG-I", Structure 20(11), Nov. 2012, 1983-1988.
Malathi , et al., "RNase L releases a small RNA from HCV RNA that refolds into a potent PAMP", RNA 16(11), Nov. 2010, 2108-2119.
Malathi , et al., "Small self-RNA generated by RNase L amplifies antiviral innate immunity", Nature 448(7155), Aug. 2007, 816-819.
Martínez-Gil , et al., "A Sendai virus-derived RNA agonist of RIG-I as a virus vaccine adjuvant", J Virol. 87(3), Feb. 2013, 1290-1300.
Mullard , "Can innate immune system targets turn up the heat on 'cold' tumours?", Nat Rev Drug Discov. 17(1), Dec. 2018, 3-5.
Peisley , et al., "Cooperative assembly and dynamic disassembly of MDA5 filaments for viral dsRNA recognition", Proc Natl Acad Sci U S A. 108(52), Dec. 2011, 21010-21015.
Poeck , et al., "5'-Triphosphate-siRNA: turning gene silencing and RIG-I activation against melanoma", Nat Med. 14(11), Nov. 2008, 1256-1263.
Pyle , "Translocation and unwinding mechanisms of RNA and DNA helicases", Annu Rev Biophys. 37, 2008, 317-336.
Ramos , et al., "RIG-I like receptors and their signaling crosstalk in the regulation of antiviral immunity", Curr Opin Virol. 1(3), Sep. 2011, 167-176.
Saito , et al., "Regulation of innate antiviral defenses through a shared repressor domain in RIG-I and LGP2", Proc Natl Acad Sci U S A. 104(2), Jan. 2007, 582-587.
Satoh , et al., "LGP2 is a positive regulator of RIG-I- and MDA5-mediated antiviral responses", Proc Natl Acad Sci U S A. 107(4), Jan. 2010, 1512-1517.
Schlee , et al., "Recognition of 5' triphosphate by RIG-I helicase requires short blunt double-stranded RNA as contained in panhandle of negative-strand virus", Immunity 31(1), Jul. 2009, 25-34.
Schlee , et al., "The chase for the RIG-I ligand—recent advances", Mol Ther. 18(7), Jul. 2010, 1254-1262.
Schmidt , et al., "5'-triphosphate RNA requires base-paired structures to activate antiviral signaling via RIG-I", Proc Natl Acad Sci U S A 106(29), Jul. 2009, 12067-12072.
Vela , et al., "The thermodynamic basis for viral RNA detection by the RIG-I innate immune sensor", J Biol Chem. 287(51), Dec. 2012, 42564-42573.

(56) References Cited

OTHER PUBLICATIONS

Wang, et al., "Structural and functional insights into 5'-ppp RNA pattern recognition by the innate immune receptor RIG-I", Nat Struct Mol Biol. 17(7), Jul. 2010, 781-787.
Heidegger et al. "The RIG-I Agonist 3pRNA Synergizes with Checkpoint Blockade in Cancer Immunotherapy", 2015, Blood vol. 126, No. 23, pp. 3436.
Barnard et al., "36. Effects of the Addition of Hiltonol (Poly-ICLC) to a SARS- CoV S Protein Vaccine in Lethal SARS-CoV Mouse Model", Abstracts/Antiviral Research, 2011, 90, doi:10.1016/j.antiviral.2011.03.022.
New development of gastric immunity, The Japanese Society for Immunology, NewsLetter, 2006, vol. 8, No. 1, 4 pages.
Rodriguez-Ruiz et al., "Combined immunotherapy encompasing intratumoral poly/cell vaccination and radiotherapy in advanced cancer patients", Annals of Oncology, 2018: vol. 29, No. 5, pp. 1312-1319, https://doi.org/10.1093/annonc/mdy089.
Extended European Search Report for European Application No. 19822447.9, issued on Feb. 17, 2022.
Li, et al. "Promising targets for cancer immunotherapy: TLRs, RLRs, and STING-mediated innate immune pathways." International journal of molecular sciences 18.2 (2017): 404.
Elion, et al. "Harnessing RIG-I and intrinsic immunity in the tumor microenvironment for therapeutic cancer treatment." Oncotarget 9.48 (2018): 29007.
European Patent Office Communication pursuant to Article 94(3) EPC issued in App. No. EP19822447, dated Mar. 13, 2023, 8 pages.
Medler Terry R., et al., "Defining Immunogenic and Radioimmunogenic Tumors", Frontiers in Oncology, vol. 11, Mar. 19, 2021, XP093029333.
Office Action, U.S. Appl. No. 17/864,199, Jan. 16, 2025.

\* cited by examiner

SLR14

SLR10

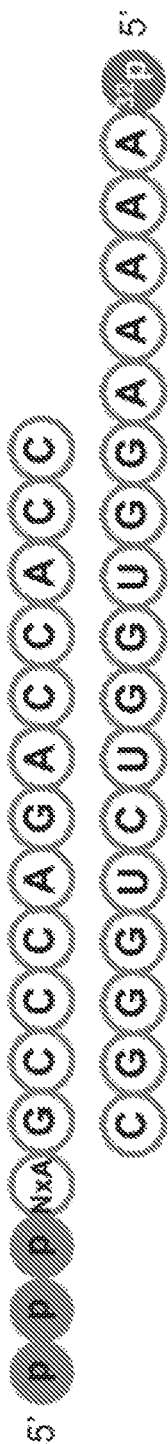
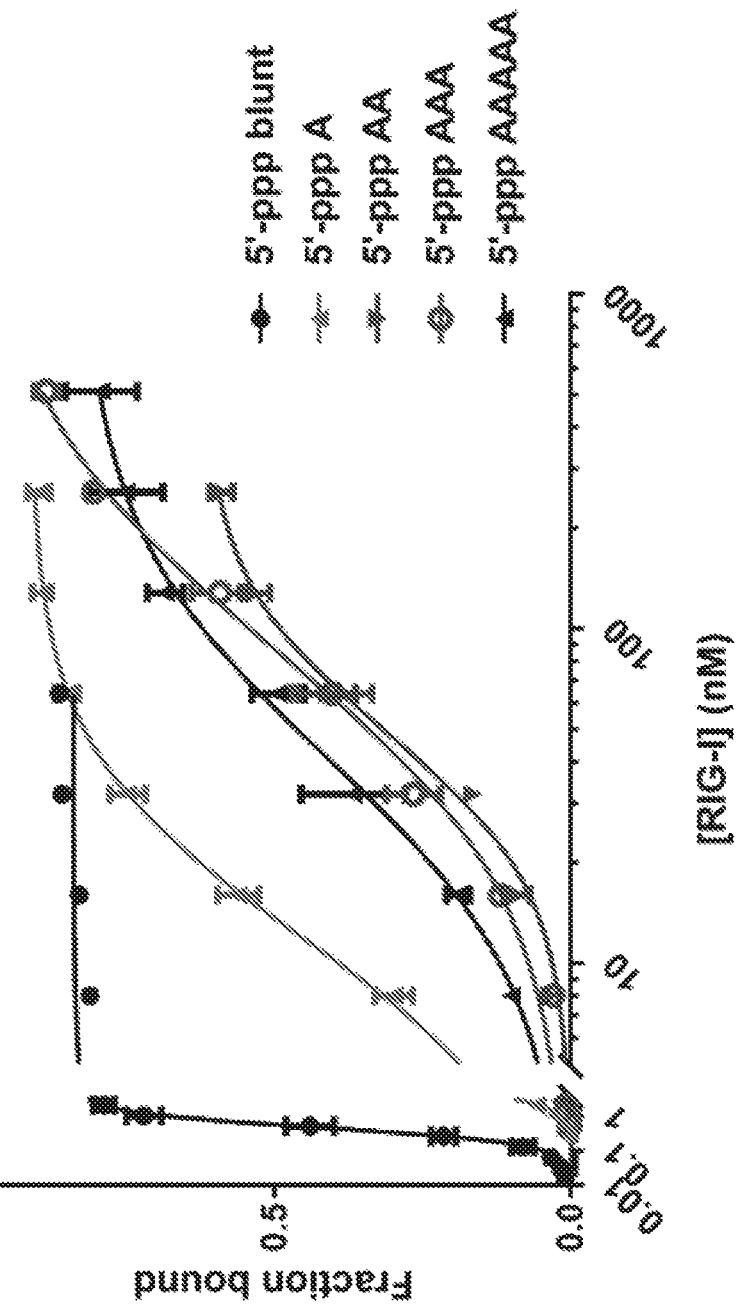
FIG. 14A
FIG. 14B

Days after tumor cell inoculation

RIG-I AGONISTS AND TREATMENTS USING SAME

CROSS-REFERENCE TO RELATED APPLICATIONS

The present application is a 35 U.S.C. § 371 national phase application from, and claims priority to, International Application No. PCT/US2019/038323, filed Jun. 20, 2019, and published under PCT Article 21 (2) in English, which claims priority under 35 U.S.C. § 119 (e) to U.S. Provisional Patent Application No. 62/687,606, filed Jun. 20, 2018, U.S. Provisional Patent Application No. 62/743,369, filed Oct. 9, 2018, and U.S. Provisional Patent Application No. 62/815,870, filed Mar. 8, 2019, all of which are incorporated herein by reference in their entireties.

BACKGROUND OF THE INVENTION

Retinoic acid-inducible gene 1 (RIG-I), melanoma differentiation-associated gene 5 (MDA5), and laboratory of genetics and physiology 2 (LGP2) comprise the RIG-I like receptor (RLR) class of intracellular pattern recognition receptors (PRRs). The receptors defend against bacterial and viral infection by recognizing foreign RNAs in the cytoplasm and eliciting an innate immune response through the production of pro-inflammatory cytokines and type I interferon.

RIG-I recognizes both self and non-self RNA, including positive and negative stranded RNA viruses, RNA fragments produced by RNA Polymerase III either from DNA viruses like the Epstein-Barr virus or AT-rich double stranded DNA templates, RNA cleavage products of the antiviral endoribonuclease RNAse L, synthetic poly I:C, and even RNA aptamers lacking a 5'-triphosphate. RIG-I's distinct pathogen associated molecular pattern (PAMP) is defined as duplex RNA containing a 5'-triphosphate moiety, although only duplex RNA appears to be absolutely required for RIG-I recognition.

There still remains a need in the art for compositions and methods for treating, ameliorating, or preventing cancer. In certain embodiments, these compositions should be able to activate immunity against the cancer in the afflicted subject. The present invention satisfies this need in the art.

BRIEF SUMMARY OF THE INVENTION

The invention provides in one aspect a method of treating or preventing a cancer in a subject. In certain embodiments, the method comprises administering to the subject a therapeutically effective amount of a RIG-I agonist. In other embodiments, the subject is further administered a therapeutically effective amount of an immune-checkpoint inhibitor, such as PD-1, PD-L1 or CTLA-4 blocking agents or antibodies. The invention provides in another aspect a pharmaceutical composition comprising an immune-checkpoint inhibitor and a RIG-I agonist.

BRIEF DESCRIPTION OF THE DRAWINGS

The following detailed description of selected embodiments of the invention will be better understood when read in conjunction with the appended drawings. For the purpose of illustrating the invention, non-limiting embodiments are shown in the drawings. It should be understood, however, that the invention is not limited to the precise arrangements and instrumentalities of the embodiments shown in the drawings.

FIG. 13A: Fitting curves for electrophoretic mobility shift assays (EMSA's) of FL RIG-I with RNAs of 5'-ppp/OH blunt end and 3'-overhangs on the bottom strand. Featured: SEQ ID NOs: 15-16. FIG. 13B: IFN-β induction assays with SLR-10 and its variants bearing 3'-overhang on the bottom strands. In the RNA sequences shown in both panels, N=0, 1, 2, 3 or 5. Featured: SEQ ID NO:17.

FIGS. 14A-14D are a set of graphs and schemes illustrating the effect of 5'-overhang on the top strand on binding and signaling of RIG-I. FIG. 14A: Illustration of the RNA duplexes with 5'-overhang that were used in EMSA assays. N=0, 1, 2, 3 and 5. Featured: SEQ ID NOs: 15-16. FIG. 14B: Fitting curves for EMSA assays of FL RIG-I with RNAs of 5'-ppp blunt end and 5'-overhangs on the top strand. FIG. 14C: Fitting curves for EMSA assays of RIG-I-ΔCARDs with RNAs of 5'-ppp blunt end and 5'-overhangs on the top strand. FIG. 14D: IFN-β induction assays with SLR-10 and its variants bearing 5'-overhang on the top strands. OH-SLR-10 is the hairpin RNA without 5'-ppp group. Featured: SEQ ID NO: 17.

FIG. 15A: $1 \times 10^6$ YUMMER1.7 cells in 100 μl PBS were injected subcutaneously (s.c.) into the right flank of C57BL/6J mice. At 5 days post injection (d.p.i.), mice with similar tumor volume were randomly divided into 4 groups (10 mice per group). The $1^{st}$ group of mice was injected intratumorally (i.t.) with 50 µl 5% glucose containing 25 µg SLR14 and 4 µl DNA transfection reagent JETPEI®. The $2^{nd}$ group of mice was treated i.t. with 50 µl 5% glucose containing 4 µl JETPEI®. The $3^{rd}$ group of mice was treated i.t. with 50 µl PBS containing 25 µg CpG1826. The $4^{th}$ group of mice was treated i.t. with 50 µl 5% glucose (no treatment). The treatments were performed every 3 days for a total of 5 doses. Tumor growth was monitored every 2 days. FIG. 15B: Tumor growth curves (error bars=SEM) for each group of mice. FIG. 15C: Tumor growth curves of individual mice in each group. FIG. 15D: The survival curve of YUMMER1.7-bearing mice after treatment. *: p<0.05.

FIG. 16A: $5 \times 10^5$ YUMMER1.7 cells in 100 µl PBS were injected s.c. into the right flank of C57BL/6J mice. At 5 d.p.i., the mice with similar tumor volume were randomly divided into 5 groups (5 mice per group). The $1^{st}$ group of mice was injected i.t. with 50 µl 5% glucose containing 25 µg SLR14 and 4 µl JETPEI®. The $2^{nd}$ group of mice was treated i.t. with 50 µl 5% glucose containing 4 µl. The $3^{rd}$ group of mice was treated intraperitoneally (i.p.) with 100 µl PBS containing 200 µg anti-PD1 antibodies. The $4^{th}$ group of mice was treated with SLR14 and anti-PD1 as described elsewhere herein. The $5^{th}$ group of mice was treated 50 µl 5% glucose (no treatment). The treatments were performed every 3 days for a total of 5 doses. Tumor growth was monitored every 2 days. FIG. 16B: Tumor growth curves (error bars=SEM) for each group of mice. FIG. 16C: Tumor growth curves of individual mice in each group. **: p<0.01.

FIG. 17A: $5 \times 10^5$ YUMMER1.7 cells in 100 µl PBS were injected s.c. into the right flank of C57BL/6J mice. At 12 d.p.i., the mice were treated i.t. with 50 µl 5% glucose containing 25 µg fluorescence dye ALEXA FLUOR™-conjugated SLR14 and 4 µl JETPEI®. 1 day later (day 13), the mice were euthanized and tumors were collected for cell analysis by flow cytometry. FIGS. 17B and 17D: Analysis for SLR14 existence by flow cytometry. ALEXA FLUOR™ 647 positive non-lymphocytes were further analyzed with some myeloid cell markers. FIGS. 17C and 17E: Quantitation of SLR14 and myeloid cell markers in tumor cells and draining lymph node (dLN). Dead cells were excluded using 7-AAD staining. AF647: ALEXA FLUOR™ 647. At least 3 mice were tested. Results are representative of two independent experiments. i.t.: intratumorally.

FIGS. 18A-18B: The percentages (top) and quantities (bottom) of tumor-infiltrating CD45+, B220+, NK1.1+, CD8+, CD4+, FoxP3+CD4+, CD11b+, or Ly6G+CD11b+ cells in each group. All T cells are CD44+. The cell numbers were normalized based on the tumor weight. FIG. 18B: The ratio of tumor-infiltrating CD8+ T cells/CD4+ T cells or CD8+ T cells/CD4+FoxP3+ regulatory T (Treg) cells in each group. FIG. 18C: CD8+/CD4+ ratios and CD8+/CD4+ Treg ratios. FIG. 18D: Tumor growth curves of YUMMER1.7-bearing RAG1−/− mice. $5 \times 10^5$ YUMMER1.7 cells were injected into RAG1$^{-/-}$ mice. At 7 d.p.i., the mice with similar tumor volume were treated with SLR14 or vehicle as described in FIG. 15A. Left: average tumor volume for each group of mice (error bars=SEM). Right: tumor growth curves of individual mice in each group. *: p<0.05. **: p<0.01.

FIG. 19A: $1 \times 10^6$ B16F10 cells in 100 µl PBS were injected s.c. into the right flank of C57BL/6J mice. At 7 d.p.i., the mice with similar tumor volume were randomly divided into 3 groups (5 mice per group). The $1^{st}$ group of mice was injected i.t. with 50 µl 5% glucose containing 25 µg SLR14 and 4 µl JETPEI®. The $2^{nd}$ group of mice was treated i.t. with 50 µl 5% glucose containing 4 µl JETPEI®. The $3^{rd}$ group of mice was treated i.t. with 50 µl 5% glucose (no treatment). The treatments were performed every 2 days for a total of 5 doses. Tumor growth was monitored every 2 days. FIG. 19B: Tumor growth curves (error bars=SEM) for each group of mice. FIG. 19C: Tumor growth curves of individual mice in each group. FIG. 19D: The subcutaneous B16F10 at day 27 post tumor cell injection. FIG. 19E: Survival curve of B16F10-bearing mice after treatment. *: p<0.05. **: p<0.01.

FIG. 20A: $5 \times 10^5$ B16F10 cells in 100 µl PBS were injected s.c. into RAG1−/−mice. At 7 d.p.i., the mice with similar tumor volume were randomly divided into 2 groups (5 mice per group) and were treated i.t. with SLR14 or vehicle, respectively. The treatment protocol was exactly same as described in FIG. 15A.

FIG. 20B: Tumor growth curves (error bars=SEM) for two groups of mice.

FIG. 21A: $5 \times 10^5$ B16F10 cells were injected s.c. into both flank sides of C57BL/6J mice. At 7 d.p.i., only one side of tumor was treated i.t. with SLR14. The treatment protocol was the same as described in FIG. 15A. Tumor growth of both flank sides was monitored every 2 days. FIG. 21B: Tumor growth curves (error bars=SEM) for each group of mice at both treated and untreated (distant) flank sides. *: p<0.05. **: p<0.01.

FIG. 22A: Tumor growth curves (error bars=SEM) for each group of mice. Red arrow means i.t. treatment. FIG. 22B: Survival curve of MC38-bearing mice after treatment. **: p<0.01.

DETAILED DESCRIPTION OF THE INVENTION

Figure 1:
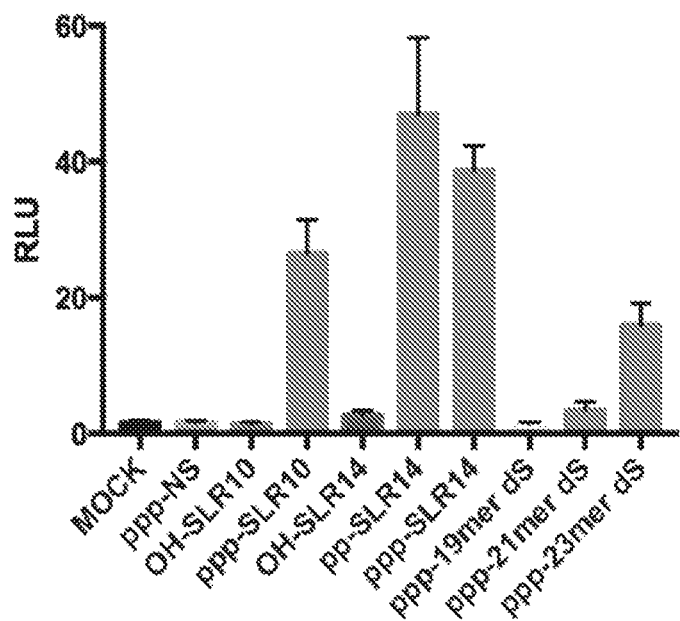
FIG. 1 comprises a bar graph illustrating interferon induction in a luciferase reporter system in human cell lines (293T shown); SLR14, SEQ ID NO:1, and SLR10, SEQ ID NO:5.
Figure 1:
Figure 1:

The present invention provides for compositions and methods for activating immunity to fight cancer. In one aspect, the present invention provides certain RIG-I agonists, such as but not limited to Stem Loop RNAs (SLRs), as immunotherapies.

Innate immune agonists constitute a powerful antitumor strategy. Activating innate immune receptors "warms up" tumor cells (i.e., increases tumor infiltration by immune system's cells), triggering the natural process of T-cell recruitment and galvanizing the adaptive immune system to recognize and destroy the tumor. In certain embodiments, innate immune agonists complement checkpoint inhibitors. Innate immune agonists enhance potency of checkpoint blockers, and are particularly useful for waking up "cold tumors" that are unresponsive to checkpoint therapy. Innate immune agonists activate the entire immune system. Thus, every checkpoint blocker can be used with an accompanying innate stimulator, such as the RIG-I agonists of the invention.

Activating the innate immune system within tumors is a promising approach in immunotherapy, because it can be used against a broad spectrum of tumor subtypes and it ensures that cells throughout the tumor microenvironment become sensitized, resulting in attack and destruction by T cells. RIG-I is a ubiquitous and sensitive trigger of innate immune response in tumors, so agonists of this receptor are promising immunotherapy agents.

In principle, agonists of STING (such as cyclic dinucleotide analogues; Merck MK-1454 or Aduro/Novartis Adu-S100), TLR9 (such as CpG DNA polymers, or CpGs; Checkmate CMP-001 or Idera IMO-2125), and RIG-I (such as triphosphorylated double-stranded RNA (dsRNA); Merck/Rigontec RGT100) can be used as innate immune agonists. STING and TLR9 agonists have certain liabilities, such as being applicable in limited set of tumor subtypes, with rapid mutation suggesting potential resistance issues. Further, STING agonists elicit a comparatively weak immune response, and are now implicated in the induction of metastasis. dsRNAs are long, two-stranded molecules that are less potent than SLRs. The reduced stability and disproportionation of dsRNAs can activate other innate immune receptors, resulting in inflammatory effects. Further, a two-stranded molecule has its own manufacturing liabilities.

On the other hand, RIG-I is broadly distributed and expressed in most tumors. RIG-I resistance is unlikely, given the paucity of patient mutations in this gene. SLRs do not induce high TNF levels or other broadly inflammatory ISGs and cytokines. SLRs are well-defined, synthetic compounds that can be easily synthesized on large scale. SLRs are smaller and more stable than dsRNA or viral agonists.

Cytosolic nucleic acid-sensing pathways such as cGAS-STING and RIG-I-MAVS can be triggered to enhance immune response to cancer. As demonstrated herein, a unique, RIG-I specific agonist, Stem Loop RNA 14 (SLR14), was tested for its in vivo antitumor activity. When tumor volume reached 40-80 mm$^3$, SLR14 was delivered intratumorally (i.t.), every 2-3 days, for a total of 4-6 doses. SLR14 was tested in immunogenic YUMMER1.7 melanoma and MC38 colon cancer models, and a significant delay in tumor growth and an extended survival was observed in SLR14-treated mice. Combination treatment with SLR14 and anti-PD1 antibody in these mice greatly improved antitumor efficacy over single treatment. SLR14 was mainly taken up by tumor-associated CD11b+ myeloid cells including neutrophils, dendritic cells, and monocyte/macrophages, suggesting that antitumor efficacy of SLR14 in these tumors is mainly initiated through RIG-I activation in innate immune cells within the tumor microenvironment. Furthermore, a significant increase of tumor-infiltrating CD8+ T lymphocytes, NK1.1+ cells, and CD11b+ myeloid cells was detected in SLR14-treated mice, with a 5- to 6-fold increase in CD8+/CD4+Treg ratio. SLR14 was evaluated in poorly immunogenic B16F10 tumor. SLR14 i.t. administration alone dramatically inhibited B16F10 tumor growth, and SLR14-treated mice displayed a long-term survival. Further analysis using in vivo T cell depletion and RAG1$^{-/-}$ mice revealed that antitumor effects of SLR14 in B16F10 relies on both T and non-T cells. Bilateral B16F10 melanoma injections were used and an abscopal effect of SLR14 was observed on untreated distant tumors. Taken together, the results demonstrate that SLR14 is a promising therapeutic RIG-I agonist for a broad spectrum of tumor types, either used alone or in combination with existing immunotherapies.

DISCLOSURE

In certain embodiments, the RIG-I agonists of the invention unmask tumors so they are attacked by killer T-cells. In other embodiments, the RIG-I agonists of the invention warm up "cold" tumors (i.e., tumors that are poorly infiltrated by the immune system's army of cells) so checkpoint blockers are more effective. In yet other embodiments, the RIG-I agonists of the invention vaccinate tumor-bearing organisms against metastases.

In certain embodiments, the RIG-I agonists of the invention selectively activate the RIG-I innate immune sensor. In other embodiments, the RIG-I agonist of the invention is a Stem Loop RNA. The disclosures of International Patent Application Publication No. WO/2014/159990 and U.S. Patent Application Publication No. US 2016/0046942 are incorporated herein in their entireties by reference.

The compositions and methods described herein can activate any PRR including, but not limited to, the RIG-I like receptor (RLR) class of PRRs, which include RIG-I, MDA5, and LGP2; NOD-like receptors (NLRs), C-type lectin receptors (CLRs), and toll-like receptors (TLRs).

In certain embodiments, the invention provides a nucleic acid molecule. Exemplary nucleic acids for use in this disclosure include ribonucleic acids (RNA), deoxyribonucleic acids (DNAs), peptide nucleic acids (PNAs), threose nucleic acids (TNAs), glycol nucleic acids (GNAs), locked nucleic acids (LNAs), or a hybrid thereof. As described herein, the nucleic acid molecule of the invention is not dependent on a particular nucleotide sequence. Rather, any nucleotide sequence may be used, provided that the sequence has the ability to form the structure of a nucleic acid molecule described herein.

In certain embodiments, the nucleic acid molecule of the invention comprises a double stranded region.

In certain embodiments, the nucleic acid molecule is a double stranded duplex. In other embodiments, the nucleic acid molecule comprises a double stranded duplex. In yet other embodiments, the nucleic acid molecule consists essentially of a double stranded duplex. In yet other embodiments, the nucleic acid molecule consists of a double stranded duplex. In yet other embodiments, the molecule comprising the double stranded duplex comprises one blunt end. In yet other embodiments, the molecule comprising the double stranded duplex comprises two blunt ends. In yet other embodiments, the molecule comprising the double stranded duplex comprises one 3'-overhang. In yet other embodiments, the molecule comprising the double stranded duplex comprises two 3'-overhangs. In yet other embodiments, the molecule comprising the double stranded duplex comprises one 5'-overhang. In yet other embodiments, the molecule comprising the double stranded duplex comprises two 5'-overhangs. In yet other embodiments, the molecule comprising the double stranded duplex comprises one 5'-overhang and one 3'-overhang.

In certain embodiments, the nucleic acid molecule of the invention is a single chain molecule wherein a first region of the molecule hybridizes with a second region of the molecule to form a double stranded section, which is connected through a loop. In yet other embodiments, the hairpin structure of the nucleic acid molecule improves the stability of the double stranded section. In yet other embodiments, the hairpin loop comprises non-deoxynucleotides, such as but not limited to mono-, di-, or poly-ethylene glycol or other non-deoxynucleotide linkers. In yet other embodiments, the nucleic acid molecule comprises a blunt end. In yet other embodiments, the nucleic acid molecule comprises two blunt ends.

In certain embodiments, the nucleic acid molecule has at least one 3'-overhang. In other embodiments, the 3'-overhang comprises a non-base pairing nucleotide. In yet other embodiments, the 3'-overhang comprises two non-base pairing nucleotides. In yet other embodiments, the 3'-overhang comprises three non-base pairing nucleotides. In yet other embodiments, the 3'-overhang comprises four non-base pairing nucleotides. In yet other embodiments, the 3'-overhang comprises five non-base pairing nucleotides. In yet other embodiments, the 3'-overhang comprises six non-base pairing nucleotides. In yet other embodiments, the 3'-overhang comprises seven non-base pairing nucleotides. In yet other embodiments, the 3'-overhang comprises eight non-base pairing nucleotides. In yet other embodiments, the 3'-overhang comprises nine non-base pairing nucleotides. In yet other embodiments, the 3'-overhang comprises ten non-base pairing nucleotides. In yet other embodiments, the 3'-overhang comprises more than ten non-base pairing nucleotides.

In certain embodiments, the nucleic acid molecule has at least one 5'-overhang. In other embodiments, the intramolecular structure produces a 5'-overhang. In yet other embodiments, the 5'-overhang comprises a non-base pairing nucleotide. In yet other embodiments, the 5'-overhang comprises two non-base pairing nucleotides. In yet other embodiments, the 5'-overhang comprises three non-base pairing nucleotides. In yet other embodiments, the 5'-overhang comprises four non-base pairing nucleotides. In yet other embodiments, the 5'-overhang comprises five non-base pairing nucleotides. In yet other embodiments, the 5'-overhang comprises six non-base pairing nucleotides. In yet other embodiments, the 5'-overhang comprises seven non-base pairing nucleotides. In yet other embodiments, the 5'-overhang comprises eight non-base pairing nucleotides. In yet other embodiments, the 5'-overhang comprises nine non-base pairing nucleotides. In yet other embodiments, the 5'-overhang comprises ten non-base pairing nucleotides. In yet other embodiments, the 5'-overhang comprises more than ten non-base pairing nucleotides.

In other embodiments, the nucleic acid molecule comprises a 5'-triphosphate or a 5'-diphosphate group. In yet other embodiments, the presence of one or more 5'-triphosphate or 5'-diphosphate groups improves the binding affinity of the nucleic acid molecule to RIG-I.

In certain embodiments, nuclease resistance of SLRs can be enhanced with backbone modifications (e.g., phosphorothioates and/or 2'-deoxy-2'-fluoro nucleotides and/or 2'-modified nucleotides as described elsewhere herein and/or known in the art) and 5'-terminal modifications and/or 3'-terminal modifications. In other embodiments, SLRs can be labelled with tracers, such as fluorophores, isotopes, and the like, which are readily incorporated in the terminal loop by solid-phase synthesis.

In certain embodiments, SLRs can be delivered in vivo using delivery vehicles that improve their stability and/or targeting. In other embodiments, SLRs are delivered intratumorally. In yet other embodiments, SLRs are delivered systemically.

The SLRs of the invention strongly activate RIG-I and stimulate robust IFN response in cell. In a non-limiting example, FIG. 1 illustrates interferon induction in a luciferase reporter system in human cell lines (293T shown).

Figure 2:
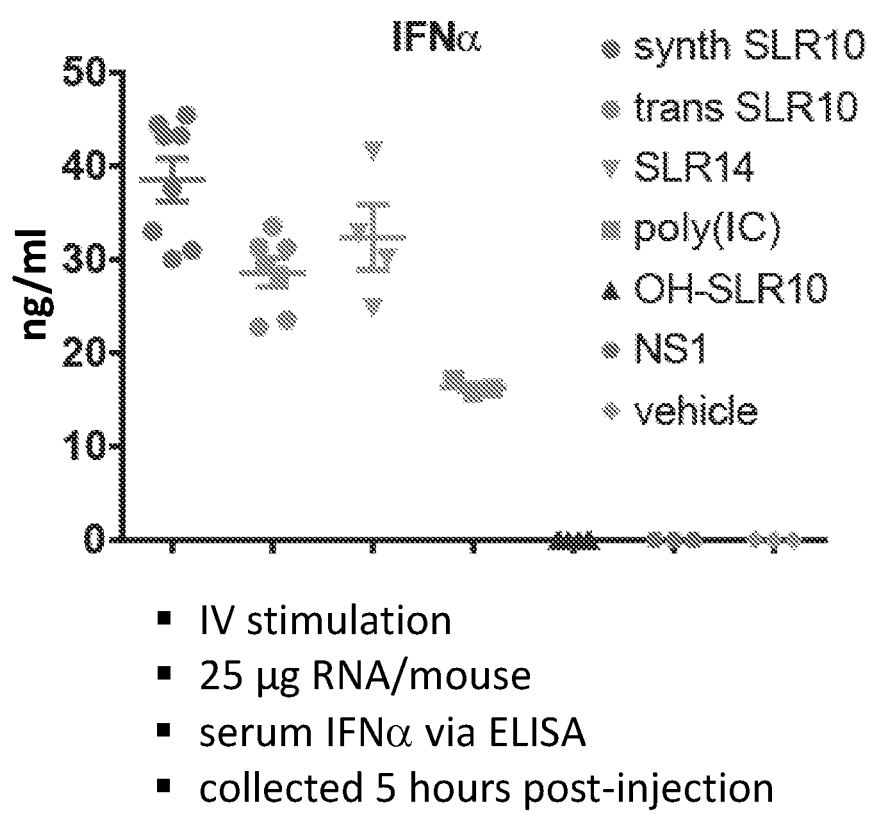
FIG. 2 comprises a graph illustrating that certain synthetic SLRs induce a massive IFN response in whole animals, with concomitant induction of RIG-I specific cytokines. X-axis represents different groups of mice treated with various RNA agonists as indicated in the legend.

Further, synthetic SLRs induce a massive IFN response in whole animals, with concomitant induction of RIG-I specific cytokines (see FIG. 2). Knockout and knockdown experiments indicate RIG-I specificity. Importantly, SLRs do not induce a broad inflammatory effects or toxicity, indicating low TNF activation.

Figure 3:
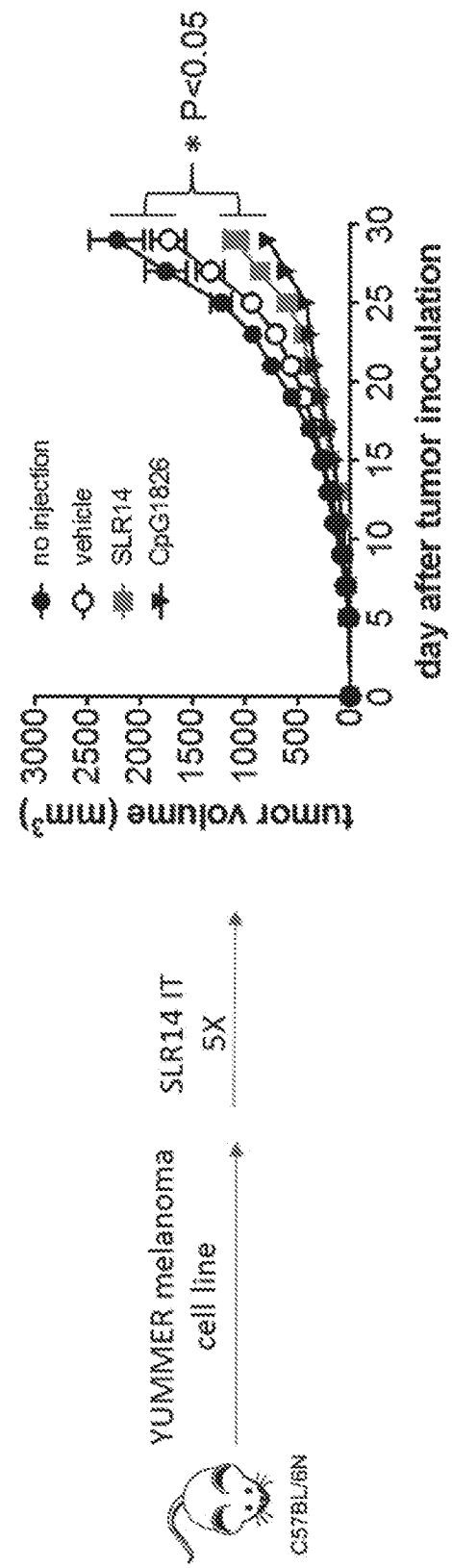
FIG. 3 illustrate in vivo studies using the YUMMER melanoma cell line, showing that SLR14 has potent antitumor effects as a single agent.
Figure 4:
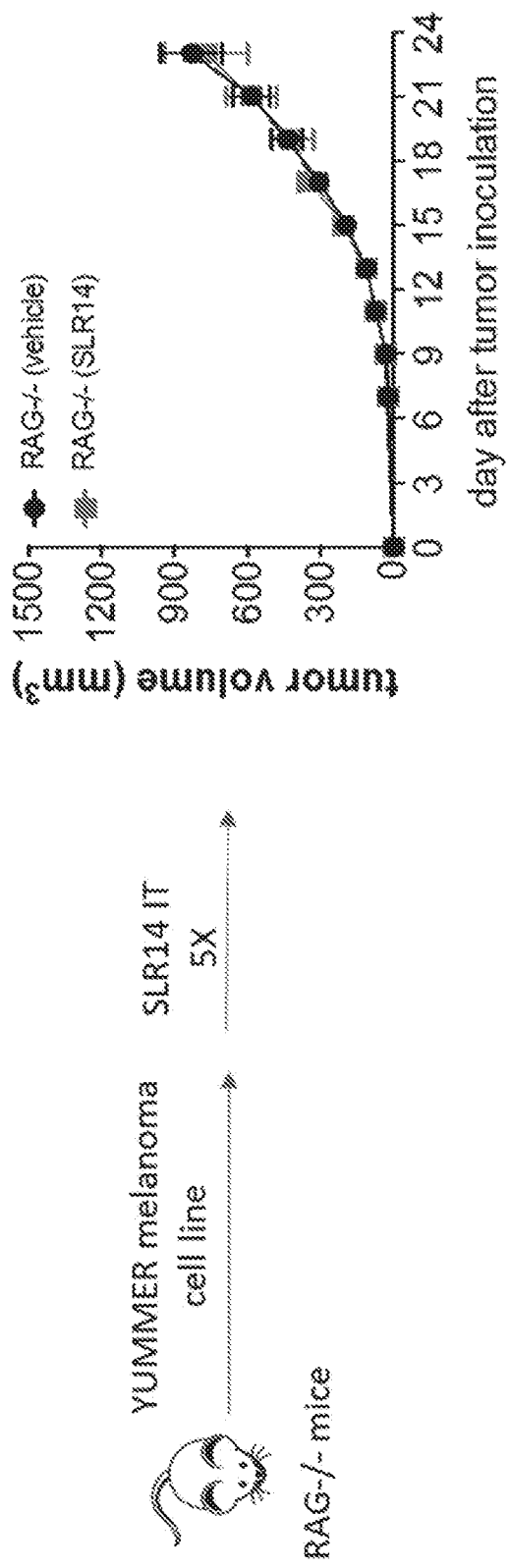
FIG. 4 illustrates in vivo studies using the YUMMER melanoma cell line, showing that the anti-tumor effect of SLR14 requires T and B cells. RAG knockout mice have no T cells or B cells, and those mice are not protected from YUMMER following SLR14 injection.

In vivo studies showed that SLR14 (SEQ ID NO:1) has potent antitumor effects as a single agent (see FIG. 3). Further, the anti-tumor effect of SLR14 requires T and B cells (see FIG. 4).

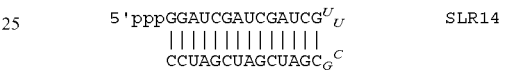

In certain embodiments, the invention provides compositions and methods for the treatment of a cancer, including, but not limited to, hematological malignancies including various leukemias and lymphomas, carcinomas, blastomas, melanomas, and sarcomas.

As used herein, immunotherapy refers to any therapy that leads to an increase in an immune response against certain cancers in a patient. In certain embodiments, the immunotherapy interferes with, or blocks, an existing negative signal or inhibitory signal that is acting to prevent or diminish the magnitude of an immune response. By way of one non-limiting example, programmed cell death protein 1 (PD1; also known as CD279) has at least two known ligands, programmed cell death 1 ligand 1 (PD-L1; also known as CD274 and B7-H1) and programmed cell death 1 ligand 2 (PD-L2; also known as CD273 and B7-DC). The interaction between PD1, expressed on immune effector cells, and one or more of its ligands results in decreased immune activity of the immune effector cells. Thus, in certain embodiments, the immunotherapy relates to the therapeutic intervention of signaling through PD1, by interfering with the interaction of PD1 with at least one of its ligands, and/or by inhibiting at least one of PD1, PD-L1, PD-L2, and combinations thereof. Thus, the therapeutic intervention of signaling through PD1 serves to enhance T-cell mediated immune responses, such as those directed against cancer. Such a therapeutic intervention is referred to at times in the literature as a PD1 blockade.

In certain embodiments, the therapeutic intervention of signaling through PD1 includes a small molecule drug, a polypeptide, or an antibody or fragment thereof (such as but not limited to those recited in Brahmer et al., 2012, N. Engl. J. Med., 366 (26): 2455-65; Topalian et al., 2012, N. Engl. J. Med., 366 (26): 2443-54) that interferes with the interaction of PD1 with at least one of its ligands, and/or inhibits at least one of PD1, PD-L1, and PD-L2.

Examples of compositions useful in the therapeutic intervention of signaling through PD1, through the interference or inhibition of at least one of PD1, PD-L1 and PD-L2, include, but are not limited to AMP224 or GSK2661380

(Medimmune/GSK); atezolizumab (MPDL3280A, RO5541267; Genentech/Roche); avelumab (Merck KGaA); BMS936559 (or MDX1105; Bristol-Myers Squibb); durvalumab (MEDI4736; Medimmune/AstraZeneca); nivolumab (ONO-4538, BMS-936558, MDX1106; Bristol-Myers Squibb); pembrolizumab (MK3475; Merck); pidilizumab (CT011; CureTech Ltd.); and RG7446 (F. Hoffmann-La Roche Ltd.).

Examples of compositions useful in the therapeutic intervention of signaling through CTLA4, include, but are not limited to ipilimumab (BMS-734016, MDX-010, MDX-101; Bristol-Myers Squibb) and tremelimumab (ticilimumab, CP-675,206; MedImmune LLC).

Other examples of compositions useful in immunotherapy include, but are not limited to, lirilumab (BMS986015, IPH2102; Bristol-Myers Squibb); IMP321 (Prima Biomed); and enoblituzumab (MGA271; MacroGenics).

The skilled artisan will understand that the invention is not limited to the exemplary immunotherapies discussed herein. Further, the skilled artisan will understand that one or more immunotherapies can be administered alone or in any combination. Still further, the skilled artisan will understand that one or more immunotherapy can be administered in combination with any other type of therapy, including chemotherapy.

Definitions

As used herein, each of the following terms has the meaning associated with it in this section. Unless defined otherwise, all technical and scientific terms used herein generally have the same meaning as commonly understood by one of ordinary skill in the art to which this invention belongs. Generally, the nomenclature used herein and the laboratory procedures in animal pharmacology, pharmaceutical science, separation science, and organic chemistry are those well-known and commonly employed in the art. It should be understood that the order of steps or order for performing certain actions is immaterial, so long as the present teachings remain operable. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the application, where an element or component is said to be included in and/or selected from a list of recited elements or components, it should be understood that the element or component can be any one of the recited elements or components and can be selected from a group consisting of two or more of the recited elements or components.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B."

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

As used herein, the phrase "abscopal effect" refers to the phenomenon wherein, in a subject afflicted with more than one tumor, shrinkage of untreated tumors occurs concurrently with shrinkage of tumors within the scope of the localized treatment. The term "abscopal effect" encompasses all types of localized treatments such as radiation therapy, electroporation and intratumoral injection of therapeutics. In certain embodiments, the phrase does not apply to systemic application of anticancer therapies.

The term "cancer" as used herein is defined as disease characterized by the rapid and uncontrolled growth of aberrant cells. Cancer cells can spread locally or through the bloodstream and lymphatic system to other parts of the body. Examples of various cancers include but are not limited to, breast cancer, prostate cancer, ovarian cancer, cervical cancer, skin cancer, pancreatic cancer, colorectal cancer, renal cancer, liver cancer, brain cancer, lymphoma, leukemia, lung cancer and the like.

"Complementary" refers to the broad concept of sequence complementarity between regions of two nucleic acid strands or between two regions of the same nucleic acid strand. It is known that an adenine residue of a first nucleic acid region is capable of forming specific hydrogen bonds ("base pairing") with a residue of a second nucleic acid region which is antiparallel to the first region if the residue is thymine or uracil. Similarly, it is known that a cytosine residue of a first nucleic acid strand is capable of base pairing with a residue of a second nucleic acid strand which is antiparallel to the first strand if the residue is guanine. A first region of a nucleic acid is complementary to a second region of the same or a different nucleic acid if, when the two regions are arranged in an antiparallel fashion, at least one nucleotide residue of the first region is capable of base pairing with a residue of the second region. In certain embodiments, the first region comprises a first portion and the second region comprises a second portion, whereby, when the first and second portions are arranged in an antiparallel fashion, at least about 50%, and preferably at least about 75%, at least about 90%, or at least about 95% of the nucleotide residues of the first portion are capable of base pairing with nucleotide residues in the second portion. In certain embodiments, all nucleotide residues of the first portion are capable of base pairing with nucleotide residues in the second portion.

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription and translation of mRNA corresponding to that gene produces the protein in a cell or other biological system. Both the coding strand, the nucleotide sequence of which is identical to the mRNA sequence and is usually provided in sequence listings, and the noncoding strand, used as the template for transcription of a gene or cDNA, can be referred to as encoding the protein or other product of that gene or cDNA. Unless otherwise specified, a "nucleotide sequence encoding an amino acid sequence" includes all nucleotide sequences that are degenerate versions of each other and that encode the same amino acid sequence. Nucleotide sequences that encode proteins and RNA may include introns.

As used herein, the term "fragment," as applied to a nucleic acid, refers to a subsequence of a larger nucleic acid. A "fragment" of a nucleic acid can be at least about 5 nucleotides in length; for example, at least about 10 nucleotides to about 100 nucleotides; at least about 100 to about 500 nucleotides, at least about 500 to about 1000 nucleotides, at least about 1000 nucleotides to about 1500 nucleotides; or about 1500 nucleotides to about 2500 nucleotides; or about 2500 nucleotides (and any integer value in between).

"Homologous, homology" or "identical, identity" as used herein, refer to comparisons among amino acid and nucleic acid sequences. When referring to nucleic acid molecules, "homology," "identity," or "percent identical" refers to the percent of the nucleotides of the subject nucleic acid sequence that have been matched to identical nucleotides by a sequence analysis program. Homology can be readily calculated by known methods. Nucleic acid sequences and amino acid sequences can be compared using computer programs that align the similar sequences of the nucleic or amino acids and thus define the differences. In exemplary methodologies, the BLAST programs (NCBI) and parameters used therein are employed, and the ExPaSy is used to align sequence fragments of genomic DNA sequences. However, equivalent alignment assessments can be obtained through the use of any standard alignment software.

As used herein, "homologous" refers to the subunit sequence similarity between two polymeric molecules, e.g., between two nucleic acid molecules, e.g., two DNA molecules or two RNA molecules, or between two polypeptide molecules. When a subunit position in both of the two molecules is occupied by the same subunit, e.g., if a position in each of two DNA molecules is occupied by adenine, then they are homologous at that position. The homology between two sequences is a direct function of the number of matching or homologous positions, e.g., if half (e.g., five positions in a polymer ten subunits in length) of the positions in two compound sequences are homologous then the two sequences are 50% homologous, if 90% of the positions, e.g., 9 of 10, are matched or homologous, the two sequences share 90% homology. By way of example, the DNA sequences 5'-ATTGCC-3' and 5'-TATGGC-3' share 50% homology.

"Hybridization probes" are oligonucleotides capable of binding in a base-specific manner to a complementary strand of nucleic acid. Such probes include peptide nucleic acids, as described in Nielsen et al., 1991, Science 254:1497-1500, and other nucleic acid analogs and nucleic acid mimetics (see U.S. Pat. No. 6,156,501).

The term "hybridization" refers to the process in which two single-stranded nucleic acids bind non-covalently to form a double-stranded nucleic acid; triple-stranded hybridization is also theoretically possible. Complementary sequences in the nucleic acids pair with each other to form a double helix. The resulting double-stranded nucleic acid is a "hybrid." Hybridization may be between, for example, two complementary or partially complementary sequences. The hybrid may have double-stranded regions and single stranded regions. The hybrid may be, for example, DNA: DNA, RNA: DNA or DNA: RNA.

Hybrids may also be formed between modified nucleic acids. One or both of the nucleic acids may be immobilized on a solid support. Hybridization techniques may be used to detect and isolate specific sequences, measure homology, or define other characteristics of one or both strands.

The stability of a hybrid depends on a variety of factors including the length of complementarity, the presence of mismatches within the complementary region, the temperature and the concentration of salt in the reaction. Hybridizations are usually performed under stringent conditions, for example, at a salt concentration of no more than 1 M and a temperature of at least 25° C. For example, conditions of 5×SSPE (750 mM NaCl, 50 mM Na Phosphate, 5 mM EDTA, pH 7.4) or 100 mM MES, 1 M NaCl, 20 mM EDTA, 0.01% Tween-20 and a temperature of 25-50° C. are suitable for allele-specific probe hybridizations. In exemplary embodiments, hybridizations are performed at 40-50° C. Acetylated BSA and herring sperm DNA may be added to hybridization reactions. Hybridization conditions suitable for microarrays are described in the Gene Expression Technical Manual and the GeneChip Mapping Assay Manual available from Affymetrix (Santa Clara, CA).

A first oligonucleotide anneals with a second oligonucleotide with "high stringency" if the two oligonucleotides anneal under conditions whereby only oligonucleotides which are at least about 75%, and preferably at least about 90% or at least about 95%, complementary anneal with one another. The stringency of conditions used to anneal two oligonucleotides is a function of, among other factors, temperature, ionic strength of the annealing medium, the incubation period, the length of the oligonucleotides, the G-C content of the oligonucleotides, and the expected degree of non-homology between the two oligonucleotides, if known. Methods of adjusting the stringency of annealing conditions are known (see, e.g. Sambrook et al., 2012, Molecular Cloning: A Laboratory Manual, Cold Spring Harbor Laboratory Press, Cold Spring Harbor, N.Y.).

As used herein, a cancer or tumor is "immunogenic" if it induces an immune response in the subject afflicted by the cancer or tumor. Cancer antigens can be TSA (Tumor-specific antigen) or TAA (Tumor-associated antigen). Tumor-specific antigens are antigens that only occur in tumor cells. Tumor-associated antigens are present in healthy cells, but for some reason they also occur in tumor cells, but in distinct quantity, place. or time period of expression. Non-immunogenic tumors may lack TSA or TAA. Tumor cells have developed various mechanisms to escape immune surveillance and thus become "non-immunogenic" or "not immunogenic." CD8+ cytotoxic T cells are a fundamental element of anti-tumor immunity, recognizing antigens presented by MHC class I of cancer cells. However, some cancer cells lower their MHC I expression and avoid being detected by the cytotoxic T cells. Other tumor cell become non-immunogenic by stopping expression of molecules essential for co-stimulation of cytotoxic T cells, such as CD80 or CD86. Moreover, tumor cells may induce production of regulatory T cells by a contact dependent or independent stimulation. In a healthy tissue, functioning Tregs are essential to maintain self-tolerance. In a tumor, however, Tregs form an immunosupresive microenviroment. Alternatively, the tumor may be non-immunogenic if there is no access of T cells to the tumor mass. This may occur, for example, if the vasculature in the tumor tissue is defective or leaky, not enabling the normal migration process of T cells to take place.

As used herein, an "instructional material" includes a publication, a recording, a diagram, or any other medium of expression which can be used to communicate the usefulness of a compound, composition, vector, or delivery system of the invention in the kit for effecting alleviation of the various diseases or disorders recited herein. Optionally, or alternately, the instructional material can describe one or more methods of alleviating the diseases or disorders in a cell or a tissue of a mammal. The instructional material of the kit of the invention can, for example, be affixed to a container which contains the identified compound, composition, vector, or delivery system of the invention or be shipped together with a container which contains the identified compound, composition, vector, or delivery system. Alternatively, the instructional material can be shipped separately from the container with the intention that the instructional material and the compound be used cooperatively by the recipient.

As used herein, "isolate" refers to a nucleic acid obtained from an individual, or from a sample obtained from an individual. The nucleic acid may be analyzed at any time after it is obtained (e.g., before or after laboratory culture, before or after amplification.)

The term "label" as used herein refers to a luminescent label, a light scattering label or a radioactive label. Fluorescent labels include, but are not limited to, the commercially available fluorescein phosphoramidites such as Fluoreprime (Pharmacia), Fluoredite (Millipore) and FAM (ABI). See U.S. Pat. No. 6,287,778, which is included herein in its entirety by reference.

The term "mismatch," "mismatch control," or "mismatch probe" refers to a nucleic acid whose sequence is not perfectly complementary to a particular target sequence. The mismatch may comprise one or more bases. As used herein, the term "nucleic acid" refers to both naturally-occurring molecules such as DNA and RNA, but also various derivatives and analogs. Generally, the probes, hairpin linkers, and target polynucleotides of the present teachings are nucleic acids, and typically comprise DNA. Additional derivatives and analogs can be employed as will be appreciated by one having ordinary skill in the art.

The term "nucleotide base," as used herein, refers to a substituted or unsubstituted aromatic ring or rings. In certain embodiments, the aromatic ring or rings contain at least one nitrogen atom. In certain embodiments, the nucleotide base is capable of forming Watson-Crick and/or Hoogsteen hydrogen bonds with an appropriately complementary nucleotide base. Exemplary nucleotide bases and analogs thereof include, but are not limited to, naturally occurring nucleotide bases adenine, guanine, cytosine, 6-methyl-cytosine, uracil, thymine, and analogs of the naturally occurring nucleotide bases, e.g., 7-deazaadenine, 7-deazaguanine, 7-deaza-8-azaguanine, 7-deaza-8-azaadenine, $N^6$-delta 2-isopentenyladenine (6iA), $N^6$-delta 2-isopentenyl-2-methylthioadenine (2 ms6iA), $N^2$-dimethylguanine (dmG), 7-methylguanine (7 mG), inosine, nebularine, 2-aminopurine, 2-amino-6-chloropurine, 2,6-diaminopurine, hypoxanthine, pseudouridine, pseudocytosine, pseudoisocytosine, 5-propynylcytosine, isocytosine, isoguanine, 7-deazaguanine, 2-thiopyrimidine, 6-thioguanine, 4-thiothymine, 4-thiouracil, $O^6$-methylguanine, $N^6$-methyladenine, $O^4$-methylthymine, 5,6-dihydrothymine, 5,6-dihydrouracil, pyrazolo[3,4-D]pyrimidines (see, e.g., U.S. Pat. Nos. 6,143,877 and 6,127,121 and PCT Application Publication WO 01/38584), ethenoadenine, indoles such as nitroindole and 4-methylindole, and pyrroles such as nitropyrrole. Certain exemplary nucleotide bases can be found, e.g., in Fasman, 1989, Practical Handbook of Biochemistry and Molecular Biology, pp. 385-394, CRC Press, Boca Raton, Fla., and the references cited therein.

The term "nucleotide," as used herein, refers to a compound comprising a nucleotide base linked to the C-1' carbon of a sugar, such as ribose, arabinose, xylose, and pyranose, and sugar analogs thereof. The term nucleotide also encompasses nucleotide analogs. The sugar may be substituted or unsubstituted. Substituted ribose sugars include, but are not limited to, those riboses in which one or more of the carbon atoms, for example the 2'-carbon atom, is substituted with one or more of the same or different Cl, F, —R, —OR, —NR$_2$ or halogen groups, where each R is independently H, $C_1$-$C_6$ alkyl or $C_5$-$C_{14}$ aryl. Exemplary riboses include, but are not limited to, 2'-($C_1$-$C_6$)alkoxyribose, 2'-($C_5$-$C_{14}$)aryloxyribose, 2',3'-didehydroribose, 2'-deoxy-3'-haloribose, 2'-deoxy-3'-fluororibose, 2'-deoxy-3'-chlororibose, 2'-deoxy-3'-aminoribose, 2'-deoxy-3'-($C_1$-$C_6$) alkylribose, 2'-deoxy-3'-($C_1$-$C_6$)alkoxyribose and 2'-deoxy-3'-($C_5$-$C_{14}$)aryloxyribose, ribose, 2'-deoxyribose, 2',3'-dideoxyribose, 2'-haloribose, 2'-fluororibose, 2'-chlororibose, and 2'-alkylribose, e.g., 2'-O-methyl, 4'-anomeric nucleotides, 1'-anomeric nucleotides, 2'-4'- and 3'-4'-linked and other "locked" or "LNA", bicyclic sugar modifications (see, e.g., PCT Application Publications nos. WO 98/22489, WO 98/39352; and WO 99/14226). The term "nucleic acid" typically refers to large polynucleotides.

The term "oligonucleotide" typically refers to short polynucleotides, generally, no greater than about 50 nucleotides. It will be understood that when a nucleotide sequence is represented by a DNA sequence (i.e., A, T, G, C), this also includes an RNA sequence (i.e., A, U, G, C) in which "U" replaces "T."

The term "overhang," as used herein, refers to terminal non-base pairing nucleotide(s) resulting from one strand or region extending beyond the terminus of the complementary strand to which the first strand or region forms a duplex. One or more polynucleotides that are capable of forming a duplex through hydrogen bonding can have overhangs. The single-stranded region extending beyond the 3'-end of the duplex is referred to as an overhang.

The term "pattern recognition receptor," abbreviated as PRR, as used herein refers to a family of proteins that typically recognize pathogen-associated molecular patterns. PRRs may include members of the RIG-I like receptor (RLR) family, NOD-like receptor (NLRs) family, C-type lectin receptor (CLRs) family, or toll-like receptor (TLRs) family. In certain embodiments, the nucleic acid molecule described herein binds to a PRR, thereby resulting in an interferon response. It should be understood that a PRR includes any PRR fragment, variant, splice variant, mutant, or the like. In certain embodiments, the PRR is RIG-I.

The term "polynucleotide" as used herein is defined as a chain of nucleotides. Furthermore, nucleic acids are polymers of nucleotides. Thus, nucleic acids and polynucleotides as used herein are interchangeable. One skilled in the art has the general knowledge that nucleic acids are polynucleotides, which can be hydrolyzed into the monomeric "nucleotides." The monomeric nucleotides can be hydrolyzed into nucleosides. As used herein polynucleotides include, but are not limited to, all nucleic acid sequences which are obtained by any means available in the art, including, without limitation, recombinant means, i.e., the cloning of nucleic acid sequences from a recombinant library or a cell genome, using ordinary cloning and amplification technology, and the like, and by synthetic means. An "oligonucleotide" as used herein refers to a short polynucleotide, typically less than 100 bases in length.

Conventional notation is used herein to describe polynucleotide sequences: the left-hand end of a single-stranded polynucleotide sequence is the 5'-end. The DNA strand having the same sequence as an mRNA is referred to as the "coding strand"; sequences on the DNA strand which are located 5'-to a reference point on the DNA are referred to as "upstream sequences"; sequences on the DNA strand which are 3' to a reference point on the DNA are referred to as "downstream sequences."

The skilled artisan will understand that all nucleic acid sequences set forth herein throughout in their forward orientation, are also useful in the compositions and methods of the invention in their reverse orientation, as well as in their forward and reverse complementary orientation, and are described herein as well as if they were explicitly set forth herein.

"Primer" refers to a polynucleotide that is capable of specifically hybridizing to a designated polynucleotide template and providing a point of initiation for synthesis of a complementary polynucleotide. Such synthesis occurs when the polynucleotide primer is placed under conditions in which synthesis is induced, e.g., in the presence of nucleotides, a complementary polynucleotide template, and an agent for polymerization such as DNA polymerase. A primer is typically single-stranded, but may be double-stranded. Primers are typically deoxyribonucleic acids, but a wide variety of synthetic and naturally occurring primers are useful for many applications. A primer is complementary to the template to which it is designed to hybridize to serve as a site for the initiation of synthesis, but need not reflect the exact sequence of the template. In such a case, specific hybridization of the primer to the template depends on the stringency of the hybridization conditions. Primers can be labeled with a detectable label, e.g., chromogenic, radioactive, or fluorescent moieties and used as detectable moieties. Examples of fluorescent moieties include, but are not limited to, rare earth chelates (europium chelates), Texas Red, rhodamine, fluorescein, dansyl, phycocrytherin, phycocyanin, spectrum orange, spectrum green, and/or derivatives of any one or more of the examples elsewhere herein. Other detectable moieties include digoxigenin and biotin.

As used herein a "probe" is defined as a nucleic acid capable of binding to a target nucleic acid of complementary sequence through one or more types of chemical bonds, usually through complementary base pairing, usually through hydrogen bond formation. As used herein, a probe may include natural (i.e. A, G, U, C, or T) or modified bases (7-deazaguanosine, inosine, etc.). In addition, a linkage other than a phosphodiester bond may join the bases in probes, so long as it does not interfere with hybridization. Thus, probes may be peptide nucleic acids in which the constituent bases are joined by peptide bonds rather than phosphodiester linkages. The term "match," "perfect match," "perfect match probe" or "perfect match control" refers to a nucleic acid that has a sequence that is perfectly complementary to a particular target sequence. The nucleic acid is typically perfectly complementary to a portion (subsequence) of the target sequence. A perfect match (PM) probe can be a "test probe", a "normalization control" probe, an expression level control probe and the like. A perfect match control or perfect match is, however, distinguished from a "mismatch" or "mismatch probe."

The term "ribonucleotide" and the phrase "ribonucleic acid" (RNA), as used herein, refer to a modified or unmodified nucleotide or polynucleotide comprising at least one ribonucleotide unit. A ribonucleotide unit comprises an oxygen attached to the 2'-position of a ribosyl moiety having a nitrogenous base attached in N-glycosidic linkage at the 1'-position of a ribosyl moiety, and a moiety that either allows for linkage to another nucleotide or precludes linkage.

The term "target" as used herein refers to a molecule that has an affinity for a given molecule. Targets may be naturally-occurring or man-made molecules. Also, they can be employed in their unaltered state or as aggregates with other species. Targets may be attached, covalently or noncovalently, to a binding member, either directly or via a specific binding substance. Examples of targets which can be employed by this invention include, but are not restricted to, proteins, peptides, oligonucleotides and nucleic acids.

"Variant" as the term is used herein, is a nucleic acid sequence or a peptide sequence that differs in sequence from a reference nucleic acid sequence or peptide sequence respectively, but retains essential properties of the reference molecule. Changes in the sequence of a nucleic acid variant may not alter the amino acid sequence of a peptide encoded by the reference nucleic acid, or may result in amino acid substitutions, additions, deletions, fusions and truncations. A variant of a nucleic acid or peptide can be a naturally occurring such as an allelic variant, or can be a variant that is not known to occur naturally. Non-naturally occurring variants of nucleic acids and peptides may be made by mutagenesis techniques or by direct synthesis.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compounds and Compositions

In certain embodiments, the nucleic acid molecule of the present invention has a double-stranded section of 20 base pairs. In certain embodiments, the nucleic acid molecule of the present invention has a double-stranded section of 19 base pairs. In certain embodiments, the nucleic acid molecule of the present invention has a double-stranded section of 18 base pairs. In certain embodiments, the nucleic acid molecule of the present invention has a double-stranded section of 17 base pairs. In certain embodiments, the nucleic acid molecule of the present invention has a double-stranded section of 16 base pairs. In certain embodiments, the nucleic acid molecule of the present invention has a double-stranded section of 15 base pairs. In certain embodiments, the nucleic acid molecule of the present invention has a double-stranded section of 14 base pairs. In certain embodiments, the nucleic acid molecule of the present invention has a double-stranded section of 13 base pairs. In certain embodiments, the nucleic acid molecule of the present invention has a double-stranded section of 12 base pairs. In certain embodiments, the nucleic acid molecule of the present invention has a double-stranded section of 11 base pairs. In certain embodiments, the nucleic acid molecule of the present invention has a double-stranded section of 10 base pairs. In certain embodiments, the nucleic acid molecule of the present invention has a double-stranded section of 9 base pairs. In certain embodiments, the nucleic acid molecule of the present invention has a double-stranded section of 8 base pairs. In certain embodiments, the nucleic acid molecule of the present invention has a double-stranded section of 7 base pairs. In certain embodiments, the nucleic acid molecule of the present invention has a double-stranded section of 6 base pairs. In certain embodiments, the double-stranded section comprises one or more mispaired bases. That is, Watson-Crick base pairing is not required at each and every nucleotide pair. In certain embodiments, the double-stranded section comprises about 6, 7, 8, 9, 10, 11, 12, 13, 14, 15, 16, 17, 18, 19, or 20 base pairs.

In certain embodiments, the nucleic acid molecule can be of any sequence and comprises a hairpin structure and a blunt end. In certain embodiments, the hairpin comprises a double-stranded section of about 6 base pairs. In certain embodiments, the hairpin comprises a double-stranded section of about 7 base pairs. In certain embodiments, the hairpin comprises a double-stranded section of about 8 base pairs. In certain embodiments, the hairpin comprises a double-stranded section of about 9 base pairs. In certain embodiments, the hairpin comprises a double-stranded section of about 10 base pairs. In certain embodiments, the hairpin comprises a double-stranded section of about 11 base pairs. In certain embodiments, the hairpin comprises a double-stranded section of about 12 base pairs. In certain embodiments, the hairpin comprises a double-stranded section of about 13 base pairs. In certain embodiments, the hairpin comprises a double-stranded section of about 14 base pairs. In certain embodiments, the hairpin comprises a double-stranded section of about 15 base pairs. In certain embodiments, the hairpin comprises a double-stranded section of about 16 base pairs. In certain embodiments, the hairpin comprises a double-stranded section of about 17 base pairs. In certain embodiments, the hairpin comprises a double-stranded section of about 18 base pairs. In certain embodiments, the hairpin comprises a double-stranded section of about 19 base pairs. In certain embodiments, the hairpin comprises a double-stranded section of about 20 base pairs.

The nucleic acid molecule of the invention comprises nucleic acids from any source, such as but not limited to a nucleic acid that is prepared in vitro, that is isolated from a cell, and/or that is synthesized in vivo. In vivo synthesis of the nucleic acid can be achieved using any methods known in the art and/or discussed herein, such as but not limited to transfecting a subject with a synthetic DNA or vector which is capable of expressing the appropriate nucleic acid sequence in the subject. Such example would allow for constitutive endogenous production of the nucleic acid in the subject.

A nucleic acid in the context of the present invention includes but is not limited to deoxyribonucleic acid (DNA), ribonucleic acid (RNA), peptide nucleic acid (PNA, threose nucleic acid (TNA), glycol nucleic acid (GNA), locked nucleic acid (LNA) or a hybrid thereof.

A LNA, often referred to as inaccessible RNA, is a modified RNA nucleotide. The ribose moiety of an LNA nucleotide is modified with an extra bridge connecting the 2'-oxygen and 4'-carbon. The bridge "locks" the ribose in the 3'-endo (North) conformation, which is often found in the A-form duplexes. LNA nucleotides can be mixed with DNA or RNA residues in the oligonucleotide whenever desired and hybridize with DNA or RNA according to Watson-Crick base-pairing rules. Such oligomers can be synthesized chemically and are commercially available. The locked ribose conformation enhances base stacking and backbone pre-organization.

A LNA includes a nucleic acid unit that has a carbon or hetero alicyclic ring with four to six ring members, e.g. a firanose ring, or other alicyclic ring structures such as a cyclopentyl, cycloheptyl, tetrahydropyranyl, oxepanyl, tetrahydrothiophenyl, pyrrolidinyl, thianyl, thiepanyl, piperidinyl, and the like. In certain embodiments, at least one ring atom of the carbon or hetero alicyclic group is taken to form a further cyclic linkage to thereby provide a multi-cyclic group. The cyclic linkage can include one or more, typically two atoms, of the carbon or hetero alicyclic group. The cyclic linkage also can include one or more atoms that are substituents, but not ring members, of the carbon or hetero alicyclic group. Exemplary LNA units include those that contain a furanosyl-type ring and one or more of the following linkages: C-1', C-2'; C-2', C-3'; C-2', C-4'; or a C-2', C-5' linkage. A C-2', C-4' is particularly desirable. In other embodiments, LNA units are compounds having a substituent on the 2'-position of the central sugar moiety (e.g., ribose or xylose), or derivatives thereof, which favors the C3'-endo conformation, commonly referred to as the North (or simply N for short) conformation. Exemplary LNA units include 2'-O-methyl, 2'-fluoro, 2'-allyl, and 2'-O-methoxyethoxy derivatives. Other desirable LNA units are further discussed in International Patent Publication WO 99/14226, WO 00/56746, and WO 00/66604, all of which are included herein in their entireties.

DNA and RNA are naturally occurring in organisms, however, they may also exist outside living organisms or may be added to organisms. The nucleic acid may be of any origin, e.g., viral, bacterial, archae-bacterial, fungal, ribosomal, eukaryotic or prokaryotic. It may be nucleic acid from any biological sample and any organism, tissue, cell or sub-cellular compartment. It may be nucleic acid from any organism. The nucleic acid may be pre-treated before quantification, e.g., by isolation, purification or modification. Also artificial or synthetic nucleic acid may be used. The length of the nucleic acids may vary. The nucleic acids may be modified, e.g. may comprise one or more modified nucleobases or modified sugar moieties (e.g., comprising methoxy groups). The backbone of the nucleic acid may comprise one or more peptide bonds as in peptide nucleic acid (PNA). The nucleic acid may comprise a base analog such as non-purine or non-pyrimidine analog or nucleotide analog. It may also comprise additional attachments such as proteins, peptides and/or or amino acids.

In certain embodiments, the nucleic acid molecule of the invention is a single chain oligonucleotide that forms an intramolecular structure, i.e., a hairpin structure.

In certain embodiments, the hairpin nucleic acid molecule forms a blunt end. In certain embodiments, a blunt end refers to refers to, e.g., an RNA duplex where at least one end of the duplex lacks any overhang, e.g., a 3'-dinucleotide overhang, such that both the 5'- and 3'-strand end together, i.e., are flush or as referred to herein, are blunt. The molecules of the invention can have at least one blunt end. In other embodiments, the intramolecular structure produces a 3'-overhang. In certain instances, the 3'-overhang comprises a non-base pairing nucleotide. In other embodiments, the 3'-overhang comprises two non-base pairing nucleotides. In yet other embodiments, the 3'-overhang comprises three non-base pairing nucleotides. In yet other embodiments, the 3'-overhang comprises four, five, six, seven, eight, nine, ten, or more than ten non-base pairing nucleotides. In certain instances, the intramolecular structure produces a 5'-overhang. In certain embodiments, the 5'-overhang comprises a non-base pairing nucleotide. In other embodiments, the 5'-overhang comprises two non-base pairing nucleotides. In yet other embodiments, the 5'-overhang comprises three non-base pairing nucleotides. In yet other embodiments, the 5'-overhang comprises four, five, six, seven, eight, nine, ten, or more than ten non-base pairing nucleotides.

In certain instances, the short hairpin nucleic acid molecule of the invention is an ideal stimulant because of the ability to re-anneal after being unwound, whereas the shorter palindromic duplexes that are not a hairpin would likely lose their ability to stimulate IFN production as soon as the duplex melted. However, the present invention is not limited to hairpin structures, as it is demonstrated herein that short double-stranded duplexes demonstrate the ability to bind to a PRR and stimulate an interferon response.

In some instances, the short hairpin nucleic acid molecule of the invention is designed so that, in some conditions, the intramolecular stem structure has reduced stability where the stem structure is unfolded. In this manner, the stem structure can be designed so that the stem structure can be relieved of its intramolecular base pairing and resemble a linear molecule.

In accordance with the present invention, there are provided predetermined stem oligonucleotide sequences containing stretches of complementary sequences that form the stem structure. In certain embodiments, the stem comprises a double-stranded section that comprises 20 base pairs, 19 base pairs, 18 base pairs, 17 base pairs, 16 base pairs, 15 base pairs, 14 base pairs, 13 base pairs, 12 base pairs, 11 base pairs, 10 base pairs, 9 base pairs, 8 base pairs, 7 base pairs, or 6 base pairs, such that these complementary stretches anneal to provide a hairpin structure. In certain embodiments, the double-stranded section comprises one or more base mispairs. That is, the double-stranded section need not comprise Watson-Crick base pairing at each and every base pair in order to produce the hairpin structure.

In certain embodiments, the short hairpin nucleic acid molecule of the invention comprising: an antisense sequence and a sense sequence, wherein the sense sequence is substantially complementary to the antisense sequence; and a loop region or a linker connecting the antisense and sense sequences.

In certain aspects, the present invention includes a polynucleotide comprising a unimolecular RNA, such as a short hairpin RNA. The short hairpin RNA can be a unimolecular RNA that includes a sense sequence, a loop region or a linker, and an antisense sequence which together form a hairpin loop structure. Preferably, the antisense and sense sequences are substantially complementary to one other (about 80% complementary or more), where in certain embodiments the antisense and sense sequences are 100% complementary to each other. In certain embodiments, antisense and sense sequences each comprises 20 base pairs, 19 base pairs, 18 base pairs, 17 base pairs, 16 base pairs, 15 base pairs, 14 base pairs, 13 base pairs, 12 base pairs, 11 base pairs, 10 base pairs, 9 base pairs, 8 base pairs, 7 base pairs, or 6 base pairs. Additionally, the antisense and sense sequences within a unimolecular RNA of the invention can be the same length or differ in length. The loop can be any length, for example a length being 0, 1 or more, 2 or more, 4 or more, 5 or more, 8 or more, 10 or more, 15 or more, 20 or more, 40 or more, or 100 or more nucleotides in length.

In certain aspects, the linker is free of a nucleoside, nucleotide, deoxynucleoside, or deoxynucleotide, or any surrogates or modifications thereof. In certain embodiments, the linker is free of a phosphate backbone, or any surrogates or modifications thereof.

Any linker known in the art is contemplated herein. Non-limiting examples of linkers include ethylene glycols ($—CH_2CH_2O$), peptides, peptide nucleic acids (PNAs), alkylene chains (a divalent alkane-based group), amides, esters, ethers, and so forth, and any combinations thereof.

In certain embodiments, the linker comprises at least one ethylene glycol group. In other embodiments, the linker comprises one ethylene glycol group. In yet other embodiments, the linker comprises two ethylene glycol groups. In yet other embodiments, the linker comprises three ethylene glycol groups. In yet other embodiments, the linker comprises four ethylene glycol groups. In yet other embodiments, the linker comprises five ethylene glycol groups. In yet other embodiments, the linker comprises six ethylene glycol groups. In yet other embodiments, the linker comprises seven ethylene glycol groups. In yet other embodiments, the linker comprises eight ethylene glycol groups. In yet other embodiments, the linker comprises nine ethylene glycol groups. In yet other embodiments, the linker comprises ten ethylene glycol groups. In yet other embodiments, the linker comprises more than ten ethylene glycol groups. In yet other embodiments, the linker comprises ($OCH_2CH_2$)$_n$, wherein n is an integer ranging from 1 to 10. In yet other embodiments, n is 1. In yet other embodiments, n is 2. In yet other embodiments, n is 3. In yet other embodiments, n is 4. In yet other embodiments, n is 5. In yet other embodiments, n is 6. In yet other embodiments, n is 7. In yet other embodiments, n is 8. In yet other embodiments, n is 9. In yet other embodiments, n is 10.

In certain embodiments, the linker comprises at least one amino acid, at least two amino acids, at least three amino acids, at least four amino acids, at least five amino acids, at least six amino acids, at least seven amino acids, at least eight amino acids, at least nine amino acids, at least ten amino acids, or more than term amino acids.

In certain embodiments, the linker comprises a alkylene chain, such as but not limited to a $C_1$-$C_{50}$ alkylene chain, which is optionally substituted with at least one substituent selected from the group consisting of $C_1$-$C_6$ alkyl, $C_1$-$C_6$ haloalkyl, $C_1$-$C_6$ alkyl, $C_3$-$C_8$ cycloalkyl, $C_1$-$C_6$ alkoxy, —OH, halo, —$NH_2$, —NH($C_1$-$C_6$ alkyl), —N($C_1$-$C_6$ alkyl)($C_1$-$C_6$ alkyl), —C(=O)OH, —C(=O)O($C_1$-$C_6$ alkyl), and —C(=O)O($C_3$-$C_8$ cycloalkyl), wherein the alkyl or cycloalkyl is optionally substituted with at least one selected from the group consisting of $C_1$-$C_6$ alkyl, $C_1$-$C_6$ haloalkyl, $C_1$-$C_6$ alkyl, $C_3$-$C_8$ cycloalkyl, $C_1$-$C_6$ alkoxy, —OH, halo, —$NH_2$, —NH($C_1$-$C_6$ alkyl), —N($C_1$-$C_6$ alkyl)($C_1$-$C_6$ alkyl), —C(=O)OH, —C(=O)O($C_1$-$C_6$ alkyl), and —C(=O)O ($C_3$-$C_8$ cycloalkyl). In other embodiments, the linker is selected from the group consisting of —($CH_2$)—, —($CH_2$)$_2$—, —($CH_2$)$_3$—, —($CH_2$)$_2$—, —($CH_2$)$_4$—, —($CH_2$)$_5$—, —($CH_2$)$_6$—, —($CH_2$)$_7$—, —($CH_2$)$_8$—, —($CH_2$)$_9$—, —($CH_2$)$_{10}$—, —($CH_2$)$_{11}$—, —($CH_2$)$_{12}$—, —($CH_2$)$_{13}$—, —($CH_2$)$_{14}$—, —($CH_2$)$_{15}$—, —($CH_2$)$_{16}$—, —($CH_2$)$_{17}$—, —($CH_2$)$_{18}$—, —($CH_2$)$_{19}$—, and —($CH_2$)$_{20}$—, each of each is independently optionally substituted as described elsewhere herein.

Nucleic Acid Modification

The nucleic acid molecules of the present invention can be modified to improve stability in serum or in growth medium for cell cultures. In order to enhance the stability, the 3'-residues may be stabilized against degradation, e.g., they may be selected such that they consist of purine nucleotides, particularly adenosine or guanosine nucleotides. Alternatively, substitution of pyrimidine nucleotides by modified analogues, e.g., substitution of uridine by 2'-deoxythymidine is tolerated and does not affect function of the molecule.

In certain embodiments, the nucleic acid molecule may contain at least one modified nucleotide analogue. For example, the ends may be stabilized by incorporating modified nucleotide analogues.

Non-limiting examples of nucleotide analogues include sugar- and/or backbone-modified ribonucleotides (i.e., include modifications to the phosphate-sugar backbone). For example, the phosphodiester linkages of natural RNA may be modified to include at least one of a nitrogen or sulfur heteroatom. In certain backbone-modified ribonucleotides, the phosphoester group connecting to adjacent ribonucleotides is replaced by a modified group, e.g., of phosphothioate group. In certain sugar-modified ribonucleotides, the 2' OH-group is replaced by a group selected from the group consisting of H, OR, R, halo, SH, SR, $NH_2$, NHR, $NR_2$, and ON, wherein R is $C_1$-$C_6$ alkyl, alkenyl, or alkynyl, and halo is F, Cl, Br, or I.

Other examples of modifications are nucleobase-modified ribonucleotides, i.e., ribonucleotides, containing at least one non-naturally occurring nucleobase instead of a naturally occurring nucleobase. Bases may be modified to block the activity of adenosine deaminase. Exemplary modified nucleobases include, but are not limited to, uridine and/or cytidine modified at the 5-position, e.g., 5-(2-amino) propyl uridine, 5-bromo uridine; adenosine and/or guanosines modified at the 8 position, e.g., 8-bromo guanosine; deaza nucleotides, e.g., 7-deaza-adenosine; O- and N-alkylated nucleotides, e.g., $N^6$-methyl adenosine are suitable. It should be noted that the modifications described herein may be combined.

Modifications can be added to enhance stability, functionality, and/or specificity and to minimize immunostimulatory properties of the short hairpin nucleic acid molecule of the invention. For example, the overhangs can be unmodified, or can contain one or more specificity or stabilizing modifications, such as a halogen or O-alkyl modification of the 2'-position, or internucleotide modifications such as phosphorothioate modification. The overhangs can be ribonucleic acid, deoxyribonucleic acid, or a combination of ribonucleic acid and deoxyribonucleic acid.

In some instances, the nucleic acid molecule comprises at least one of the following chemical modifications: 2'-H, 2'-O-methyl, or 2'-OH modification of one or more nucleotides; one or more phosphorothioate modifications of the backbone; and a non-nucleotide moiety; wherein the at least one chemical modification confers reduced immunostimulatory activity, increased serum stability, or both, as compared to a corresponding short hairpin nucleic acid molecule not having the chemical modification.

In certain embodiments, the pyrimidine nucleotides comprise 2'-O-methylpyrimidine nucleotides and/or 2'-deoxy-pyrimidine nucleotides.

In certain embodiments, some or all of the purine nucleotides can comprise 2'-O-methylpurine nucleotides and/or 2'-deoxy-purine nucleotides.

In certain embodiments, the chemical modification is present in nucleotides proximal to the 3'- and/or 5'-ends of the nucleic acid molecule of the invention.

In certain embodiments, a nucleic acid molecule of the invention can have enhanced resistance to nucleases. For increased nuclease resistance, a nucleic acid molecule, can include, for example, 2'-modified ribose units and/or phosphorothioate linkages. For example, the 2'-hydroxyl group (OH) can be modified or replaced with a number of different "oxy" or "deoxy" substituents, such as but not limited to 2'-deoxy-2'-fluoro derivatives (wherein the hydroxyl group is replaced with a fluro atom).

For increased nuclease resistance the nucleic acid molecules of the invention can include 2'-O-methyl, 2'-fluorine, 2'-O-methoxyethyl, 2'-O-aminopropyl, 2'-amino, and/or phosphorothioate linkages. Inclusion of LNA's, ethylene nucleic acids (ENA), e.g., 2'-4'-ethylene-bridged nucleic acids, and certain nucleobase modifications such as 2-amino-A, 2-thio (e.g., 2-thio-U), G-clamp modifications, can also increase binding affinity to a target.

In certain embodiments, the nucleic acid molecule includes a 2'-modified nucleotide, e.g., a 2'-deoxy, 2'-deoxy-2'-fluoro, 2'-O-methyl, 2'-O-methoxyethyl (2'-O-MOE), 2'-O-aminopropyl (2'-O-AP), 2'-O-dimethylaminoethyl (2'-O-DMAOE), 2'-O-dimethylaminopropyl (2'-O-DMAP), 2'-O-dimethylaminoethyloxyethyl (2'-O-DMAEOE), or 2'-O—N-methylacetamido (2'-O-NMA). In certain embodiments, the nucleic acid molecule includes at least one 2'-O-methyl-modified nucleotide, and in some embodiments, all of the nucleotides of the nucleic acid molecule include a 2'-O-methyl modification.

Examples of "oxy"-2'-hydroxyl group modifications include alkoxy or aryloxy (OR, e.g., R═H, alkyl, cycloalkyl, aryl, aralkyl, heteroaryl or sugar); polyethyleneglycols (PEG), $O(CH_2CH_2O)_nCH_2CH_2OR$; LNA's in which the 2'-hydroxyl is connected, e.g., by a methylene bridge, to the 4' carbon of the same ribose sugar; amine, O-AMINE and aminoalkoxy, $O(CH_2)_n$AMINE, (e.g., AMINE═$NH_2$; alkylamino, dialkylamino, heterocyclyl amino, arylamino, diaryl amino, heteroaryl amino, or diheteroaryl amino, ethylene diamine, polyamino). Oligonucleotides containing only the methoxyethyl group (MOE), ($OCH_2CH_2OCH_3$, a PEG derivative), exhibit nuclease stabilities comparable to those modified with the robust phosphorothioate modification.

"Deoxy" modifications include hydrogen (i.e. deoxyribose sugars); halo (e.g., fluoro); amino (e.g. $NH_2$; alkylamino, dialkylamino, heterocyclyl, arylamino, diaryl amino, heteroaryl amino, diheteroaryl amino, or amino acid); $NH(CH_2CH_2NH)_nCH_2CH_2$-AMINE (AMINE═$NH_2$; alkylamino, dialkylamino, heterocyclyl amino, arylamino, diaryl amino, heteroaryl amino, or diheteroaryl amino), —NHC(O)R (R═alkyl, cycloalkyl, aryl, aralkyl, heteroaryl, or sugar), cyano; mercapto; alkyl-thio-alkyl; thioalkoxy; and alkyl, cycloalkyl, aryl, alkenyl and alkynyl, which may be optionally substituted with e.g., an amino functionality.

Exemplary substituents include 2'-methoxyethyl, 2'-$OCH_3$, 2'-O-allyl, 2'-C-allyl, and 2'-fluoro.

One way to increase resistance is to identify cleavage sites and modify such sites to inhibit cleavage. For example, the dinucleotides 5'-UA-3', 5'-UG-3', 5'-CA-3', 5'-UU-3', or 5'-CC-3' can serve as cleavage sites. Enhanced nuclease resistance can therefore be achieved by modifying the 5'-nucleotide, resulting, for example, in at least one 5'-uridine-adenine-3' (5'-UA-3') dinucleotide wherein the uridine is a 2'-modified nucleotide; at least one 5'-uridine-guanine-3' (5'-UG-3') dinucleotide, wherein the 5'-uridine is a 2'-modified nucleotide; at least one 5'-cytidine-adenine-3' (5'-CA-3') dinucleotide, wherein the 5'-cytidine is a 2'-modified nucleotide; at least one 5'-uridine-uridine-3' (5'-UU-3') dinucleotide, wherein the 5'-uridine is a 2'-modified nucleotide; or at least one 5'-cytidine-cytidine-3' (5'-CC-3') dinucleotide, wherein the 5'-cytidine is a 2'-modified nucleotide. The oligonucleotide molecule can include at least 2, at least 3, at least 4 or at least 5 of such dinucleotides. In certain embodiments, all the pyrimidines of a nucleic acid molecule carry a 2'-modification, and the nucleic acid molecule therefore has enhanced resistance to endonucleases. In certain embodiments, all the purines of a nucleic acid molecule carry a 2'-modification, and the nucleic acid molecule therefore has enhanced resistance to endonucleases. In certain embodiments, at least one pyrimidine of a nucleic acid molecule carries a 2'-modification, and the nucleic acid molecule therefore has enhanced resistance to endonucleases. In certain embodiments, at least one purine of a nucleic acid molecule carries a 2'-modification, and the nucleic acid molecule therefore has enhanced resistance to endonucleases.

With respect to phosphorothioate linkages that serve to increase protection against RNase activity, the nucleic acid molecule can include a phosphorothioate in at least the first, second, or third internucleotide linkage at the 5'- or 3'-end of the nucleotide sequence. To maximize nuclease resistance, the 2'-modifications can be used in combination with one or more phosphate linker modifications (e.g., phosphorothioate).

In certain embodiments, the inclusion of pyranose sugars in the nucleic acid backbone can also decrease endonucleolytic cleavage. The certain embodiments, inclusion of furanose sugars in the nucleic acid backbone can also decrease endonucleolytic cleavage.

In certain embodiments, the 5'-terminus can be blocked with an aminoalkyl group, e.g., a 5'-O-alkylamino substituent. Other 5'-conjugates can inhibit 5' to 3'-exonucleolytic cleavage. While not being bound by theory, a 5'-conjugate may inhibit exonucleolytic cleavage by sterically blocking the exonuclease from binding to the 5'-end of oligonucleotide. Even small alkyl chains, aryl groups, or heterocyclic conjugates or modified sugars (D-ribose, deoxyribose, glucose etc.) can block 5'-3-exonucleases.

Thus, a nucleic acid molecule can include modifications so as to inhibit degradation, e.g., by nucleases, e.g., endonucleases or exonucleases, found in the body of a subject. These monomers are referred to herein as NRMs, or Nuclease Resistance promoting Monomers, the corresponding modifications as NRM modifications. In many cases these modifications will modulate other properties of the oligonucleotide molecule as well, e.g., the ability to interact with a protein, e.g., a transport protein, e.g., serum albumin.

One or more different NRM modifications can be introduced into a nucleic acid molecule or into a sequence of a nucleic acid molecule. An NRM modification can be used more than once in a sequence or in a nucleic acid molecule.

NRM modifications include some that can be placed only at the terminus and others that can go at any position. Some NRM modifications that can inhibit hybridization are preferably used only in terminal regions, and more preferably not at the cleavage site or in the cleavage region of a nucleic acid molecule.

Such modifications can be introduced into the terminal regions, e.g., at the terminal position or with 2-, 3-, 4-, or 5-positions of the terminus, of a sequence that targets or a sequence that does not target a sequence in the subject.

In certain embodiments, a nucleic acid molecule includes a modification that improves targeting, e.g. a targeting modification described herein. Examples of modifications that target a nucleic acid molecule to particular cell types include carbohydrate sugars such as galactose, N-acetylgalactosamine, mannose; vitamins such as folates; other ligands such as RGDs and RGD mimics; and small molecules including naproxen, ibuprofen or other known protein-binding molecules.

A nucleic acid molecule can be constructed using chemical synthesis and/or enzymatic ligation reactions using procedures known in the art. For example, a nucleic acid molecule can be chemically synthesized using naturally occurring nucleotides or variously modified nucleotides designed to increase the biological stability of the molecules or to increase the physical stability of the binding between the nucleic acid molecule and target, e.g., phosphorothioate derivatives and acridine substituted nucleotides can be used. Other appropriate nucleic acid modifications are described herein. Alternatively, the nucleic acid molecule can be produced biologically using an expression vector.

For ease of exposition the term nucleotide or ribonucleotide is sometimes used herein in reference to one or more monomeric subunits of an oligonucleotide agent. It will be understood herein that the usage of the term "ribonucleotide" or "nucleotide" herein can, in the case of a modified RNA or nucleotide surrogate, also refer to a modified nucleotide, or surrogate replacement moiety at one or more positions.

In certain embodiments, the nucleic acid molecule of the invention preferably has one or more of the following properties:

(1) a 5'-modification that includes one or more phosphate groups or one or more analogs of a phosphate group;

(2) despite modifications, even to a very large number of bases specifically base pair and form a duplex structure with a double-stranded region;

(3) despite modifications, even to a very large number, or all of the nucleosides, still have "RNA-like" properties, i.e., it will possess the overall structural, chemical and physical properties of an RNA molecule, even though not exclusively, or even partly, of ribonucleotide-based content. For example, all of the nucleotide sugars can contain e.g., 2'-OMe, 2'-fluoro in place of 2'-hydroxyl. This deoxyribonucleotide-containing agent can still be expected to exhibit RNA-like properties. While not wishing to be bound by theory, an electronegative fluorine prefers an axial orientation when attached to the C2' position of ribose. This spatial preference of fluorine can, in turn, force the sugars to adopt a $C_3$-endo pucker. This is the same puckering mode as observed in RNA molecules and gives rise to the RNA-characteristic A-family-type helix. Further, since fluorine is a good hydrogen bond acceptor, it can participate in the same hydrogen bonding interactions with water molecules that are known to stabilize RNA structures. Generally, in certain embodiments a modified moiety at the 2'-sugar position can enter into hydrogen-bonding which is more characteristic of the 2'-OH moiety of a ribonucleotide than the 2'-H moiety of a deoxyribonucleotide. In certain embodiments, the oligonucleotide molecule will: exhibit a $C_{3'}$-endo pucker in all, or at least 50, 75, 80, 85, 90, or 95% of its sugars; exhibit a $C_{3'}$-endo pucker in a sufficient amount of its sugars that it can give rise to a the RNA-characteristic A-family-type helix; will have no more than 20, 10, 5, 4, 3, 2, or 1 sugar which is not a $C_{3'}$-endo pucker structure.

2'-modifications with C3'-endo sugar pucker include 2'-OH, 2'-O-Me, 2'-O-methoxyethyl, 2'-O-aminopropyl, 2'-F, 2'-O—$CH_2$—CO—NHMe, 2'-O—$CH_2$—$CH_2$—O—$CH_2$—$CH_2$—N(Me)$_2$, and LNA.

2'-modifications with a C2'-endo sugar pucker include 2'-H, 2'-Me, 2'-S-Me, 2'-Ethynyl, and 2'-ara-F.

Sugar modifications can also include L-sugars and 2'-5'-linked sugars.

Nucleic acid agents discussed herein include otherwise unmodified RNA and DNA as well as RNA and DNA that have been modified, e.g., to improve efficacy, and polymers of nucleoside surrogates. Unmodified RNA refers to a molecule in which the components of the nucleic acid, namely sugars, bases, and phosphate moieties, are the same or essentially the same as that which occur in nature, preferably as occur naturally in the human body. The art has referred to rare or unusual, but naturally occurring, RNAs as modified RNAs, see, e.g., Limbach et al., Nucleic Acids Res. 1994, 22:2183-2196. Such rare or unusual RNAs, often termed modified RNAs, are typically the result of a post-transcriptional modification and are within the term unmodified RNA as used herein. Modified RNA, as used herein, refers to a molecule in which one or more of the components of the nucleic acid, namely sugars, bases, and phosphate moieties, are different from that which occur in nature, preferably different from that which occurs in the human body. While they are referred to as "modified RNAs" they will of course, because of the modification, include molecules that are not, strictly speaking, RNAs. Nucleoside surrogates are molecules in which the ribophosphate backbone is replaced with a non-ribophosphate construct that allows the bases to be presented in the correct spatial relationship such that hybridization is substantially similar to what is seen with a ribophosphate backbone, e.g., non-charged mimics of the ribophosphate backbone. Examples of all of those contemplated herein are discussed herein.

As nucleic acids are polymers of subunits or monomers, many of the modifications described elsewhere herein occur at a position which is repeated within a nucleic acid, e.g., a modification of a base, or a phosphate moiety, or a non-linking O of a phosphate moiety. In some cases the modification will occur at all of the subject positions in the nucleic acid but in many, and in fact in most cases it will not. By way of example, a modification may only occur at a 3'- or 5'-terminal position, in a terminal region, e.g., at a position on a terminal nucleotide, or in the last 2, 3, 4, 5, or 10 nucleotides of a strand. The ligand can be attached at the 3'-end, the 5'-end, or at an internal position, or at a combination of these positions. For example, the ligand can be at the 3'-end and the 5'-end; at the 3'-end and at one or more internal positions; at the 5'-end and at one or more internal positions; or at the 3'-end, the 5'-end, and at one or more internal positions. For example, a phosphorothioate modification at a non-linking O position may only occur at one or both termini, or may only occur in a terminal region, e.g., at a position on a terminal nucleotide or in the last 2, 3, 4, 5, or 10 nucleotides of the nucleic acid. The 5'-end can be phosphorylated.

Modifications and nucleotide surrogates are discussed elsewhere herein.

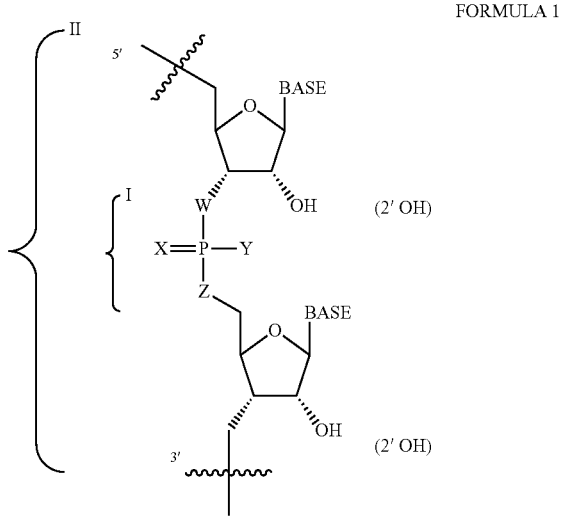

FORMULA 1

The scaffold presented in Formula 1 represents a portion of a ribonucleic acid. The basic components are the ribose sugar, the base, the terminal phosphates, and phosphate internucleotide linkers. Where the bases are naturally occurring bases, e.g., adenine, uracil, guanine or cytosine, the sugars are the unmodified 2' hydroxyl ribose sugar (as depicted) and W, X, Y, and Z are all O, Formula 1 represents a naturally occurring unmodified oligoribonucleotide.

Unmodified oligoribonucleotides may be less than optimal in some applications, e.g., unmodified oligoribonucleotides can be prone to degradation by e.g., cellular nucleases.

Nucleases can hydrolyze nucleic acid phosphodiester bonds. However, chemical modifications to one or more of the RNA components can confer improved properties, and, for example, can render oligoribonucleotides more stable to nucleases. Unmodified oligoribonucleotides may also be less than optimal in terms of offering tethering points for attaching ligands or other moieties to a nucleic acid agent.

Modified nucleic acids and nucleotide surrogates can include one or more of:
  (i) alteration, e.g., replacement, of one or both of the non-linking (X and Y) phosphate oxygens and/or of one or more of the linking (W and Z) phosphate oxygens. When the phosphate is in the terminal position, one of the positions W or Z will not link the phosphate to an additional element in a naturally occurring ribonucleic acid. However, for simplicity of terminology, except where otherwise noted, the W position at the 5' end of a nucleic acid and the terminal Z position at the 3' end of a nucleic acid, are within the term "linking phosphate oxygens" as used herein;
  (ii) alteration, e.g., replacement, of a constituent of the ribose sugar, e.g., of the 2' hydroxyl on the ribose sugar, or wholesale replacement of the ribose sugar with a structure other than ribose, e.g., as described herein;
  (iii) wholesale replacement of the phosphate moiety (bracket I) with "dephospho" linkers;
  (iv) modification or replacement of a naturally occurring base;
  (v) replacement or modification of the ribose-phosphate backbone (bracket II);
  (vi) modification of the 3'-end or 5'-end of the RNA, e.g., removal, modification or replacement of a terminal phosphate group or conjugation of a moiety, such as a fluorescently labeled moiety, to either the 3'- or 5'-end of RNA.

The terms replacement, modification, alteration, and the like, as used in this context, do not imply any process limitation, e.g., modification does not mean that one must start with a reference or naturally occurring ribonucleic acid and modify it to produce a modified ribonucleic acid but rather modified simply indicates a difference from a naturally occurring molecule.

It is understood that the actual electronic structure of some chemical entities cannot be adequately represented by only one canonical form (i.e. Lewis structure). While not wishing to be bound by theory, the actual structure can instead be some hybrid or weighted average of two or more canonical forms, known collectively as resonance forms or structures. Resonance structures are not discrete chemical entities and exist only on paper. They differ from one another only in the placement or "localization" of the bonding and nonbonding electrons for a particular chemical entity. It can be possible for one resonance structure to contribute to a greater extent to the hybrid than the others. Thus, the written and graphical descriptions of the embodiments of the present invention are made in terms of what the art recognizes as the predominant resonance form for a particular species. For example, any phosphoroamidate (replacement of a nonlinking oxygen with nitrogen) would be represented by X=O and Y=N in Formula 1.

The Phosphate Group

The phosphate group is a negatively charged species. The charge is distributed equally over the two non-linking oxygen atoms (i.e., X and Y in Formula 1). However, the phosphate group can be modified by replacing at least one of the oxygens with a different substituent. One result of this modification to RNA phosphate backbones can be increased resistance of the oligoribonucleotide to nucleolytic breakdown. Thus while not wishing to be bound by theory, it can be desirable in some embodiments to introduce alterations that result in either an uncharged linker or a charged linker with unsymmetrical charge distribution.

Examples of modified phosphate groups include phosphorothioate, phosphoroselenates, borano phosphates, borano phosphate esters, hydrogen phosphonates, phosphoroamidates, alkyl or aryl phosphonates and phosphotriesters. Phosphorodithioates have both non-linking oxygens replaced by sulfur. Unlike the situation where only one of X or Y is altered, the phosphorus center in the phosphorodithioates is achiral which precludes the formation of oligoribonucleotides diastereomers. Diastereomer formation can result in a preparation in which the individual diastereomers exhibit varying resistance to nucleases. Further, the hybridization affinity of RNA containing chiral phosphate groups can be lower relative to the corresponding unmodified RNA species. Thus, while not wishing to be bound by theory, modifications to both X and Y which eliminate the chiral center, e.g., phosphorodithioate formation, may be desirable in that they cannot produce diastereomer mixtures. Thus, X can be any one of S, Se, B, C, H, N, or OR (R is alkyl or aryl). Thus Y can be any one of S, Se, B, C, H, N, or OR (R is alkyl or aryl). Replacement of X and/or Y with sulfur is possible.

The phosphate linker can also be modified by replacement of a linking oxygen (i.e., W or Z in Formula 1) with nitrogen (bridged phosphoroamidates), sulfur (bridged phosphorothioates) and carbon (bridged methylenephosphonates). The replacement can occur at a terminal oxygen (position W (3') or position Z (5')). Replacement of W with carbon or Z with nitrogen is possible.

The Sugar Group

A modified RNA can include modification of all or some of the sugar groups of the ribonucleic acid. For example, the 2'-hydroxyl group (OH) can be modified or replaced with a number of different "oxy" or "deoxy" substituents. While not being bound by theory, enhanced stability is expected since the hydroxyl can no longer be deprotonated to form a 2'-alkoxide ion. The 2' alkoxide can catalyze degradation by intramolecular nucleophilic attack on the linker phosphorus atom. While not wishing to be bound by theory, it can be desirable to some embodiments to introduce alterations in which alkoxide formation at the 2'-position is not possible.

Examples of "oxy"-2'-hydroxyl group modifications include alkoxy or aryloxy (OR, e.g., R=H, alkyl, cycloalkyl, aryl, aralkyl, heteroaryl or sugar); polyethyleneglycols (PEG), $O(CH_2CH_2O)_nCH_2CH_2OR$; LNA's in which the 2'-hydroxyl is connected, e.g., by a methylene bridge or ethylene bridge (e.g., 2'-4'-ethylene bridged nucleic acid (ENA)), to the 4' carbon of the same ribose sugar; amino, O-AMINE (AMINE=$NH_2$; alkylamino, dialkylamino, heterocyclyl, arylamino, diaryl amino, heteroaryl amino, diheteroaryl amino, ethylene diamine, polyamino) and amino-alkoxy, $O(CH_2)_n$AMINE, (e.g., AMINE=$NH_2$; alkylamino, dialkylamino, heterocyclyl, arylamino, diaryl amino, heteroaryl amino, or diheteroaryl amino, ethylene diamine, polyamino). It is noteworthy that oligonucleotides containing only the methoxyethyl group (MOE), ($OCH_2CH_2OCH_3$, a PEG derivative), exhibit nuclease stabilities comparable to those modified with the robust phosphorothioate modification.

"Deoxy" modifications include hydrogen (i.e. deoxyribose sugars); halo (e.g., fluoro); amino (e.g. $NH_2$; alkylamino, dialkylamino, heterocyclyl, arylamino, diaryl amino, heteroaryl amino, diheteroaryl amino, or amino acid); $NH(CH_2CH_2NH)_nCH_2CH_2$-AMINE (AMINE=$NH_2$; alkylamino, dialkylamino, heterocyclyl, arylamino, diaryl amino, heteroaryl amino, or diheteroaryl amino), —NHC(O)R (R=alkyl, cycloalkyl, aryl, aralkyl, heteroaryl, or sugar), cyano; mercapto; alkyl-thio-alkyl; thioalkoxy; and alkyl, cycloalkyl, aryl, alkenyl and alkynyl, which may be optionally substituted with e.g., an amino functionality. Exemplary substituents are 2'-methoxyethyl, 2'—$OCH_3$, 2'-O-allyl, 2'-C-allyl, and 2'-fluoro.

The sugar group can also contain one or more carbons that possess the opposite stereochemical configuration than that of the corresponding carbon in ribose. Thus, a modified RNA can include nucleotides containing e.g., arabinose, as the sugar.

Modified RNAs can also include "abasic" sugars, which lack a nucleobase at C-1'. These abasic sugars can also contain modifications at one or more of the constituent sugar atoms.

To maximize nuclease resistance, the 2' modifications can be used in combination with one or more phosphate linker modifications (e.g., phosphorothioate). The so-called "chimeric" oligonucleotides are those that contain two or more different modifications.

The modification can also entail the wholesale replacement of a ribose structure with another entity (an SRMS) at one or more sites in the nucleic acid agent.

Replacement of the Phosphate Group

The phosphate group can be replaced by non-phosphorus containing connectors (cf. Bracket I in Formula 1). While not wishing to be bound by theory, it is believed that since the charged phosphodiester group is the reaction center in nucleolytic degradation, its replacement with neutral structural mimics should impart enhanced nuclease stability. Again, while not wishing to be bound by theory, it can be desirable, in some embodiment, to introduce alterations in which the charged phosphate group is replaced by a neutral moiety.

Examples of moieties which can replace the phosphate group include siloxane, carbonate, carboxymethyl, carbamate, amide, thioether, ethylene oxide linker, sulfonate, sulfonamide, thioformacetal, formacetal, oxime, methyleneimino, methylenemethylimino, methylenehydrazo, methylenedimethylhydrazo and methyleneoxymethylimino. Exemplary replacements include the methylenecarbonylamino and methylenemethylimino groups.

Replacement of Ribophosphate Backbone

Oligonucleotide-mimicking scaffolds can also be constructed wherein the phosphate linker and ribose sugar are replaced by nuclease resistant nucleoside or nucleotide surrogates (see Bracket II of Formula 1). While not wishing to be bound by theory, it is believed that the absence of a repetitively charged backbone diminishes binding to proteins that recognize polyanions (e.g. nucleases). Again, while not wishing to be bound by theory, it can be desirable in some embodiment, to introduce alterations in which the bases are tethered by a neutral surrogate backbone.

Examples include the morpholino, cyclobutyl, pyrrolidine, and peptide nucleic acid (PNA) nucleoside surrogates. A non-limiting surrogate is a PNA surrogate.

Terminal Modifications

The 3'- and 5'-ends of an oligonucleotide can be modified. Such modifications can be at the 3'-end, 5'-end or both ends of the molecule. They can include modification or replacement of an entire terminal phosphate or of one or more of the atoms of the phosphate group. E.g., the 3'- and 5'-ends of an oligonucleotide can be conjugated to other functional molecular entities such as labeling moieties, e.g., fluorophores (e.g., pyrene, TAMRA, fluorescein, Cy3 or Cy5 dyes) or protecting groups (based e.g., on sulfur, silicon, boron or ester). The functional molecular entities can be attached to the sugar through a phosphate group and/or a spacer. The terminal atom of the spacer can connect to or replace the linking atom of the phosphate group or the C-3'- or C-5'-O, N, S or C group of the sugar. Alternatively, the spacer can connect to or replace the terminal atom of a nucleotide surrogate (e.g., PNAs). These spacers or linkers can include e.g., —($CH_2$)$_n$—, —($CH_2$)$_n$N—, —($CH_2$)NO—, —($CH_2$)$_n$S—, O($CH_2CH_2$O)$_n$$CH_2CH_2$OH (e.g., n=3 or 6), abasic sugars, amide, carboxy, amine, oxyamine, oxyimine, thioether, disulfide, thiourea, sulfonamide, or morpholino, or biotin and fluorescein reagents. While not wishing to be bound by theory, it is believed that conjugation of certain moieties can improve transport, hybridization, and specificity properties. While not wishing to be bound by theory, it may be desirable to introduce terminal alterations that improve nuclease resistance. Other examples of terminal modifications include dyes, intercalating agents (e.g. acridines), cross-linkers (e.g. psoralene, mitomycin C), porphyrins (TPPC4, texaphyrin, Sapphyrin), polycyclic aromatic hydrocarbons (e.g., phenazine, dihydrophenazine), artificial endonucleases (e.g. EDTA), lipophilic carriers (e.g., cholesterol, cholic acid, adamantane acetic acid, 1-pyrene butyric acid, dihydrotestosterone, 1,3-Bis-O(hexadecyl)glycerol, geranyloxyhexyl group, hexadecylglycerol, borneol, menthol, 1,3-propanediol, heptadecyl group, palmitic acid, myristic acid, $O^3$-(oleoyl) lithocholic acid, $O^3$-(oleoyl)cholenic acid, dimethoxytrityl, or phenoxazine) and peptide conjugates (e.g., antennapedia peptide, Tat peptide), alkylating agents, phosphate, amino, mercapto, PEG (e.g., PEG-40K), MPEG, [MPEG]$_2$, polyamino, alkyl, substituted alkyl, radiolabeled markers, enzymes, haptens (e.g. biotin), transport/absorption facilitators (e.g., aspirin, vitamin E, folic acid), synthetic ribonucleases (e.g., imidazole, bisimidazole, histamine, imidazole clusters, acridine-imidazole conjugates, $Eu^{3+}$ complexes of tetraazamacrocycles).

Terminal modifications can be added for a number of reasons, including as discussed elsewhere herein to modulate activity and/or to modulate resistance to degradation and/or to enhance cell uptake. Non-limiting modifications include the addition of a methylphosphonate at the 3'-most terminal linkage; a 3'-C5-aminoalkyl-dT; 3'-cationic group; or another 3'-conjugate to inhibit 3'-5'-exonucleolytic degradation.

Terminal modifications useful for modulating activity include modification of the 5'-end with phosphate or phosphate analogs. For example, in certain embodiments, oligonucleotide agents are 5'-phosphorylated or include a phosphoryl analog at the 5'-terminus. Suitable modifications include: 5'-monophosphate ((HO)$_2$(O)P—O-5'); 5'-diphosphate ((HO)$_2$ (O)P—O—P(HO)(O)—O-5'); 5'-triphosphate ((HO)$_2$(O)P—O—P(HO)(O)—O—P(HO)(O)—O-5'); 5'-guanosine cap (7-methylated or non-methylated) (7m-G-O-5'-(HO)(O)P—O—(HO)(O)P—O—P(HO)(O)—O-5'); 5'-adenosine cap (Appp), and any modified or unmodified nucleotide cap structure (N—O-5'-(HO)(O)P—O—(HO)(O)P—O—P(HO)(O)—O-5'); 5'-monothiophosphate (phosphorothioate; (HO) 2 (S) P—O-5'); 5'-monodithiophosphate (phosphorodithioate; (HO)(HS)(S)P—O-5'), 5'-phosphorothiolate ((HO)$_2$(O)P—S-5'); any additional combination of oxygen/sulfur replaced monophosphate, diphosphate and triphosphates (e.g. 5'-alpha-thiotriphosphate, 5'-gamma-thiotriphosphate, etc.), 5'-phosphoramidates ((HO)$_2$(O)P—NH-5', (HO)(NH$_2$)(O)P—O-5'), 5'-alkylphosphonates (R=alkyl=methyl, ethyl, isopropyl, propyl, etc., e.g. RP(OH)(O)—O-5'-, (OH)$_2$(O)P-5'-$CH_2$—), 5'-alkyletherphosphonates (R-alkylether, such as methoxymethyl (MeO$CH_2$—), ethoxymethyl, etc., e.g. RP(OH)(O)—O-5'-).

Terminal modifications can also be useful for monitoring distribution, and in such cases exemplary groups to be added include fluorophores, e.g., fluorescein or an ALEXA FLUOR™ dye, e.g., ALEXA FLUOR™ 488. Terminal modifications can also be useful for enhancing uptake, useful modifications for this include cholesterol. Terminal modifications can also be useful for cross-linking antagomir to another moiety; modifications useful for this include mitomycin C.

The Bases

Adenine, guanine, cytosine and uracil are the most common bases found in RNA. These bases can be modified or replaced to provide RNA's having improved properties. For example, nuclease resistant oligoribonucleotides can be prepared with these bases or with synthetic and natural nucleobases (e.g., inosine, thymine, xanthine, hypoxanthine, nubularine, isoguanisine, or tubercidine) and any one of the modifications contemplated herein. Alternatively, substituted or modified analogs of any of the bases contemplated herein, e.g., "unusual bases" and "universal bases" described herein, can be employed. Examples include without limitation 2-aminoadenine, 6-methyl and other alkyl derivatives of adenine and guanine, 2-propyl and other alkyl derivatives of adenine and guanine, 5-halouracil and cytosine, 5-propynyl uracil and cytosine, 6-azo uracil, cytosine and thymine, 5-uracil (pseudouracil), 4-thiouracil, 5-halouracil, 5-(2-aminopropyl) uracil, 5-amino allyl uracil, 8-halo, amino, thiol, thioalkyl, hydroxyl and other 8-substituted adenines and guanines, 5-trifluoromethyl and other 5-substituted uracils and cytosines, 7-methylguanine, 5-substituted pyrimidines, 6-azapyrimidines and N-2, N-6 and O-6 substituted purines, including 2-aminopropyladenine, 5-propynyluracil and 5-propynylcytosine, dihydrouracil, 3-deaza-5-azacytosine, 2-aminopurine, 5-alkyluracil, 7-alkylguanine, 5-alkyl cytosine, 7-deazaadenine, $N^6,N^6$-dimethyladenine, 2,6-diaminopurine, 5-amino-allyl-uracil, $N^3$-methyluracil, substituted 1,2,4-triazoles, 2-pyridinone, 5-nitroindole, 3-nitropyrrole, 5-methoxyuracil, uracil-5-oxyacetic acid, 5-methoxycarbonylmethyluracil, 5-methyl-2-thiouracil, 5-methoxycarbonylmethyl-2-thiouracil, 5-methylaminomethyl-2-thiouracil, 3-(3-amino-3carboxypropyl) uracil, 3-methylcytosine, 5-methylcytosine, $N^4$-acetyl cytosine, 2-thiocytosine, $N^6$-methyladenine, $N^6$-isopentyladenine, 2-methylthio-$N^6$-isopentenyladenine, N-methylguanines, or O-alkylated bases. Further purines and pyrimidines include those disclosed in U.S. Pat. No. 3,687,808, those disclosed in the Concise Encyclopedia Of Polymer Science And Engineering, pages 858-859, Kroschwitz, J. I., ed. John Wiley & Sons, 1990, and those disclosed by Englisch et al., Angewandte Chemie, International Edition, 1991, 30, 613.

Methods

The invention provides methods of treating or preventing a cancer in a subject in need thereof. In certain embodiments, the subject is in need of such treating and/preventing. In certain embodiments, the method comprises administering to the subject a therapeutically effective amount of a RIG-I agonist. In certain embodiments, the method comprises further administering to the subject a therapeutically effective amount of a PD-1/PD-L1 blockade agent and/or CTL4 blockade agent blockade agent.

The invention includes methods of introducing nucleic acids, vectors, and host cells to a subject. Physical methods of introducing nucleic acids include injection of a solution containing the nucleic acid molecule, bombardment by particles covered by the nucleic acid molecule, soaking the cell or organism in a solution of the nucleic acid molecule, or electroporation of cell membranes in the presence of the nucleic acid molecule. A viral construct packaged into a viral particle would accomplish both efficient introduction of an expression construct into the cell and transcription of RNA encoded by the expression construct. Other methods known in the art for introducing nucleic acids to cells may be used, such as lipid-mediated carrier transport, chemical-mediated transport, such as calcium phosphate, and the like. Thus the nucleic acid may be introduced along with components that perform one or more of the following activities: enhance nucleic acid uptake by the cell, stabilize the duplex, or otherwise increase activity of the nucleic acid molecule.

Methods of introducing nucleic acids into a cell are known in the art. The nucleic acid molecule of the invention can be readily introduced into a host cell, e.g., mammalian, bacterial, yeast, or insect cell by any method in the art. For example, the nucleic acid molecule can be transferred into a host cell by physical, chemical, or biological means.

Physical methods for introducing a nucleic acid into a host cell include calcium phosphate precipitation, lipofection, particle bombardment, microinjection, electroporation, and the like. Methods for producing cells comprising vectors and/or exogenous nucleic acids are well-known in the art. See, for example, Sambrook et al. (2001, Molecular Cloning: A Laboratory Manual, Cold Spring Harbor Laboratory, New York).

Biological methods for introducing a nucleic acid into a host cell include the use of DNA and RNA vectors. Viral vectors, and especially retroviral vectors, have become the most widely used method for inserting genes into mammalian, e.g., human cells. Other viral vectors can be derived from lentivirus, poxviruses, herpes simplex virus I, adenoviruses and adeno-associated viruses, and the like. See, for example, U.S. Pat. Nos. 5,350,674 and 5,585,362.

Chemical means for introducing a nucleic acid into a host cell include colloidal dispersion systems, such as macromolecule complexes, nanocapsules, microspheres, beads, and lipid-based systems including oil-in-water emulsions, micelles, mixed micelles, and liposomes. An exemplary colloidal system for use as a delivery vehicle in vitro and in vivo is a liposome (e.g., an artificial membrane vesicle).

In certain instances, the nucleic acid is delivered via a polymeric delivery vehicle. For example, the nucleic acid molecule may be complexed with a polymer based micelle, capsule, microparticle, nanoparticle, or the like. The complex may then be contacted to a cell in vivo, in vitro, or ex vivo, thereby introducing the nucleic acid molecule to the cell. Exemplary polymeric delivery systems are well known in the art (see for example U.S. Pat. No. 6,013,240). Polymeric delivery reagents are commercially available, including exemplary reagents obtainable from Polyplus-transfection Inc (New York, NY).

In the case where a non-viral delivery system is utilized, an exemplary delivery vehicle is a liposome. The use of lipid formulations is contemplated for the introduction of the nucleic acids into a host cell (in vitro, ex vivo or in vivo). In another aspect, the nucleic acid may be associated with a lipid. The nucleic acid associated with a lipid may be encapsulated in the aqueous interior of a liposome, interspersed within the lipid bilayer of a liposome, attached to a liposome via a linking molecule that is associated with both the liposome and the oligonucleotide, entrapped in a liposome, complexed with a liposome, dispersed in a solution containing a lipid, mixed with a lipid, combined with a lipid, contained as a suspension in a lipid, contained or complexed with a micelle, or otherwise associated with a lipid. Lipid, lipid/DNA or lipid/expression vector associated compositions are not limited to any particular structure in solution. For example, they may be present in a bilayer structure, as micelles, or with a "collapsed" structure. They may also simply be interspersed in a solution, possibly forming aggregates that are not uniform in size or shape. Lipids are fatty substances which may be naturally occurring or synthetic lipids. For example, lipids include the fatty droplets that naturally occur in the cytoplasm as well as the class of compounds which contain long-chain aliphatic hydrocarbons and their derivatives, such as fatty acids, alcohols, amines, amino alcohols, and aldehydes.

Lipids suitable for use can be obtained from commercial sources. For example, dimyristyl phosphatidylcholine ("DMPC") can be obtained from Sigma, St. Louis, MO; dicetyl phosphate ("DCP") can be obtained from K & K Laboratories (Plainview, NY); cholesterol ("Chol") can be obtained from Calbiochem-Behring; dimyristyl phosphatidylglycerol ("DMPG") and other lipids may be obtained from Avanti Polar Lipids, Inc. (Birmingham, AL). Stock solutions of lipids in chloroform or chloroform/methanol can be stored at about −20° C. Chloroform is used as the only solvent since it is more readily evaporated than methanol. "Liposome" is a generic term encompassing a variety of single and multilamellar lipid vehicles formed by the generation of enclosed lipid bilayers or aggregates. Liposomes can be characterized as having vesicular structures with a phospholipid bilayer membrane and an inner aqueous medium. Multilamellar liposomes have multiple lipid layers separated by aqueous medium. They form spontaneously when phospholipids are suspended in an excess of aqueous solution. The lipid components undergo self-rearrangement before the formation of closed structures and entrap water and dissolved solutes between the lipid bilayers (Ghosh et al., 1991 Glycobiology 5:505-10). However, compositions that have different structures in solution than the normal vesicular structure are also encompassed. For example, the lipids may assume a micellar structure or merely exist as nonuniform aggregates of lipid molecules. Also contemplated are lipofectamine-nucleic acid complexes.

Regardless of the method used to introduce the nucleic acid molecule into a host cell or otherwise expose a cell to the molecule of the present invention, in order to confirm the presence of the nucleic acid in the host cell, a variety of assays may be performed. Such assays include, for example, "molecular biological" assays well known to those of skill in the art, such as Southern and Northern blotting, RT-PCR and PCR.

The nucleic acid molecule of the invention may be directly introduced into the cell (i.e., intracellularly); or introduced extracellularly into a cavity, interstitial space, into the circulation of an organism, introduced orally, or may be introduced by bathing a cell or organism in a solution containing the nucleic acid molecule. Vascular or extravascular circulation, the blood or lymph system, and the cerebrospinal fluid are sites where the nucleic acid molecule may be introduced.

Alternatively, vectors, e.g., transgenes encoding the nucleic acid molecule of the invention can be engineered into a host cell or transgenic animal using art recognized techniques.

The present invention provides a method of inducing an IFN response in a cell. For example, in certain embodiments, the method induces a type I IFN response. Type I IFNs include, for example IFN-α, IFN-β, IFN-κ, IFN-δ, IFN-ε, IFN-τ, IFN-ω, and IFN-ζ. The present application also provides the use of at least one nucleic acid molecule for inducing apoptosis of a tumor cell in vitro.

The present invention provides an in vitro method for stimulating an IFN response, including for example a type I IFN response in a cell comprising contacting a cell with at least one nucleic acid molecule of the invention.

The cells may express a PRR endogenously and/or exogenously from an exogenous nucleic acid (RNA or DNA). The exogenous DNA may be a plasmid DNA, a viral vector, or a portion thereof. The exogenous DNA may be integrated into the genome of the cell or may exist extra-chromosomally. The cells include, but are not limited to, primary immune cells, primary non-immune cells, and cell lines. Immune cells include, but are not limited to, peripheral blood mononuclear cells (PBMC), plasmacytoid dendritic cells (PDC), myeloid dendritic cells (MDC), macrophages, monocytes, B cells, natural killer cells, granulocytes, CD4+ T cells, CD8+ T cells, and NKT cells. Non-immune cells include, but are not limited to, fibroblasts, endothelial cells, epithelial cells, and tumor cells. Cell lines may be derived from immune cells or non-immune cells.

The present invention provides an in vitro method for inducing apoptosis and/or death of a tumor cell, comprising contacting a tumor cell with at least one nucleic acid molecule of the invention. The tumor cell may be a primary tumor cell freshly isolated from a vertebrate animal having a tumor or a tumor cell line.

In certain embodiments, the present invention provides for both prophylactic and therapeutic methods of inducing an IFN response a patient. It is understood that "treatment" or "treating" as used herein, is defined as the application or administration of a therapeutic agent (e.g., a nucleic acid molecule) to a patient, or application or administration of a therapeutic agent to an isolated tissue or cell line from a patient, who has a disease or disorder, a symptom of disease or disorder or a predisposition toward a disease or disorder, with the purpose to cure, heal, alleviate, relieve, alter, remedy, ameliorate, improve or affect the disease or disorder, the symptoms of the disease or disorder, or the predisposition toward disease.

In certain embodiments, the present application provides the in vivo use of the nucleic acid molecule of the invention. In certain embodiments, the present application provides at least one nucleic acid molecule of the invention for inducing an IFN response, including for example a type I IFN response, in a vertebrate animal, in particular, a mammal. The present application further provides at least one nucleic acid molecule of the invention for inducing apoptosis of a tumor cell in a vertebrate animal, in particular, a mammal. The present application additionally provides at least one nucleic acid molecule of the invention for preventing and/or treating a disease and/or disorder in a vertebrate animal, in particular, a mammal, in medical and/or veterinary practice. The invention also provides at least one nucleic acid molecule of the invention for use as a vaccine adjuvant.

Furthermore, the present application provides the use of at least one nucleic acid molecule of the invention for the preparation of a pharmaceutical composition for inducing an IFN response, including for example a type I IFN response in a vertebrate animal, in particular, a mammal. The present application further provides the use of at least one nucleic acid molecule of the invention for the preparation of a pharmaceutical composition for inducing apoptosis and/or death of a tumor cell in a vertebrate animal, in particular, a mammal. The present application additionally provides the use of at least one nucleic acid molecule of the invention for the preparation of a pharmaceutical composition for preventing and/or treating a disease and/or disorder in a vertebrate animal, in particular, a mammal, in medical and/or veterinary practice.

The present invention encompasses the use of the nucleic acid molecule to prevent and/or treat any disease, disorder, or condition in which inducing IFN production would be beneficial. For example, increased IFN production, by way of the nucleic acid molecule of the invention, may be beneficial to prevent or treat a wide variety of disorders, including, but not limited to, cancer, and the like.

Tumors include both benign and malignant tumors (i.e., cancer). Cancers include, but are not limited to biliary tract cancer, brain cancer, breast cancer, cervical cancer, choriocarcinoma, colon cancer, endometrial cancer, esophageal cancer, gastric cancer, intraepithelial neoplasm, leukemia, lymphoma, liver cancer, lung cancer, melanoma, myelomas, neuroblastoma, oral cancer, ovarian cancer, pancreatic cancer, prostate cancer, rectal cancer, sarcoma, skin cancer, testicular cancer, thyroid cancer and renal cancer.

In certain embodiments, the cancer is selected from hairy cell leukemia, chronic myelogenous leukemia, cutaneous T-cell leukemia, chronic myeloid leukemia, non-Hodgkin's lymphoma, multiple myeloma, follicular lymphoma, malignant melanoma, squamous cell carcinoma, renal cell carcinoma, prostate carcinoma, bladder cell carcinoma, breast carcinoma, ovarian carcinoma, non-small cell lung cancer, small cell lung cancer, hepatocellular carcinoma, basaliom, colon carcinoma, cervical dysplasia, and Kaposi's sarcoma (AIDS-related and non-AIDS related).

In certain embodiments, the nucleic acid molecule of the invention is used in combination with one or more pharmaceutically active agents such as immunostimulatory agents, anti-viral agents, antibiotics, anti-fungal agents, anti-parasitic agents, anti-tumor agents, cytokines, chemokines, growth factors, anti-angiogenic factors, chemotherapeutic agents, antibodies and gene silencing agents. Preferably, the pharmaceutically active agent is selected from the group consisting of an immunostimulatory agent, an anti-bacterial agent, an anti-viral agent, an anti-inflammatory agent, and an anti-tumor agent. The more than one pharmaceutically active agents may be of the same or different category.

In certain embodiments, the nucleic acid molecule of the invention is used in combination with an antigen, and/or an anti-tumor vaccine, wherein the vaccine can be prophylactic and/or therapeutic. The nucleic acid molecule can serve as an adjuvant.

In another embodiment, the nucleic acid is used in combination with retinoic acid and/or type I IFN (IFN-α and/or IFN-β). Without being bound by any theory, retinoid acid, IFN-α and/or IFN-β are capable of sensitizing cells for IFN-β production, possibly through the upregulation of PRR expression.

In certain embodiments, the nucleic acid molecule of the invention is for use in combination with one or more prophylactic and/or therapeutic treatments of diseases and/ or disorders such as tumors. The treatments may be pharmacological and/or physical (e.g., surgery, radiation).

Vertebrate animals include, but are not limited to, fish, amphibians, birds, and mammals. Mammals include, but are not limited to, rats, mice, cats, dogs, horses, sheep, cattle, cows, pigs, rabbits, non-human primates, and humans. In exemplary embodiments, the mammal is human.

Administration/Dosing

The regimen of administration may affect what constitutes an effective amount. The therapeutic formulations may be administered to the subject either prior to or after a diagnosis of disease. Further, several divided dosages, as well as staggered dosages may be administered daily or sequentially, or the dose may be continuously infused, or may be a bolus injection. Further, the dosages of the therapeutic formulations may be proportionally increased or decreased as indicated by the exigencies of the therapeutic or prophylactic situation.

Administration of the compositions of the present invention to a subject, preferably a mammal, more preferably a human, may be carried out using known procedures, at dosages and for periods of time effective to prevent or treat disease. An effective amount of the therapeutic compound necessary to achieve a therapeutic effect may vary according to factors such as the activity of the particular compound employed; the time of administration; the rate of excretion of the compound; the duration of the treatment; other drugs, compounds or materials used in combination with the compound; the state of the disease or disorder, age, sex, weight, condition, general health and prior medical history of the subject being treated, and like factors well-known in the medical arts. Dosage regimens may be adjusted to provide the optimum therapeutic response. For example, several divided doses may be administered daily or the dose may be proportionally reduced as indicated by the exigencies of the therapeutic situation. A non-limiting example of an effective dose range for a therapeutic compound of the invention is from about 1 and 5,000 mg/kg of body weight/per day. One of ordinary skill in the art would be able to study the relevant factors and make the determination regarding the effective amount of the therapeutic compound without undue experimentation.

The compound may be administered to a subject as frequently as several times daily, or it may be administered less frequently, such as once a day, once a week, once every two weeks, once a month, or even less frequently, such as once every several months or even once a year or less. It is understood that the amount of compound dosed per day may be administered, in non-limiting examples, every day, every other day, every 2 days, every 3 days, every 4 days, or every 5 days. For example, with every other day administration, a 5 mg per day dose may be initiated on Monday with a first subsequent 5 mg per day dose administered on Wednesday, a second subsequent 5 mg per day dose administered on Friday, and so on. The frequency of the dose will be readily apparent to the skilled artisan and will depend upon any number of factors, such as, but not limited to, the type and severity of the disease being treated, the type and age of the animal, etc.

Actual dosage levels of the active ingredients in the pharmaceutical compositions of this invention may be varied so as to obtain an amount of the active ingredient that is effective to achieve the desired therapeutic response for a particular subject, composition, and mode of administration, without being toxic to the subject.

A medical doctor, e.g., physician or veterinarian, having ordinary skill in the art may readily determine and prescribe the effective amount of the pharmaceutical composition required. For example, the physician or veterinarian could start doses of the compounds of the invention employed in the pharmaceutical composition at levels lower than that required in order to achieve the desired therapeutic effect and gradually increase the dosage until the desired effect is achieved.

In particular embodiments, it is especially advantageous to formulate the compound in dosage unit form for ease of administration and uniformity of dosage. Dosage unit form as used herein refers to physically discrete units suited as unitary dosages for the subjects to be treated; each unit containing a predetermined quantity of therapeutic compound calculated to produce the desired therapeutic effect in association with the required pharmaceutical vehicle. The dosage unit forms of the invention are dictated by and directly dependent on (a) the unique characteristics of the therapeutic compound and the particular therapeutic effect to be achieved, and (b) the limitations inherent in the art of compounding/formulating such a therapeutic compound for the treatment of a disease in a subject.

Compounds of the invention for administration may be in the range of from about 1 mg to about 10,000 mg, about 20 mg to about 9,500 mg, about 40 mg to about 9,000 mg, about 75 mg to about 8,500 mg, about 150 mg to about 7,500 mg, about 200 mg to about 7,000 mg, about 3050 mg to about 6,000 mg, about 500 mg to about 5,000 mg, about 750 mg to about 4,000 mg, about 1 mg to about 3,000 mg, about 10 mg to about 2,500 mg, about 20 mg to about 2,000 mg, about 25 mg to about 1,500 mg, about 50 mg to about 1,000 mg, about 75 mg to about 900 mg, about 100 mg to about 800 mg, about 250 mg to about 750 mg, about 300 mg to about 600 mg, about 400 mg to about 500 mg, and any and all whole or partial increments therebetween.

In some embodiments, the dose of a compound of the invention is from about 1 mg and about 2,500 mg. In some embodiments, a dose of a compound of the invention used in compositions described herein is less than about 10,000 mg, or less than about 8,000 mg, or less than about 6,000 mg, or less than about 5,000 mg, or less than about 3,000 mg, or less than about 2,000 mg, or less than about 1,000 mg, or less than about 500 mg, or less than about 200 mg, or less than about 50 mg. Similarly, in some embodiments, a dose of a second compound (i.e., a drug used for treating the same or another disease as that treated by the compositions of the invention) as described herein is less than about 1,000 mg, or less than about 800 mg, or less than about 600 mg, or less than about 500 mg, or less than about 400 mg, or less than about 300 mg, or less than about 200 mg, or less than about 100 mg, or less than about 50 mg, or less than about 40 mg, or less than about 30 mg, or less than about 25 mg, or less than about 20 mg, or less than about 15 mg, or less than about 10 mg, or less than about 5 mg, or less than about 2 mg, or less than about 1 mg, or less than about 0.5 mg, and any and all whole or partial increments thereof.

In certain embodiments, the present invention is directed to a packaged pharmaceutical composition comprising a container holding a therapeutically effective amount of a compound or conjugate of the invention, alone or in combination with a second pharmaceutical agent; and instructions for using the compound or conjugate to treat, prevent, or reduce one or more symptoms of a disease in a subject.

The term "container" includes any receptacle for holding the pharmaceutical composition. For example, in certain embodiments, the container is the packaging that contains the pharmaceutical composition. In other embodiments, the container is not the packaging that contains the pharmaceutical composition, i.e., the container is a receptacle, such as a box or vial that contains the packaged pharmaceutical composition or unpackaged pharmaceutical composition and the instructions for use of the pharmaceutical composition. Moreover, packaging techniques are well known in the art. It should be understood that the instructions for use of the pharmaceutical composition may be contained on the packaging containing the pharmaceutical composition, and as such the instructions form an increased functional relationship to the packaged product. However, it should be understood that the instructions may contain information pertaining to the compound's ability to perform its intended function, e.g., treating or preventing a disease in a subject, or delivering an imaging or diagnostic agent to a subject.

Pharmaceutical Compositions

The present invention provides a pharmaceutical composition comprising at least one nucleic acid molecule of the present invention and a pharmaceutically acceptable carrier. The formulations of the pharmaceutical compositions described herein may be prepared by any method known or hereafter developed in the art of pharmacology. In general, such preparatory methods include the step of bringing the active ingredient into association with a carrier or one or more other accessory ingredients, and then, if necessary or desirable, shaping or packaging the product into a desired single- or multi-dose unit.

Although the description of pharmaceutical compositions provided herein are principally directed to pharmaceutical compositions which are suitable for ethical administration to humans, it will be understood by the skilled artisan that such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and perform such modification with merely ordinary, if any, experimentation. Subjects to which administration of the pharmaceutical compositions of the invention is contemplated include, but are not limited to, humans and other primates, mammals including commercially relevant mammals such as non-human primates, cattle, pigs, horses, sheep, cats, and dogs.

Pharmaceutical compositions that are useful in the methods of the invention may be prepared, packaged, or sold in formulations suitable for ophthalmic, oral, rectal, vaginal, parenteral, topical, pulmonary, intranasal, buccal, or another route of administration. Other contemplated formulations include projected nanoparticles, liposomal preparations, resealed erythrocytes containing the active ingredient, and immunologically-based formulations.

A pharmaceutical composition of the invention may be prepared, packaged, or sold in bulk, as a single unit dose, or as a plurality of single unit doses. As used herein, a "unit dose" is discrete amount of the pharmaceutical composition comprising a predetermined amount of the active ingredient. The amount of the active ingredient is generally equal to the dosage of the active ingredient which would be administered to a subject or a convenient fraction of such a dosage such as, for example, one-half or one-third of such a dosage.

The relative amounts of the active ingredient, the pharmaceutically acceptable carrier, and any additional ingredients in a pharmaceutical composition of the invention will vary, depending upon the identity, size, and condition of the subject treated and further depending upon the route by which the composition is to be administered. By way of example, the composition may comprise between 0.1% and 100% (w/w) active ingredient.

In addition to the active ingredient, a pharmaceutical composition of the invention may further comprise one or more additional pharmaceutically active agents. Other active agents useful in the present invention include anti-inflammatories, including corticosteroids, and immunosuppressants, chemotherapeutic agents, antibiotics, antivirals, antifungals, and the like.

Controlled- or sustained-release formulations of a pharmaceutical composition of the invention may be made using conventional technology, using for example proteins equipped with pH sensitive domains or protease-cleavable fragments. In some cases, the dosage forms to be used can be provided as slow or controlled-release of one or more active ingredients therein using, for example, hydroxypropylmethyl cellulose, other polymer matrices, gels, permeable membranes, osmotic systems, multilayer coatings, microparticles, liposomes, or microspheres or a combination thereof to provide the desired release profile in varying proportions. Suitable controlled-release formulations known to those of ordinary skill in the art, including those described herein, can be readily selected for use with the pharmaceutical compositions of the invention. Thus, single unit dosage forms suitable for oral administration, such as tablets, capsules, gel-caps, and caplets, which are adapted for controlled-release are encompassed by the present invention.

In certain embodiments, the formulations of the present invention may be, but are not limited to, short-term, rapid-offset, as well as controlled, for example, sustained release, delayed release and pulsatile release formulations.

The term sustained release is used in its conventional sense to refer to a drug formulation that provides for gradual release of a drug over an extended period of time, and that may, although not necessarily, result in substantially constant blood levels of a drug over an extended time period. The period of time may be as long as a month or more and should be a release that is longer that the same amount of agent administered in bolus form.

For sustained release, the compounds may be formulated with a suitable polymer or hydrophobic material that provides sustained release properties to the compounds. As such, the compounds for use the method of the invention may be administered in the form of microparticles, for example, by injection or in the form of wafers or discs by implantation.

In exemplary embodiments of the invention, the compounds of the invention are administered to a subject, alone or in combination with another pharmaceutical agent, using a sustained release formulation.

The term delayed release is used herein in its conventional sense to refer to a drug formulation that provides for an initial release of the drug after some delay following drug administration and that may, although not necessarily, includes a delay of from about 10 minutes up to about 12 hours.

The term pulsatile release is used herein in its conventional sense to refer to a drug formulation that provides release of the drug in such a way as to produce pulsed plasma profiles of the drug after drug administration.

The term immediate release is used in its conventional sense to refer to a drug formulation that provides for release of the drug immediately after drug administration.

As used herein, short-term refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes and any or all whole or partial increments thereof after drug administration after drug administration.

As used herein, rapid-offset refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes, and any and all whole or partial increments thereof after drug administration.

As used herein, "additional ingredients" include, but are not limited to, one or more of the following: excipients; surface active agents; dispersing agents; inert diluents; granulating and disintegrating agents; binding agents; lubricating agents; sweetening agents; flavoring agents; coloring agents; preservatives; physiologically degradable compositions such as gelatin; aqueous vehicles and solvents; oily vehicles and solvents; suspending agents; dispersing or wetting agents; emulsifying agents, demulcents; buffers; salts; thickening agents; fillers; emulsifying agents; antioxidants; antibiotics; antifungal agents; stabilizing agents; and pharmaceutically acceptable polymeric or hydrophobic materials. Other "additional ingredients" which may be included in the pharmaceutical compositions of the invention are known in the art and described, for example in Remington's Pharmaceutical Sciences (1985, Genaro, ed., Mack Publishing Co., Easton, PA), which is incorporated herein by reference.

Routes of administration of any of the compositions of the invention include oral, nasal, rectal, parenteral, sublingual, transdermal, transmucosal (e.g., sublingual, lingual, (trans) buccal, (trans) urethral, vaginal (e.g., trans- and perivaginally), (intra) nasal, and (trans) rectal), intravesical, intrapulmonary, intraduodenal, intragastrical, intrathecal, subcutaneous, intramuscular, intradermal, intra-arterial, intravenous, intrabronchial, inhalation, and topical administration.

Suitable compositions and dosage forms include, for example, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for intravesical administration and the like. The formulations and compositions that would be useful in the present invention are not limited to the particular formulations and compositions that are described herein.

As used herein, "parenteral administration" of a pharmaceutical composition includes any route of administration characterized by physical breaching of a tissue of a subject and administration of the pharmaceutical composition through the breach in the tissue. Parenteral administration thus includes, but is not limited to, administration of a pharmaceutical composition by injection of the composition, by application of the composition through a surgical incision, by application of the composition through a tissue-penetrating non-surgical wound, and the like. In particular, parenteral administration is contemplated to include, but is not limited to, intraocular, intravitreal, subcutaneous, intraperitoneal, intramuscular, intrasternal injection, intratumoral, and kidney dialytic infusion techniques.

Formulations of a pharmaceutical composition suitable for parenteral administration comprise the active ingredient combined with a pharmaceutically acceptable carrier, such as sterile water or sterile isotonic saline. Such formulations may be prepared, packaged, or sold in a form suitable for bolus administration or for continuous administration. Injectable formulations may be prepared, packaged, or sold in unit dosage form, such as in ampules or in multi-dose containers containing a preservative. Formulations for parenteral administration include, but are not limited to, suspensions, solutions, emulsions in oily or aqueous vehicles, pastes, and implantable sustained-release or biodegradable formulations. Such formulations may further comprise one or more additional ingredients including, but not limited to, suspending, stabilizing, or dispersing agents. In certain embodiments of a formulation for parenteral administration, the active ingredient is provided in dry (i.e. powder or granular) form for reconstitution with a suitable vehicle (e.g. sterile pyrogen-free water) prior to parenteral administration of the reconstituted composition.

Kits

The invention also provides kits stimulating PRR activity, inducing an IFN response, and/or treating cancer, as elsewhere described herein. In certain embodiments, the kit includes a composition comprising a nucleic acid molecule and another therapeutic agent, as described herein elsewhere, and instructions for its use. The instructions will generally include information about the use of the compositions in the kit for the stimulation of PRR activity and/or treatment of cancer. The instructions may be printed directly on a container inside the kit (when present), or as a label applied to the container, or as a separate sheet, pamphlet, card, or folder supplied in or with the container.

The invention also provides kits for the treatment or prevention of a disease, disorder, or condition in which IFN production would be beneficial. In certain embodiments, the kit includes a composition (e.g. a pharmaceutical composition) comprising a nucleic acid molecule and another therapeutic agent, as described herein elsewhere, and instructions for its use. The instructions will generally include information about the use of the compositions in the kit for the treatment or prevention of a disease or disorder or symptoms thereof. The instructions may be printed directly on a container inside the kit (when present), or as a label applied to the container, or as a separate sheet, pamphlet, card, or folder supplied in or with the container.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction and/or treatment conditions, with art-recognized alternatives and using no more than routine experimentation, are within the scope of the present application.

EXPERIMENTAL EXAMPLES

The invention is further described in detail by reference to the following experimental examples. These examples are provided for purposes of illustration only, and are not intended to be limiting unless so specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out exemplary embodiments of the present invention, and are not to be construed as limiting in any way the remainder of the disclosure.

Example 1: In Vivo Studies

The efficacy of a Stem Loop RNA (SLR-RG) agonist of RIG 1 RIG-I, alone or in combination of an anti-PD-1 can be tested in a subcutaneous syngeneic mouse tumor model. For example, CT-26 (colon), RENCA (kidney), and LL2 (lung) are cancer cell lines that are partially responsive to anti-PD-1. The study can use 7 groups of animals (with 10 animals per group): control (isotype+vehicle), anti-PD-1+vehicle, isotype+SLR-RG (high dose), anti-PD-1+SLR-RG (high dose), anti-PD-1+SLR-RG (medium dose), anti-PD-1+SLR-RG (low dose), isotype+CpG.

The immunological memory by re-challenge following intra-tumor treatment with SLR-RG in the study described herein can be evaluated. In this case, mice that achieved complete regression in the study described herein can be re-challenged the same tumor cell line into a contra-lateral flank 2-3 weeks post tumor eradication.

Figure 5:
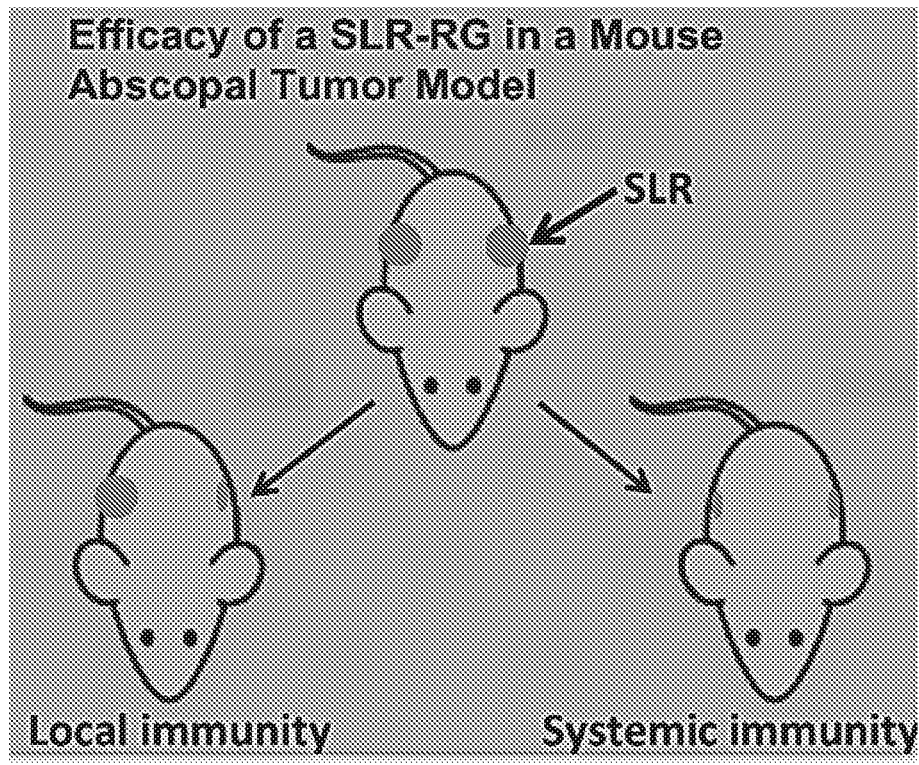
FIG. 5 illustrates how efficacy of a SLR-RG can be evaluated in a mouse abscopal tumor model.
Figure 6:
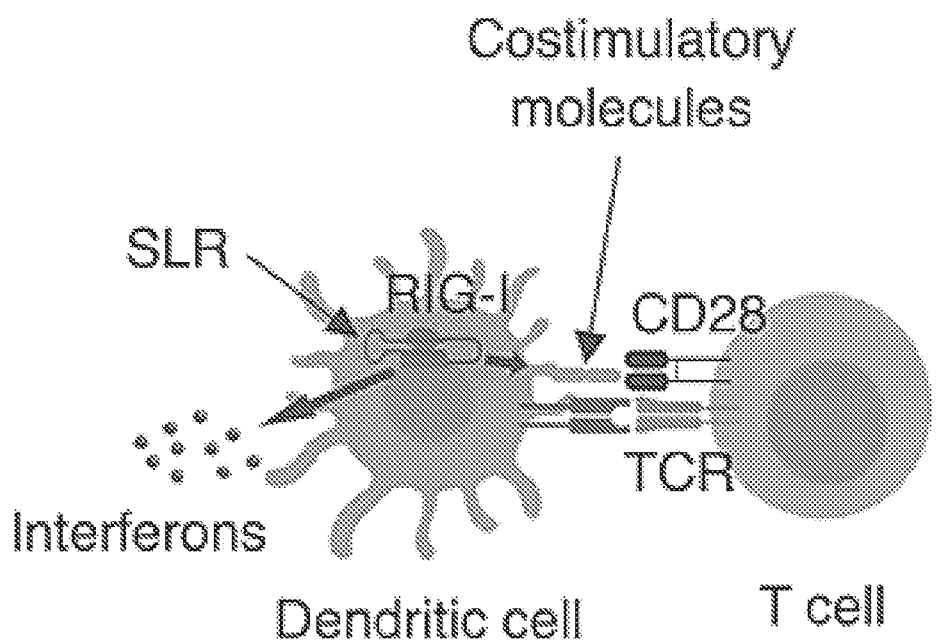
FIG. 6 illustrates a non-limiting mechanism of action for a SLR in a dendritic cell.

Efficacy of a SLR-RG can be evaluated in a mouse abscopal tumor model (see FIG. 5).

Efficacy of a SLR-RG can be evaluated in a 4T1 spontaneous metastatic tumor model. The study can use 5 groups of animals (with 16 animals per group): vehicle (intratumor), vehicle (intravenous), SLR-RG (intratumor, with effectyive dose determined in the mouse abscopal tumor model), SLR-RG (intravenous), and CpG (intratumor).

Efficacy of a SLR-RG vs. CpG can be determined in a humanized NSG or humanized NOG-EXL mice. Panc08.13 can for example be used in the study. The study can use 3 groups of animals (with 8 animals per group): SLR-RG (intratumor), CpG (intratumor), and vehicle control.

Example 2

Figure 7:
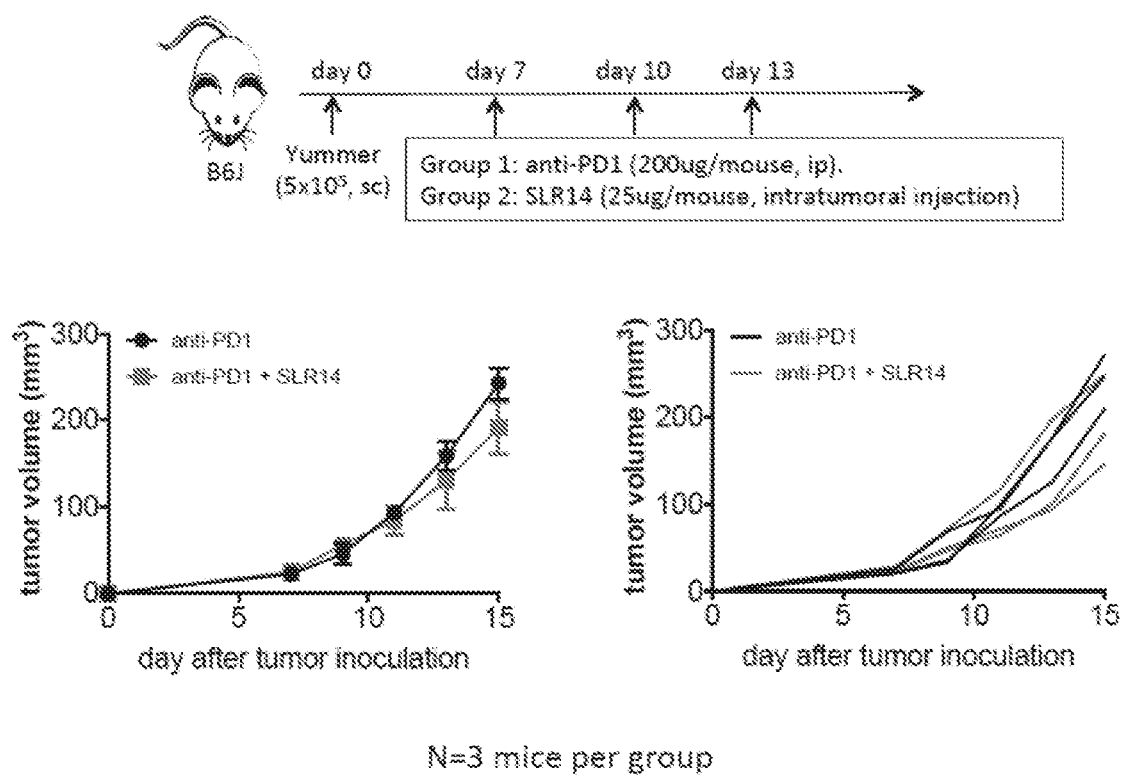
FIG. 7 illustrates certain results from an in vivo study where B6 mice with a YUMMER melanoma xenograph were co-treated with SLR14 and/or anti-PD1 therapy.
Figure 8:
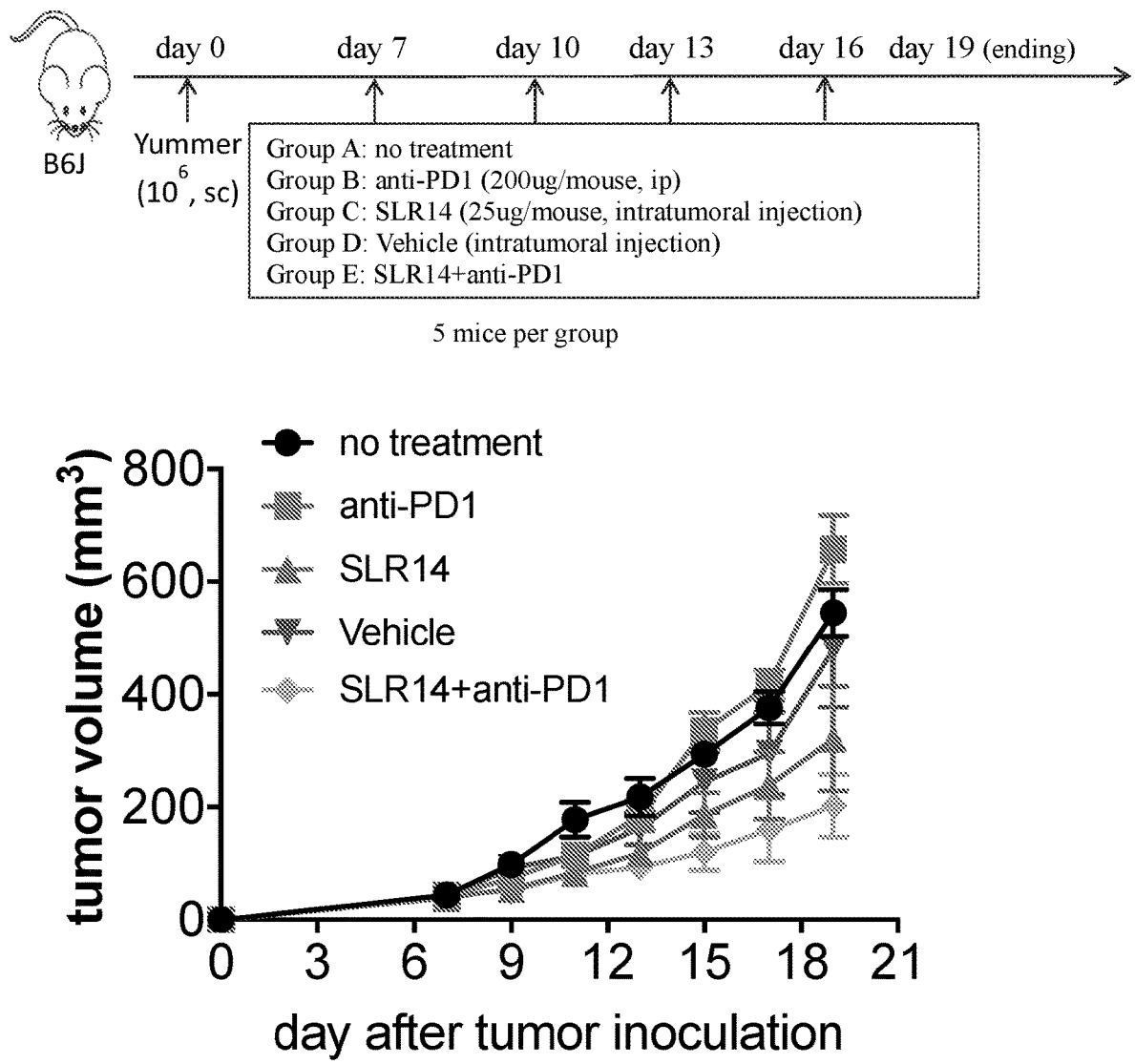
FIG. 8 illustrates certain results from an in vivo study where B6 mice with a YUMMER 1.7 melanoma xenograph were co-treated with SLR14 and/or anti-PD1 therapy.
Figure 9:
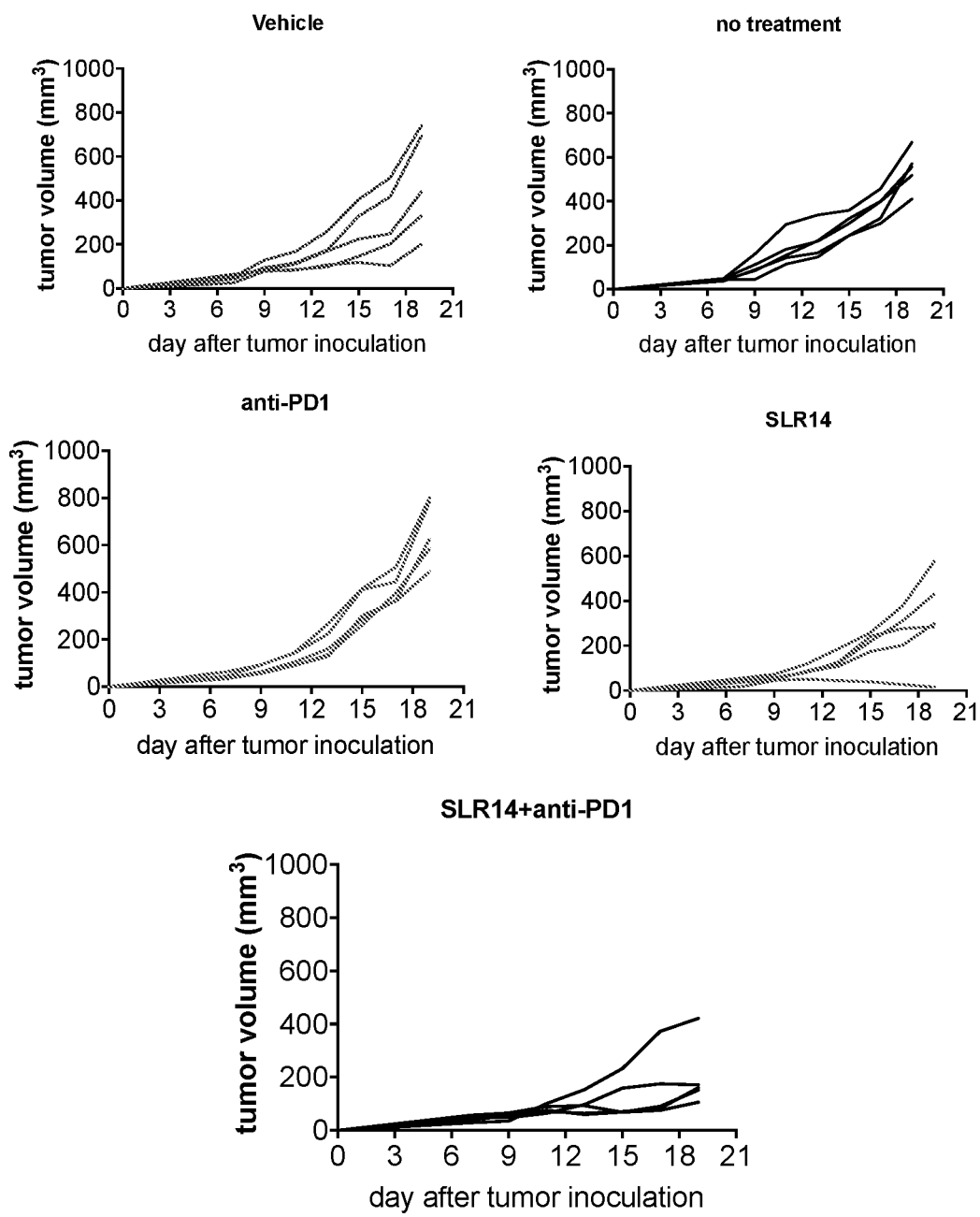
FIG. 9 comprises individual tumor volume measurements for each distinct mouse group as outlined in FIG. 8.
Figure 10:
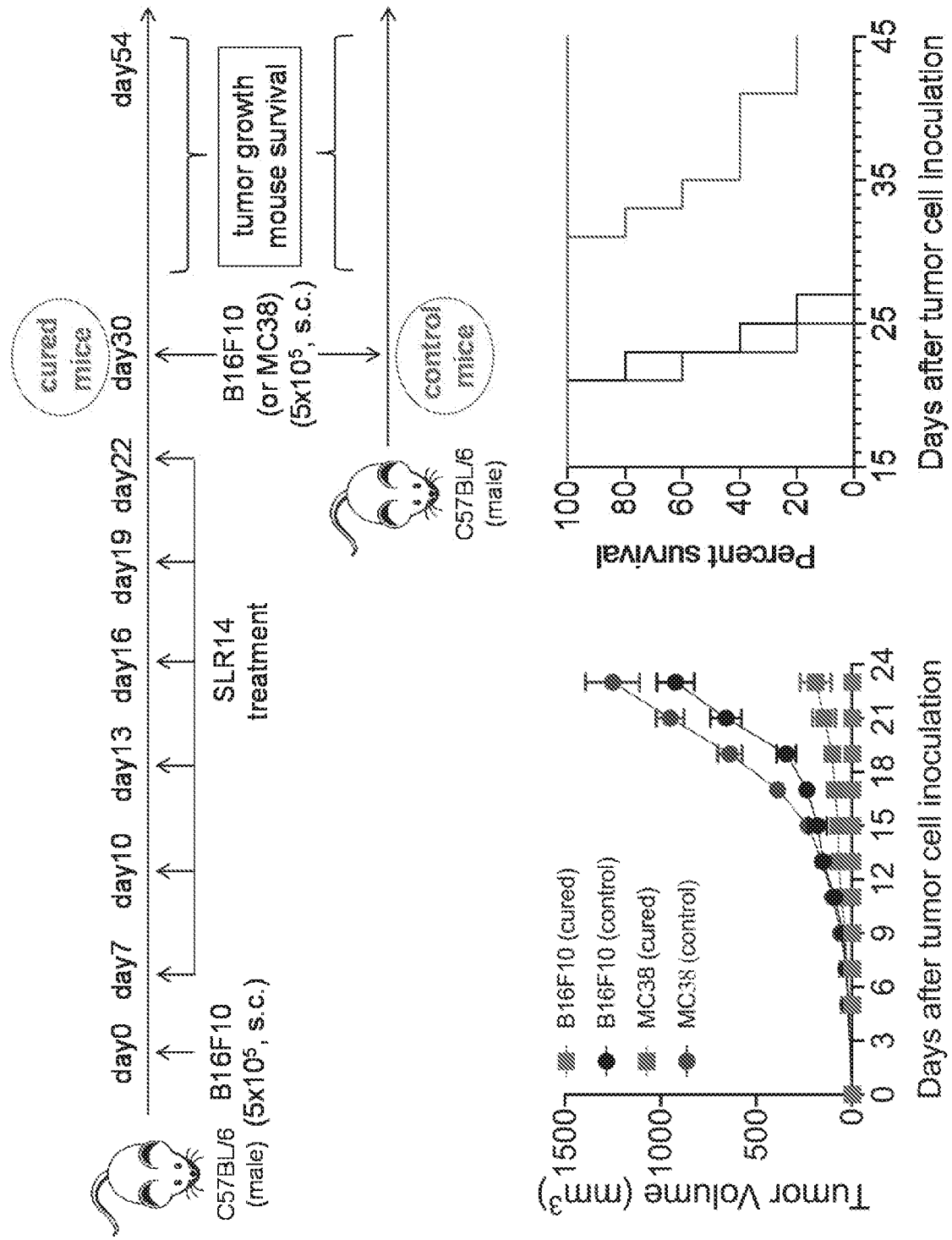
FIG. 10 illustrates the finding that mice with SLR14-cured tumors have a memory response to tumor rechallenge.
Figure 11:
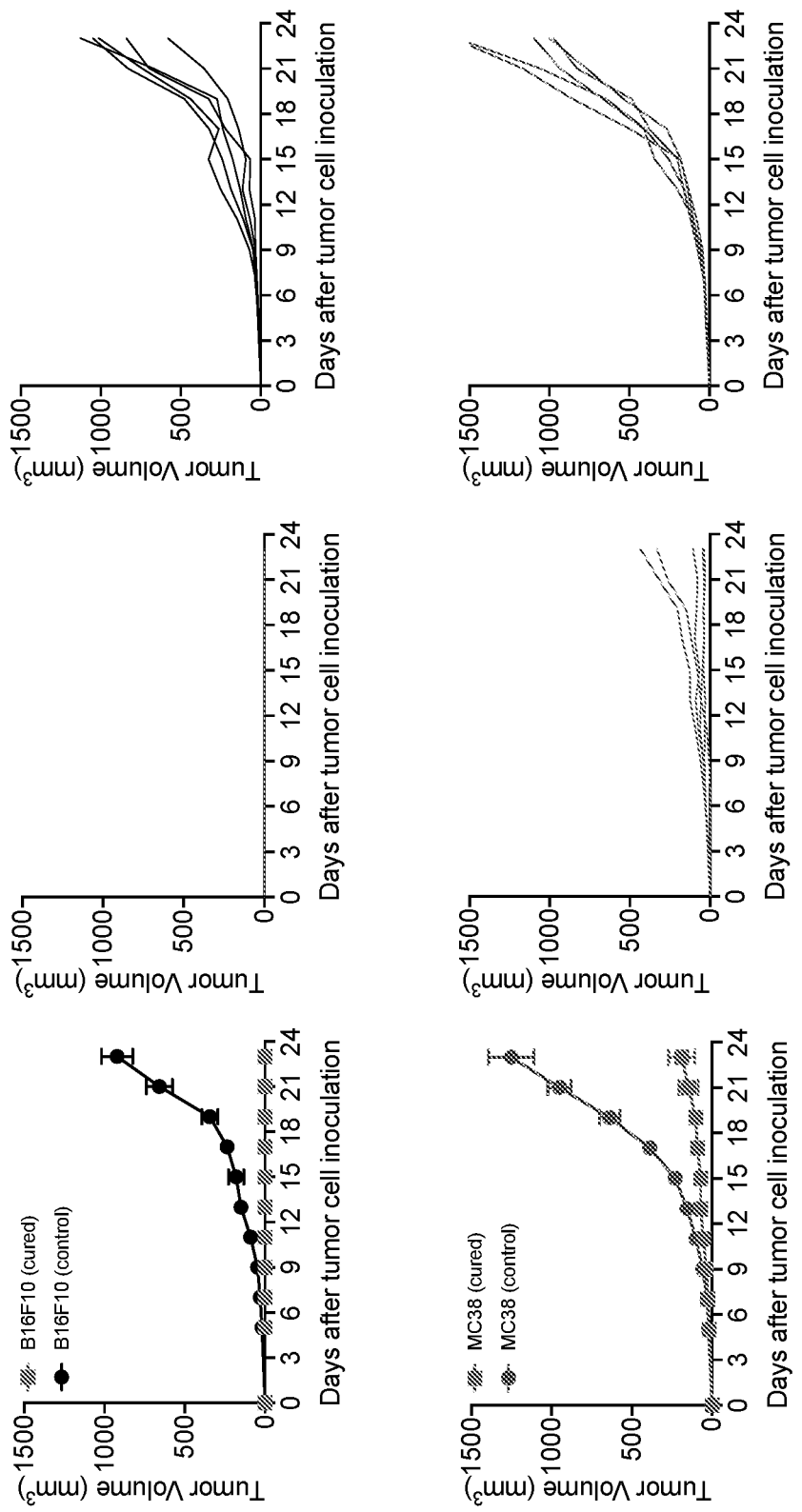
FIG. 11 illustrates certain tumor growth curves in mice after challenge with same or different tumor.

FIG. 7 illustrates certain results relating to an in vivo study where B6 mice were co-treated with SLR14 and anti-PD1 therapy. As illustrated by the graphs, mice treated with a combination of SLR14 and anti-PD1 showed slower tumor volumes that mice treated only with anti-PD1.

Example 3

The effect of base sequence, double-stranded section length (i.e., base pair number), and loop identity in the ability of SLRs to induce interferon response was investigated. The following SLRs were prepared and tested for their ability to inhibit RIG-I activity. Interferon response in HEK-293T cells with selected SLRs is illustrated in FIG. 12.

| Description | Sequence (putative loop residues underlined) |
|---|---|
| Parental molecule - 5'-ppp8L | 5'ppp-GGCG CGGC <u>UUCG</u> GCCG CGCC-3' SEQ ID NO: 2 |
| SLR-8GC | 5' ppp-GGCG CGGG <u>UUCG</u> CCCG CGCC SEQ ID NO: 3 |
| SLR-9GC | 5' ppp-G GCGC CGGG <u>UUCG</u> CCCG GCGC C SEQ ID NO: 4 |
| Parental molecule - SLR-10 | 5' ppp-GG ACGU ACGU <u>UUCG</u> ACGU ACGU CC SEQ ID NO: 5 |
| SLR-8 | 5' ppp-GGCG ACGU <u>UUCG</u> ACGU CGCC SEQ ID NO: 6 |
| SLR-9 | 5' ppp-G GCGU ACGU <u>UUCG</u> ACGU ACGC C SEQ ID NO: 7 |
| Parental molecule SLR-14 | 5'-ppp-GG AUCG AUCG AUCG <u>UUCG</u> CGAU CGAU CGAU CC SEQ ID NO: 1 |
| SLR-14T1 | 5'-ppp-GG AUCG AUCG AUCG <u>GAAC</u> CGAU CGAU CGAU CC SEQ ID NO: 8 |
| SLR-14T2 | 5'-ppp-GG AUCG AUCG AUCG <u>CUUG</u> CGAU CGAU CGAU CC SEQ ID NO: 9 |
| SLR-14U5 | 5'-ppp-GG AUCG AUCG AUCG <u>UUUUU</u> CGAU CGAU CGAU CC SEQ ID NO: 10 |
| SLR-14PH | 5'-ppp-GG AUCG AUCG AUCG <u>ACAAUGC</u> CGAU CGAU CGAU CC SEQ ID NO: 11 |
| SLR-14Ab5 | 5'-ppp-GG AUCG AUCG AUCG <u>AbAbAbAbAb</u> CGAU CGAU CGAU CC, SEQ ID NO: 12 Ab = ribo abasic nucleotide |
| SLR-14S18 | 5'-ppp-GG AUCG AUCG AUCG <u>U(OCH$_2$CH$_2$)$_6$G</u> CGAU CGAU CGAU CC SEQ ID NO: 13-(OCH$_2$CH$_2$)$_6$-SEQ ID NO: 14 |

Figure 12:
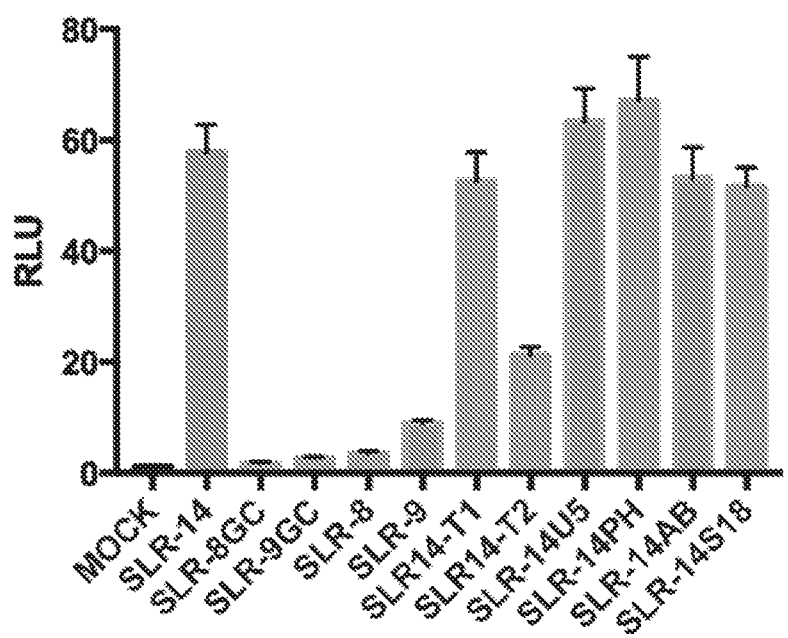
FIG. 12 is a graph illustrating interferon response in HEK-293T cells contacted with selected SLRs of the invention.
Figure 13A:
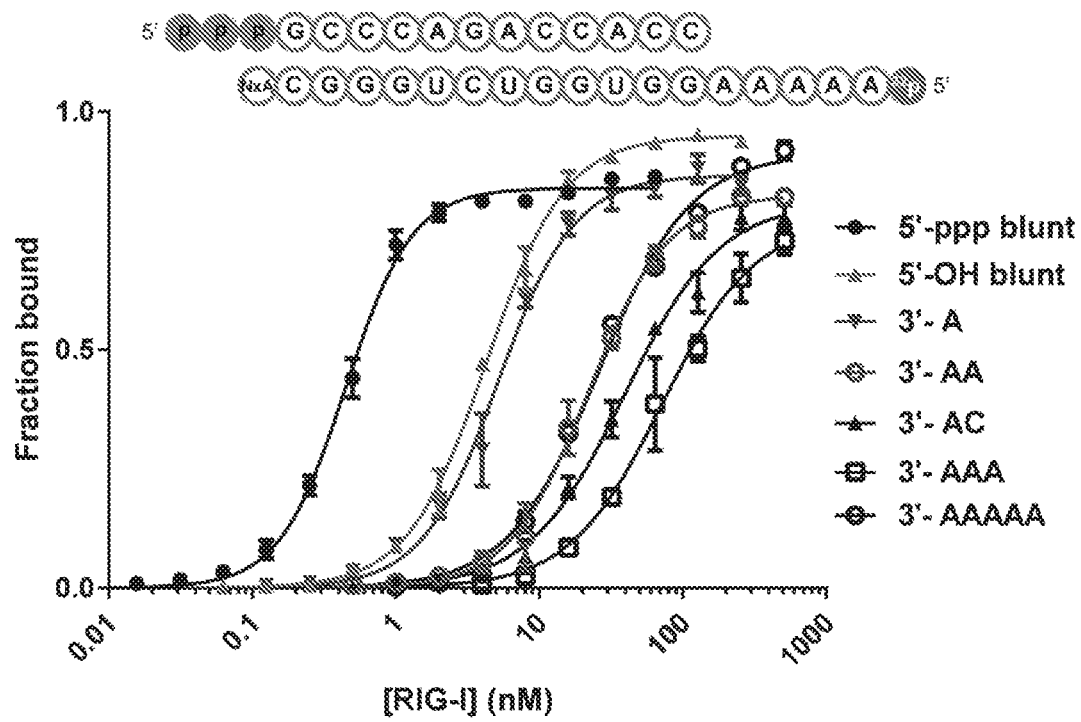
FIGS. 13A-13B are a set of graphs illustrating the effect of 3'-overhang on the bottom strand on binding and signaling of RIG-I.
Figure 13B:
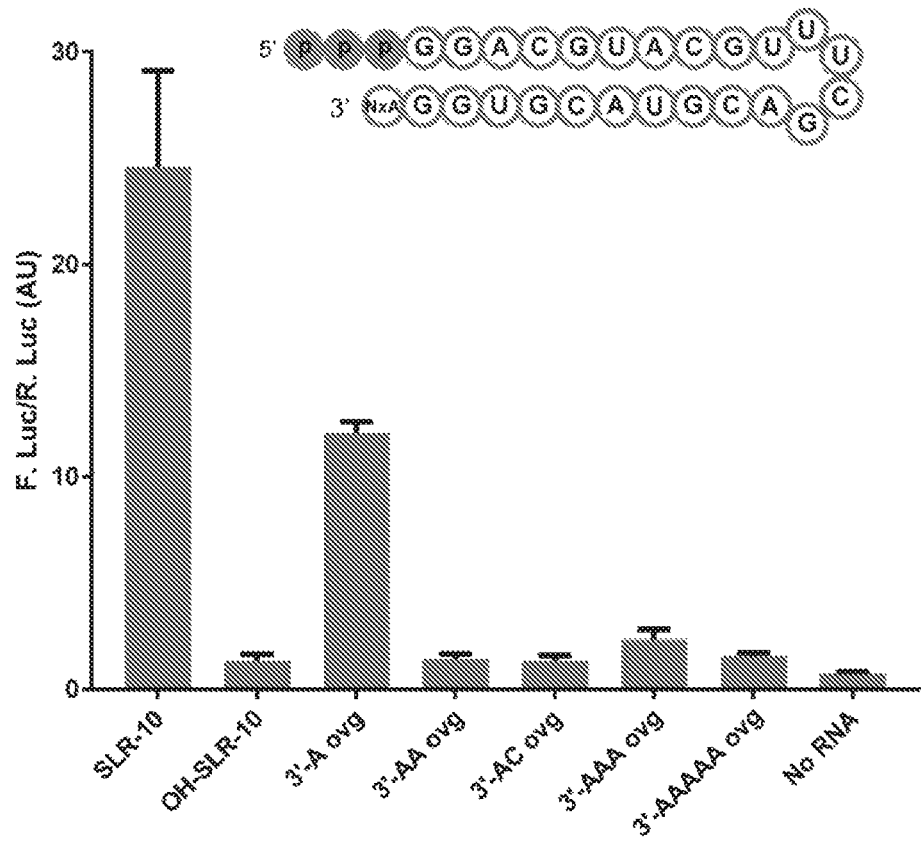
Figure 14C:
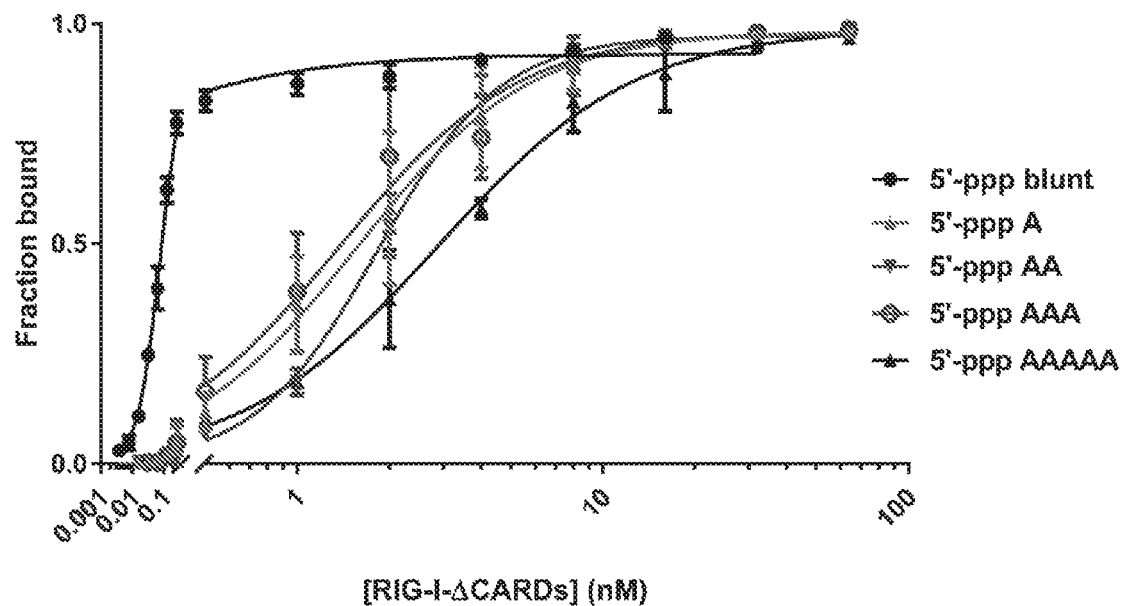
Figure 14D:
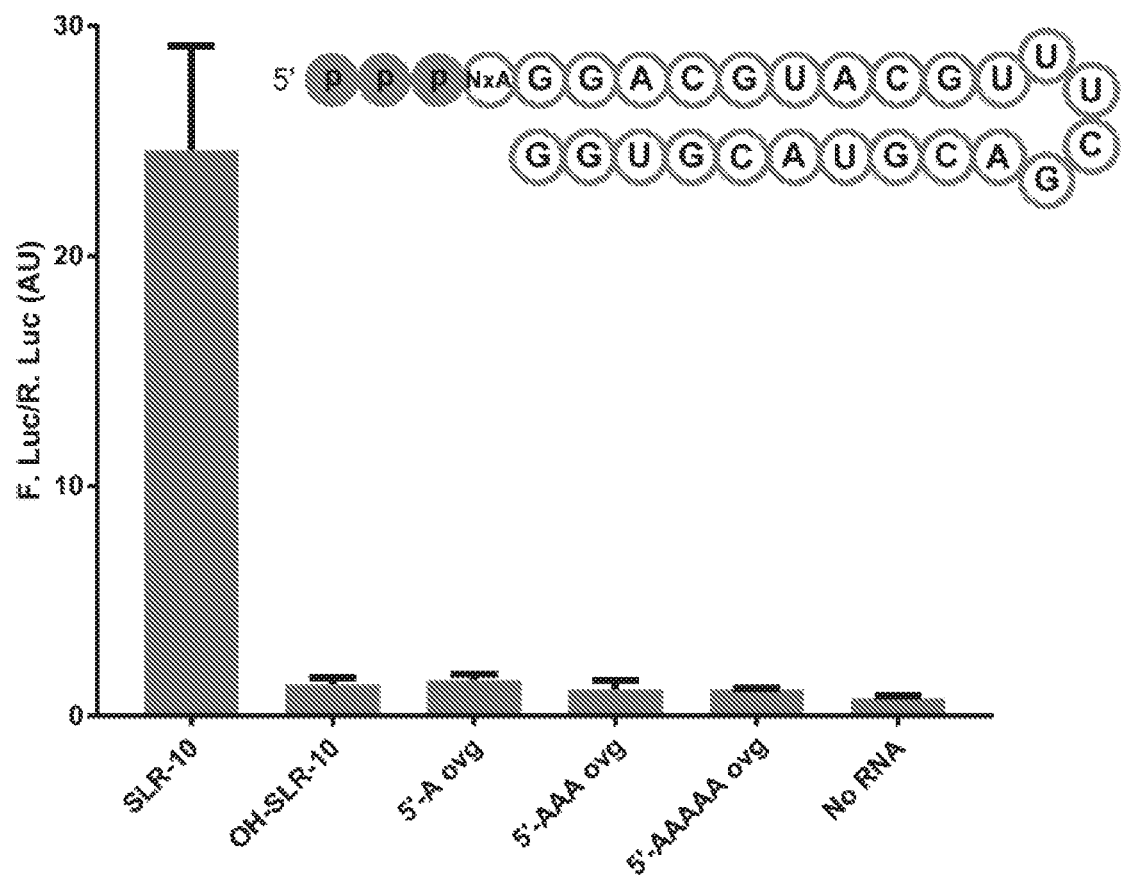

As demonstrated in FIG. 12, SLRs with a shorter double-stranded section (8 base pairs; SLR-8) had low, but detectable activity when compared to the control molecule (SLR-14), and the 9-base pair SLR (SLR-9) had reduced, but measurable activity when compared to SLR-14.

It was also observed that the activity of the SLR depends on the identity and sequence of the bases in the double-stranded section (see, for example, SLR-9GC vs. SLR-9, and SLR-8GC vs. SLR-8).

Further, the experiments showed that the loop could be replaced with an abasic nucleotide linker or a non-phosphate linker (such as polyethylene glycol) without significant loss of activity (see, for example, SLR-14Ab5 and SLR14S18, respectively, vs. SLR-14). In certain embodiments, such linker are not substrates to nucleases, and thus more stable in vitro or in vivo.

Example 4

The effect of the presence of 3'-overhangs or 5'-overhangs in the ability of SLRs to induce interferon response was investigated. As demonstrated in FIGS. 13A-13B and 14A-14D, SLRs with any length of 5'-overhang were essentially inactive. However, SLRs with a single 3'-overhang nucleotide residue were active, and SLRs with multiple 3'-overhanging nucleotides had reduced but significant levels of activity.

Example 5

This study relates to the in vivo antitumor effect of SLR14 in different types of tumor model by intratumoral (i.t.) delivery.

Materials and Methods

Mice and Tumor Cells

C57BL/6J and C57BL/6J RAG1$^{-/-}$ mice were purchased from the Jackson Laboratory, bred, and housed in pathogen-free conditions. 8~12-week old male mice (~25 g per mouse) were used for experiments.

Three mouse tumor cell lines were used in this study: B16F10 melanoma cells and MC38 colon cancer cells were cultured in DMEM with 10% FBS and 1% antibiotics; while the melanoma cell line YUMMER1.7 cells (Wang, et al., 2017, Pigment Cell Melanoma Res 30(4): 428-435) were maintained in DMEM/F12 media containing 10% FBS, 1% nonessential amino acids and 1% penicillin-streptomycin.

Synthesis, Purification, and Labeling of the SLR-14 Oligonucleotide

The triphosphorylated RNA oligonucleotide SLR-14 (5'pppGG AUCG AUCG AUCG UUCG CGAU CGAU CGAU CC; SEQ ID NO:1) was synthesized (Mihaylova, et al., 2018, Cell Rep 24 (11): 3000-3007.e3) with slight modification. Briefly, removal of the oligonucleotide from the polymer support and base deprotection was performed in a 1:1 mixture of 40% methylamine (Sigma) and 30% ammonium hydroxide (JT Baker) at 65° C. for 15 min. The solution was cooled on ice for 10 min, transferred to a new vial and evaporated to dryness. Then 500 µl of absolute ethanol was added and the mixture was evaporated to dryness again. In order to deprotect the 2'-OH groups, the dry oligonucleotide was incubated with 500 µl of the 1M solution of tetrabutylammonium fluoride (TBAF) in tetrahydrofuran (THF) (Sigma) at room temperature for 36 h. Then 500 µl of 2M sodium acetate (pH 6.0) was added, the solution was evaporated to a 500-600 µl volume, extracted with 3×800 µl of ethyl acetate and ethanol precipitated. The RNA oligonucleotide was then purified on a 16% denaturing polyacrylamide gel. One skilled in the art would have contemplated that any known methods of preparing a phosphorylated oligonucleotide would be useful within the present invention.

The purified SLR-14 oligonucleotide was dissolved in 200 µl of 0.25 M sodium bicarbonate buffer (pH 9.2). Then, a solution containing 0.5 mg of ALEXA FLUOR™ 647 NHS ester (Life Technologies Corp.) in 200 µl formamide was added, and the reaction mixture was incubated at room temperature for 2 hours. The labeled oligonucleotide (SLR14-647) was ethanol precipitated and purified on a 20% denaturing polyacrylamide gel.

In Vivo Tumor Injection and Treatment

Either $5\times10^5$ or $1\times10^6$ tumor cells were subcutaneously injected into the flank of naïve syngeneic mice. In some experiments, both right and left flanks were injected with equal numbers of same tumor cells. When tumor volume reached 40-80 mm$^3$ or >100 mm$^3$, 25 µg SLR14 was i.t. injected. Briefly, 25 µg SLR14 and 4 µl JETPEI® (POLY-PLUS® transfection) were diluted and mixed with 5% glucose solution in total 50 µl. After 15 minutes of incubation at room temperature, a 50 µl complex was carefully injected into tumor. i.t. injection every 2-3 days, for a total of 5-6 doses. The tumor-bearing mice with i.t. treatment of vehicle (JETPEI®) or water with 5% glucose (no treatment) were used as controls.

Flow Cytometry Analysis

The following anti-mouse antibodies obtained from BioLegend were used for the staining and analysis: anti-CD45 (30-F11), anti-CD3 (145-2C11), anti-CD4 (GK1.5), anti-CD8 (53-6.7), anti-CD44 (IM7), anti-FoxP3 (MF-14), anti-NK1.1 (PK136), anti-B220 (RA3-6B2), anti-CD11b (M1/70), anti-Ly6G (1A8), anti-Ly6C (HK1.4), anti-CD11c (N418), anti-I-A/I-E (M5/114.15.2). The intracellular staining was performed using the eBIOSCIENCE™ Intracellular Fixation & Permeabilization Buffer Set (88-8824-00). Dead cells were excluded using 7-AAD staining. The samples were run on BD LSRII flow cytometer and data was analyzed using FLOW JO™ software.

Statistical Analysis

Data is presented as the mean±standard deviation. Statistical significance in values between experimental groups was determined by paired t-test or one-way analysis of variance (ANOVA). p<0.05 was considered statistically significant (*p<0.05, ** p<0.01).

Selected results are discussed as follows.

Figure 15A:
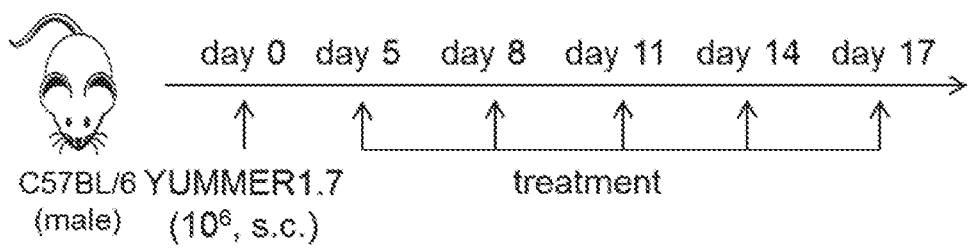
FIGS. 15A-15D illustrates the finding that intratumoral injection of SLR14 results in significant antitumor effect in YUMMER1.7 melanoma.
Figure 15B:
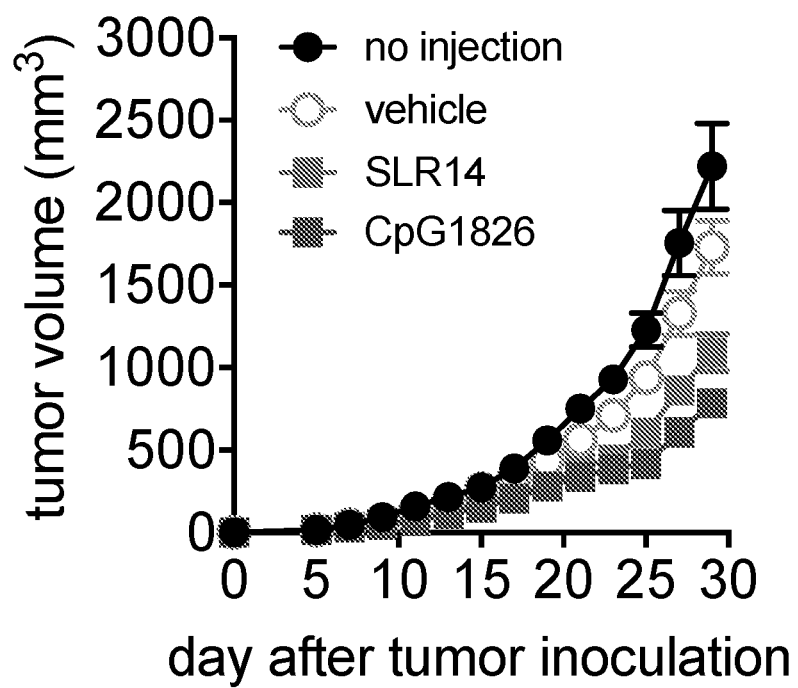

Intratumoral Injection of SLR14 Results in Significant Antitumor Effects:

Subcutaneous YUMMER1.7 melanoma mouse model was used to evaluate the antitumor effect of SLR14 in vivo (FIG. 15A). YUMMER1.7 tumors are irradiated YUMM 1.7 cells, which carries three driver mutations: BrafV600E, Pten−/− and Cdkn2a−/− (Meeth, et al., 2016, Pigment Cell Melanoma Res 29 (5): 590-597). YUMMER1.7 cells carry high somatic mutation load and recruit a large number of tumor-infiltrating lymphocytes (TILs) when injected in vivo. JETPEI® was used as the vehicle to deliver SLR14 transfection intratumorally to focus immune activation to the tumor and its local environment. Both JETPEI® and i.t. administration have been successfully used in other in vivo tumor studies. The mice treated with CpG1826, JETPEI® (vehicle), or water with 5% glucose (no treatment) were used as controls.

After 5 doses of i.t. injection, a significant delay of tumor growth was observed in SLR14- or CpG-treated mice (FIG.

Figure 15C:
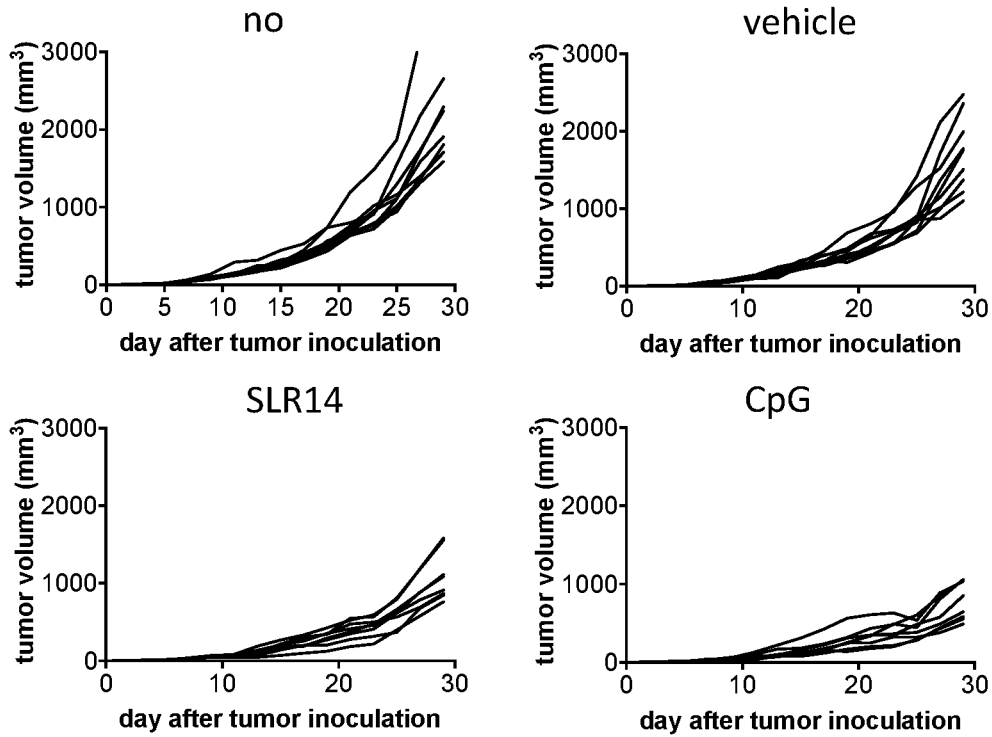
Figure 15D:
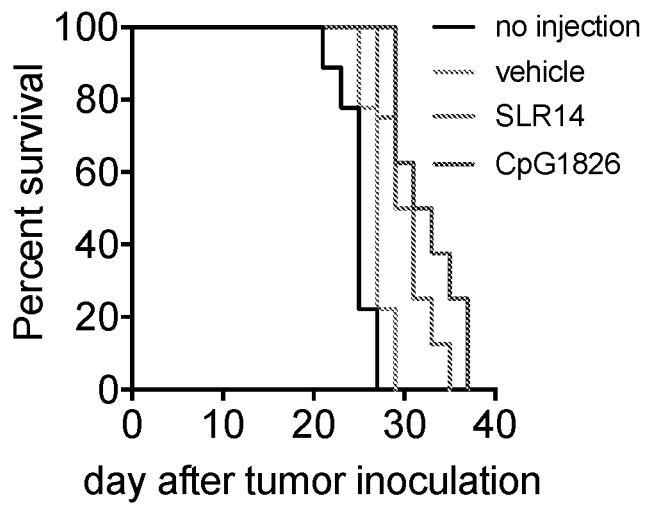
Figure 22A:
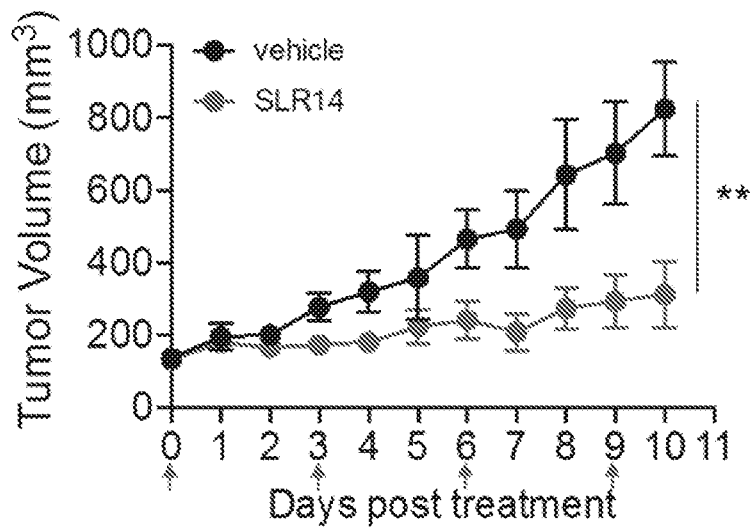
FIGS. 22A-22B illustrate the finding that intratumoral SLR14 delivery induces potent antitumor effect in MC38 colon cancer. $5 \times 10^5$ MC38 cells in 100 µl PBS were injected s.c. into the right flank of C57BL/6J mice. When tumor volume reached at least 100 mm$^3$, the mice with similar tumor volume were randomly divided into 2 groups (5 mice per group) and treated i.t. with SLR14 or vehicle, respectively. The treatments were performed every 3 days, for a total of 4 doses. Tumor growth was monitored every day.
Figure 22B:
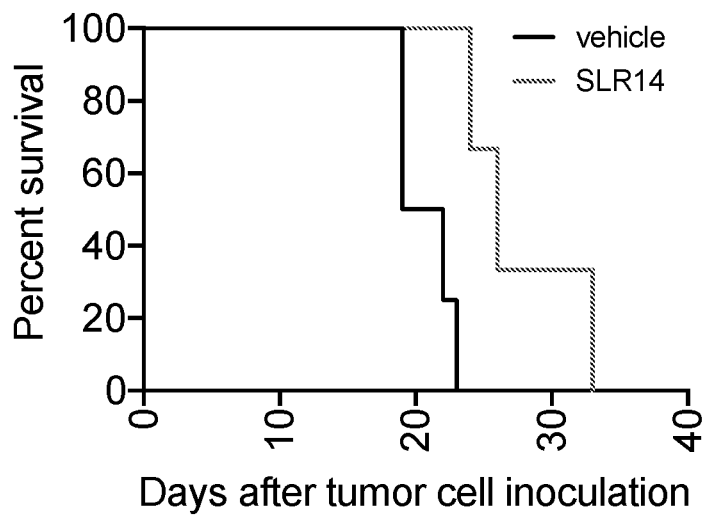

15B). CpG had a slightly better treatment efficacy than SLR14. Although the tumors in vehicle-treated mice were slightly smaller than those in control mice, no statistically significant difference was observed between these two groups of mice. FIG. 15C shows the individual tumor growth in each group of mice (n=10). Mice were euthanized according to the animal protocol criteria (tumor volume >1 cm$^3$). SLR14- or CpG-treated mice displayed an improved survival course compared to vehicle treated group (FIG. 15D). A similar antitumor activity of SLR14 was observed in another immunogenic tumor model-MC38 colon cancer, even when the SLR14 injection was given at late stage when the tumor mass was already >100 mm$^3$ (FIGS. 22A-22B). Taken together, these results clearly demonstrate that SLR14, when delivered intratumorally, can induce a potent antitumor response against these immunogenic tumors.

Combination Treatment with SLR14 and Anti-PD1 Leads to Better Antitumor Effects than Single Treatment:

As YUMMER1.7 clearance depends on T cells, and is sensitive to immune checkpoint inhibitors including anti-CTLA4 and anti-PD1 (Meeth, et al., 2016, Pigment Cell Melanoma Res 29 (5): 590-597), it was examined if SLR14 and anti-PD1 combined treatment improve the antitumor efficacy of single treatment. To this end, YUMMER1.7-bearing mice were generated as described in FIG. 16A and treated with SLR14 (by i.t. injection), anti-PD1 (by intraperitoneal injection), or SLR14 plus anti-PD1, for a total of 5 doses. A significant delay of tumor growth was detected in the mice treated with SLR14 alone. Although no significant benefit was detected in the mice treated with single anti-PD1, a much more significant delay of tumor growth was observed in the mice with SLR14 and anti-PD1 combination treatment (FIs. 16B-16C). These findings indicate that SLR14 induces a synergistic antitumor effect when combined with immune checkpoint inhibitor anti-PD1 for YUMMER1.7 treatment.

SLR14 is Mainly Taken Up by CD11b+ Myeloid Cells in the Tumor Microenvironment:

RIG-I is ubiquitously expressed in all cell types including cancer cells. In certain non-limiting embodiments, RIG-I ligands can trigger RIG-I activation either in tumor cells directly leading to cancer cell apoptosis, or in immune cells (e.g. DCs) to induced cancer immunogenic cell death (ICD).

Figure 17A:
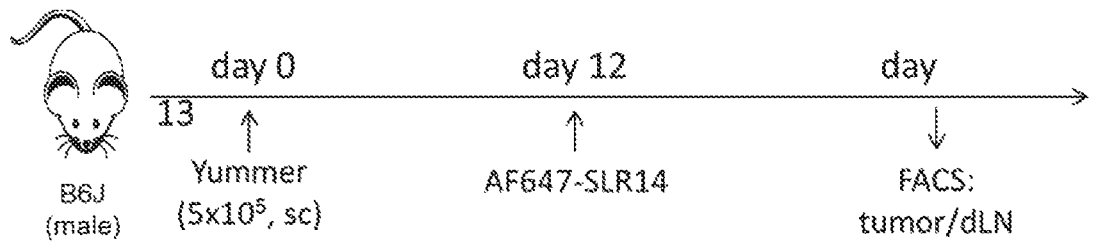
FIGS. 17A-17E illustrate the finding that SLR14 is mainly taken up by CD11b+ myeloid cells in the tumor microenvironment.
Figure 17B:
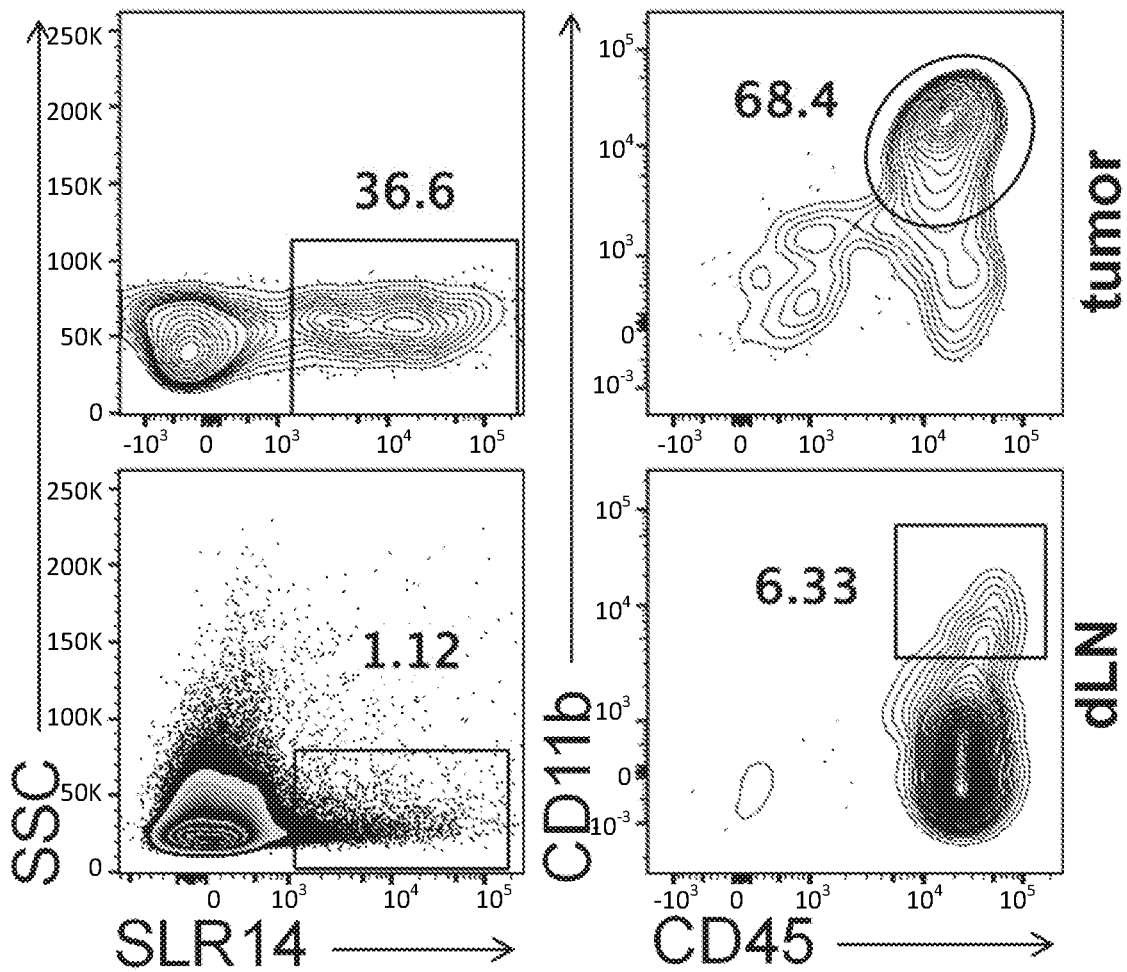
Figure 17C:
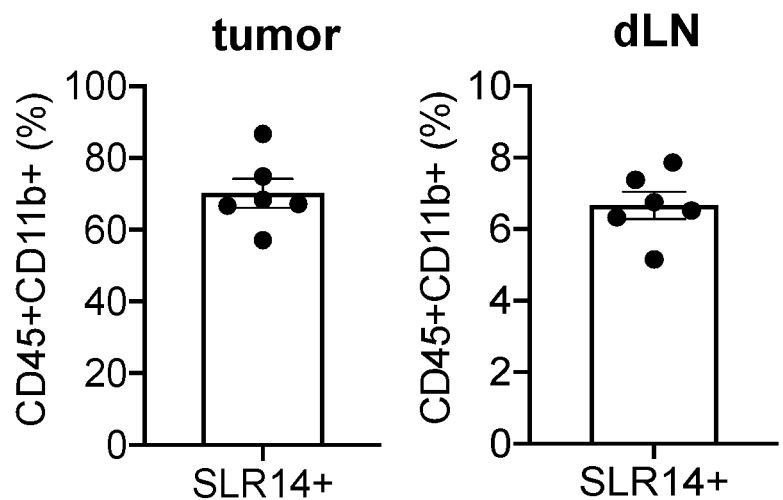
Figure 17D:
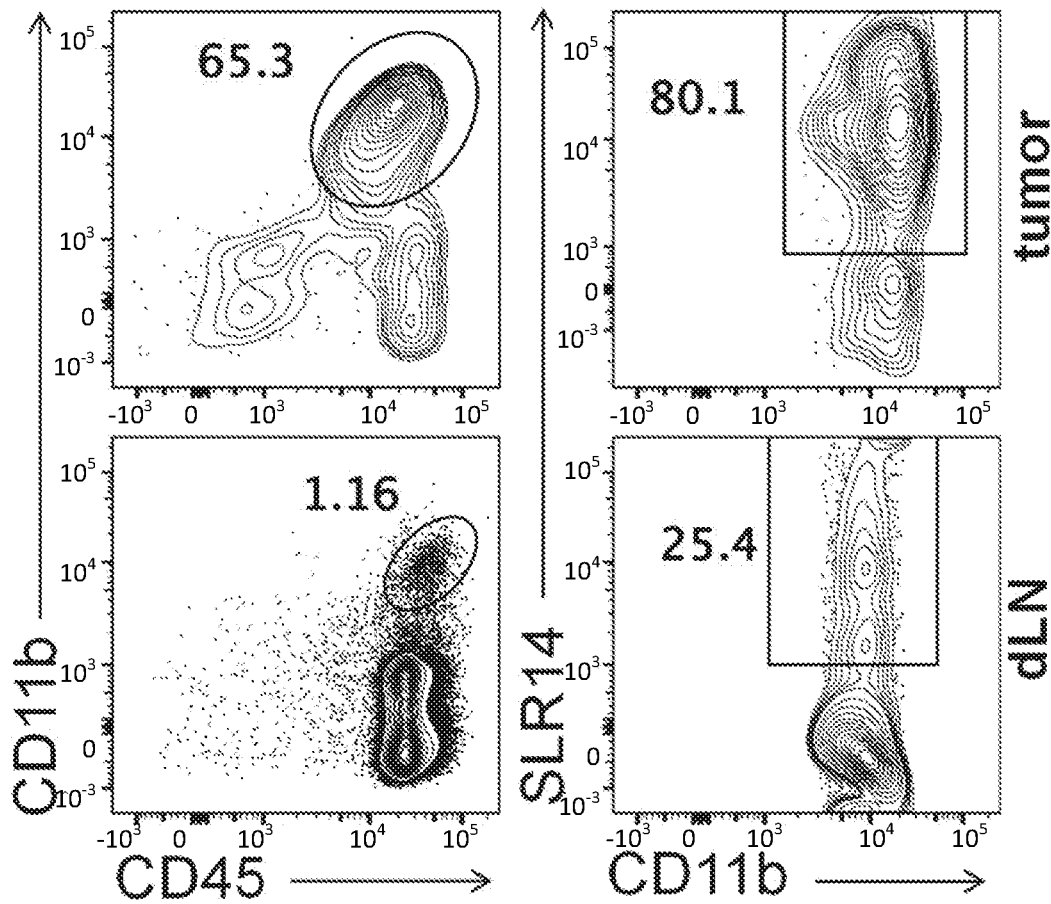
Figure 17E:
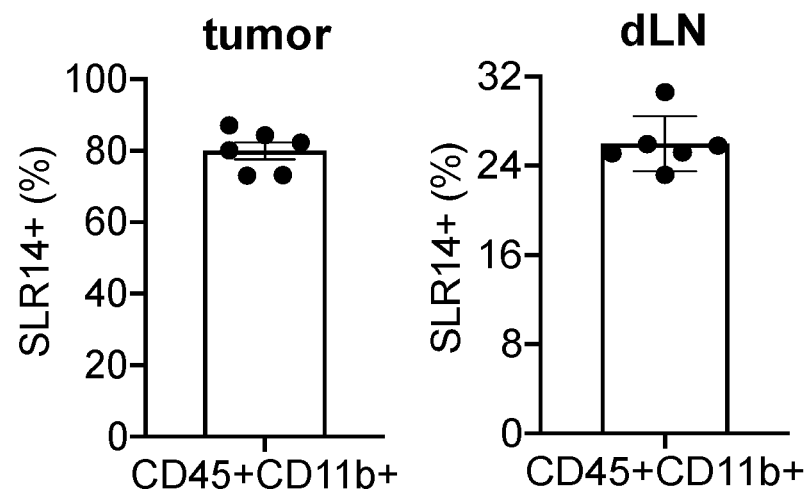
Figure 18A:
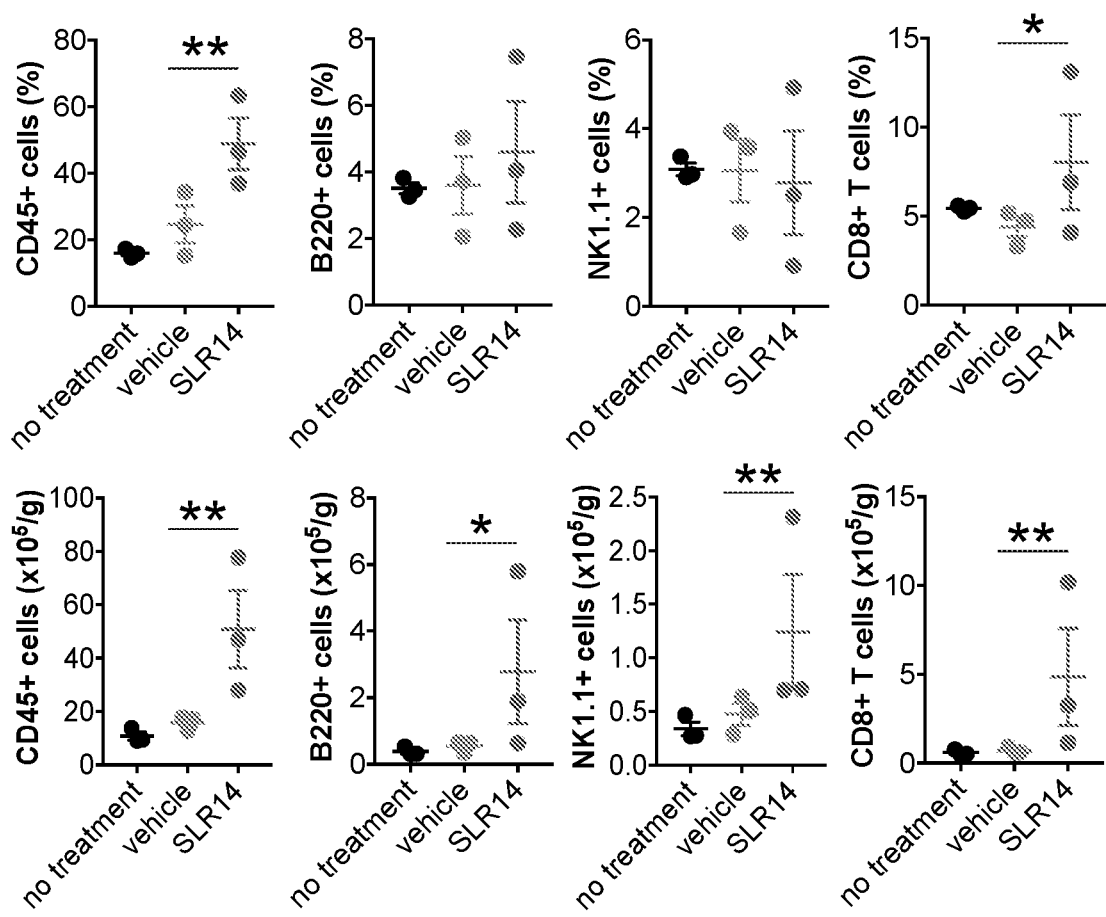
FIGS. 18A-18D illustrate the finding that intratumoral SLR14 delivery enhances tumor infiltration of cytotoxic T lymphocytes and myeloid cells. YUMMER1.7 melanoma was established in C57BL/6J mice and treated with SLR14 or vehicle as described in FIG. 15A. 3 days after last SLR14 treatment, tumors were harvested and digested with 0.5 mg/ml Collagenase D and 40 µg/ml DNase I. Single cell suspensions were used for flow cytometry analysis.
Figure 18B:
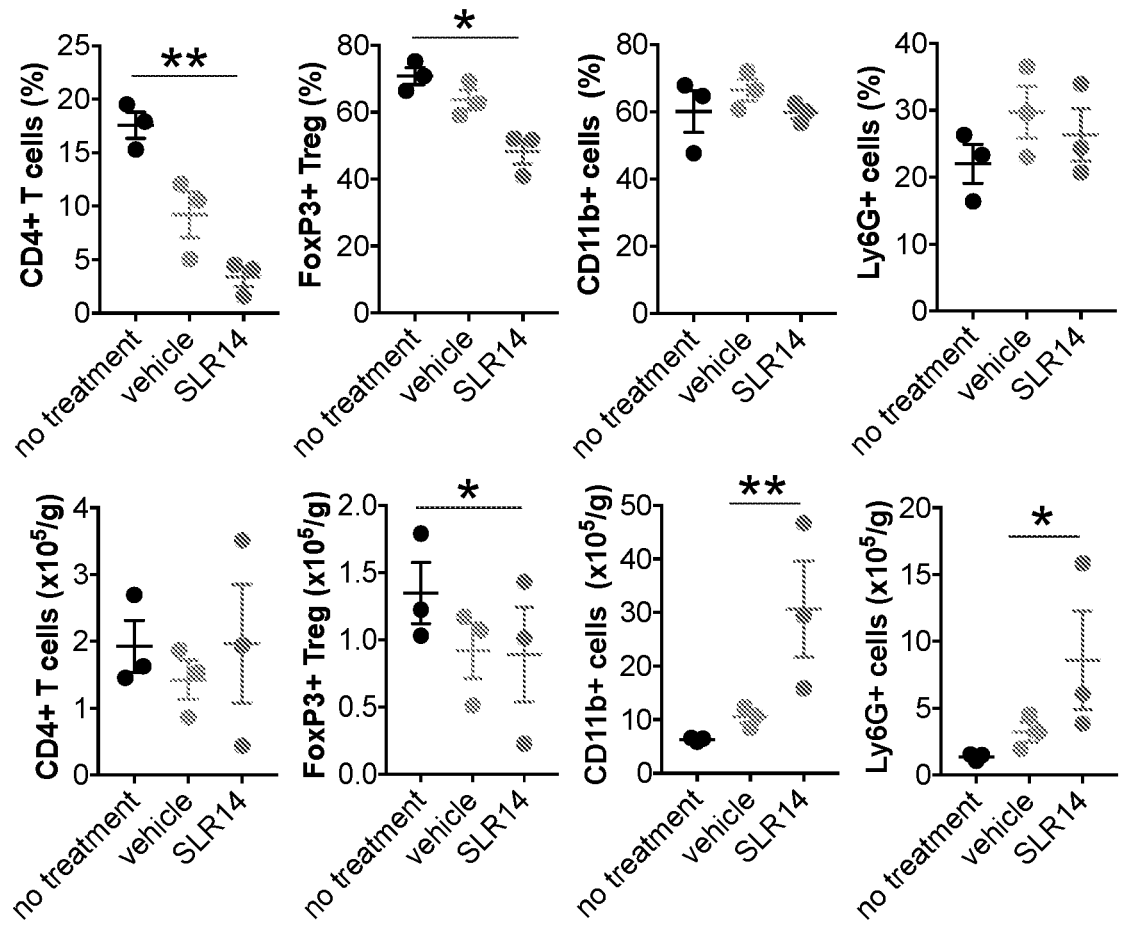
Figure 18C:
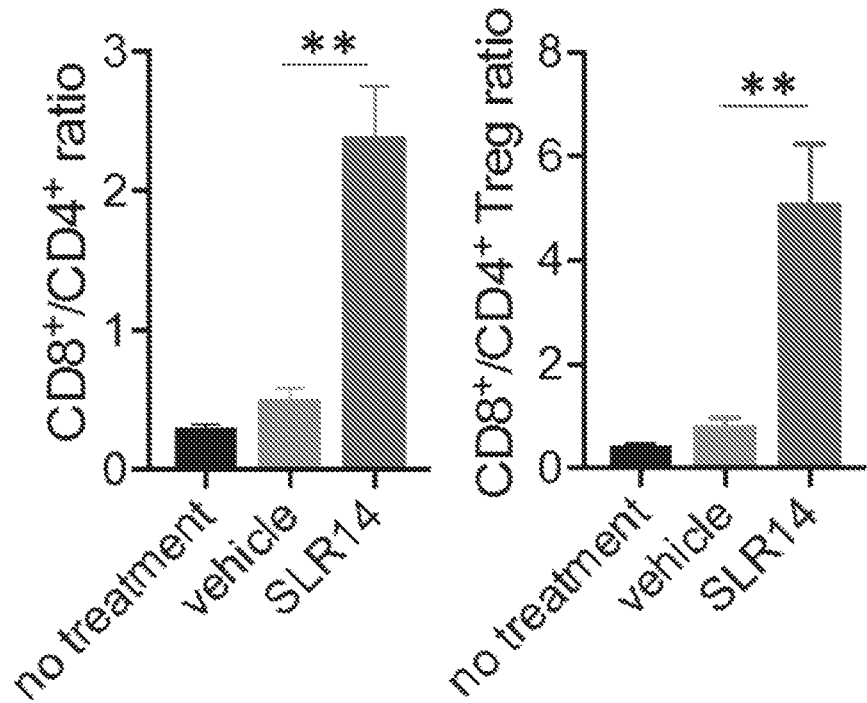
Figure 18D:
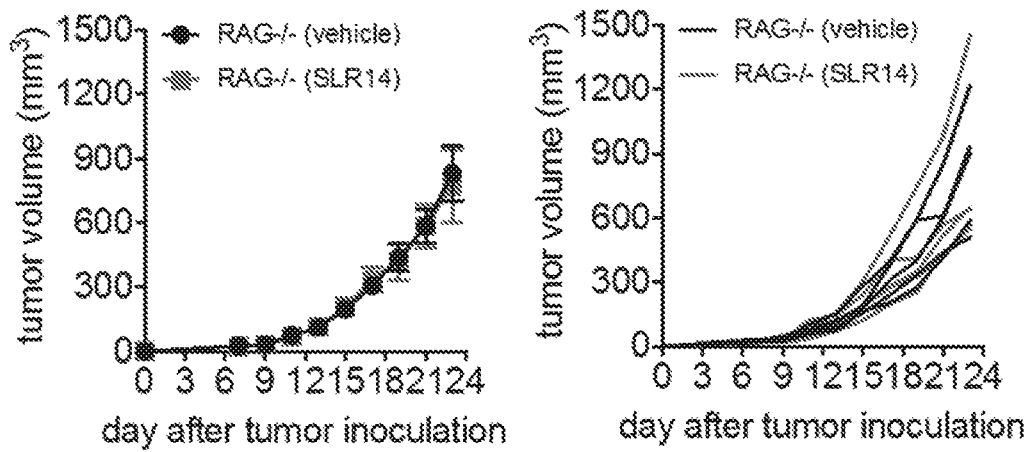

To determine whether SLR14, after i.t. injection, targets tumor cells or non-tumor cells, SLR14 was labeled with ALEXA FLUOR™ (AF) 647 and i.t. injected AF647-SLR14 into YUMMER17 at 12 days post tumor injection. One day later, tumor in SLR14-treated mice was harvested and single cell suspension was prepared for cell analysis by flow cytometry (FIG. 17A). The lymphocyte or non-lymphocyte populations of total alive cells in tumor were first gated for analysis of AF647+ cells. There were 3.13% or 17.6% AF647+ cells in lymphocyte or non-lymphocyte populations, respectively (FIGS. 17B-17E). These findings indicate that SLR14/JETPEI® complex was mainly taken up by non-lymphocytes in tumor after i.t. injection. As for AF647+ non-lymphocytes, most of them were CD45+ cells (79.9%), while a few were CD45-cells (18.7%). Further analysis revealed that these CD45+AF647+ cells were mainly comprised of CD11b+Ly6G+ neutrophils (82%) and other CD11b+ cells, including Ly6C+CD11c+MHC II+ DCs and Ly6C+ monocytes or macrophages (FIGS. 17B-17E). The nature of AF647+CD45-cells was not further analyzed. Without wishing to be limited by any embodiment, this population can include some tumor cells, as well as other stromal cells in the environment. The present studies revealed that SLR14 is mainly taken up by CD11b+ myeloid cells within the tumor after i.t. delivery.

Figure 16A:
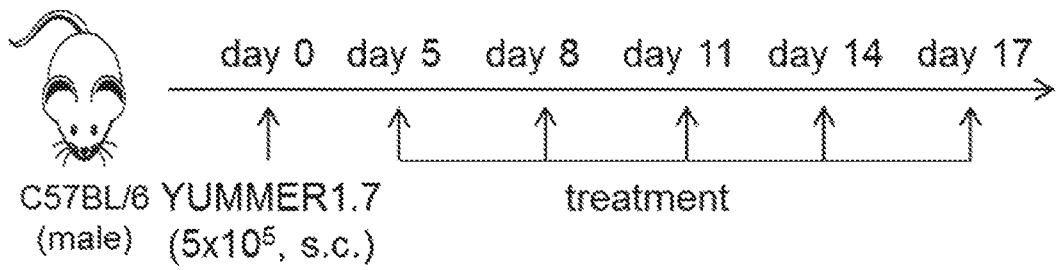
FIGS. 16A-16C illustrate the finding that combination treatment with SLR14 and anti-PD1 leads to better antitumor effects than single treatment.
Figure 16B:
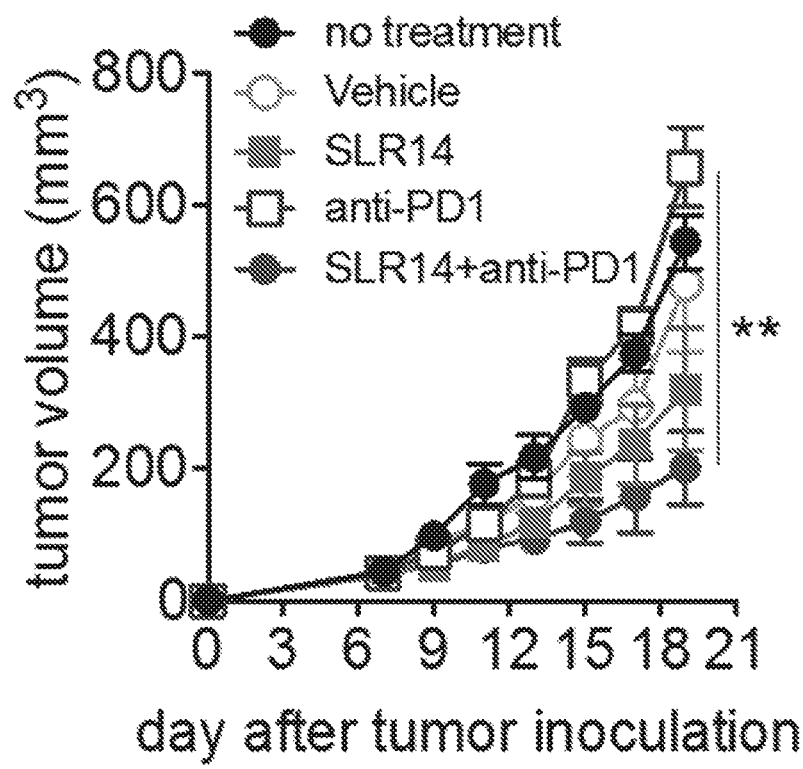

Intratumoral SLR14 Delivery Enhances Tumor Infiltration of Cytotoxic T Lymphocytes as Well as Myeloid Cells:

The present studies indicate that SLR14 is taken up by CD11b+ myeloid cells as well as non-leukocytes in tumor microenvironment, indicating that the antitumor efficacy of SLR14 in YUMMER1.7 may be mediated by ICD. To further elucidate which immune cells are involved in mediating antitumor immune response, YUMMER1.7-bearing mice were established and treated i.t. with SLR14, vehicle (JETPEI®), or water in 5% glucose (no treatment) as described in FIG. 15A. Three days after the last treatment, tumors were harvested for cell analysis by flow cytometry. As shown in FIG. 16A, SLR14 i.t. treatment induced a significant increase of tumor-infiltrating CD45+ leukocytes, including CD8+ T cells, B220+ cells, NK1.1+ cells, and CD11b+ myeloid cells, whereas CD4+FoxP3+ regulatory T cells (Treg) were significantly decreased. Of note, a 5- to 6-fold increase of CD8+/CD4+ or CD8+/CD4+ Treg ratio in SLR14-treated mice was found when compared to other groups of mice (FIG. 16B). Here all tumor-infiltrating CD4+ or CD8+ T cells were CD44+, indicating that they were activated or possibly antigen-experienced. The ratio of CD8+ to CD4+FoxP3+ Treg in tumor microenvironment is highly associated with the T cell-based immune response against tumor after treatment.

Figure 16C:
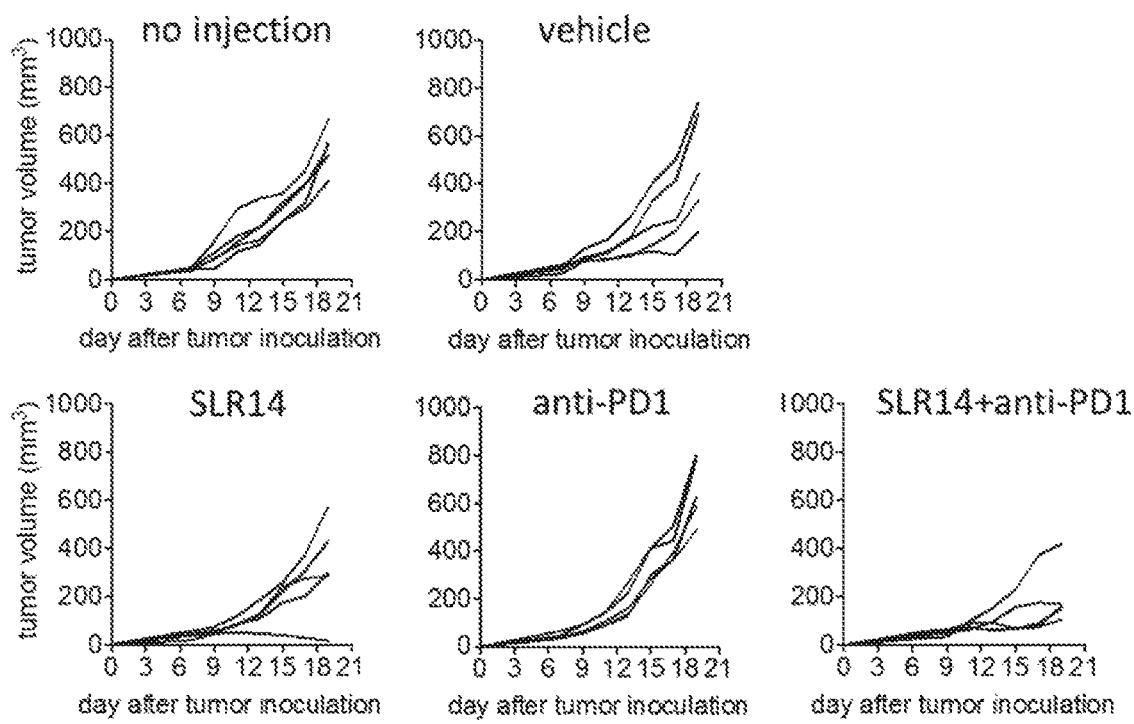

In certain non-limiting embodiments, tumor-infiltrating T cells, including both CD8+ and CD4+ Treg cells, can play an important role in SLR14-driven antitumor immunity. To test that, YUMMER1.7 tumor was established in RAG1−/− mice (lack of T cells and B cells) and these animals were treated i.t. with SLR14 or vehicle. No significant difference in tumor growth was observed between SLR14-treated and vehicle-treated mice (FIG. 16C), indicating that adaptive immune response is required for the clearance of YUMMER1.7 tumor following SLR14 treatment.

Figure 19A:
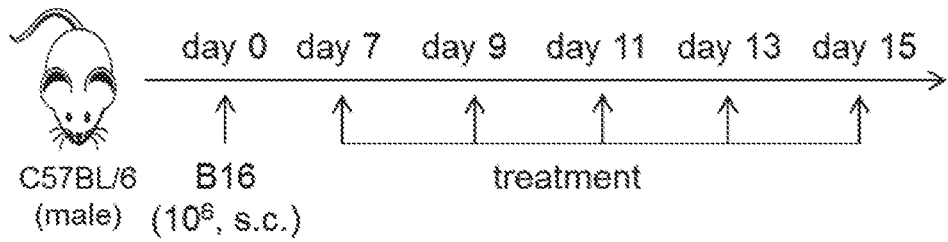
FIGS. 19A-19E illustrate the finding that SLR14 exhibits robust antitumor effect in B16F10 melanoma.
Figure 19B:
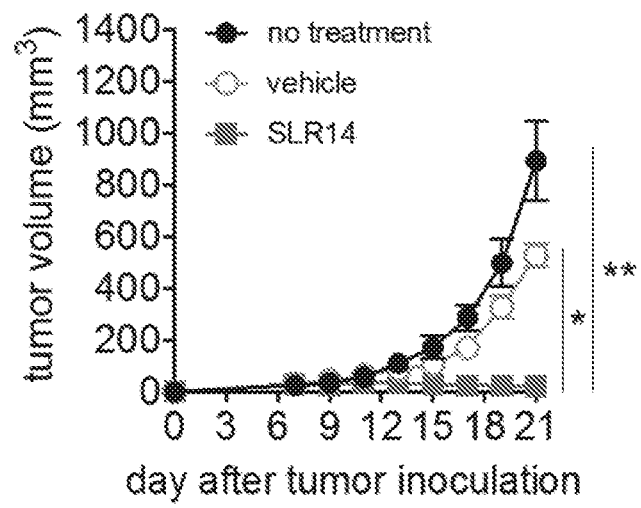
Figure 19C:
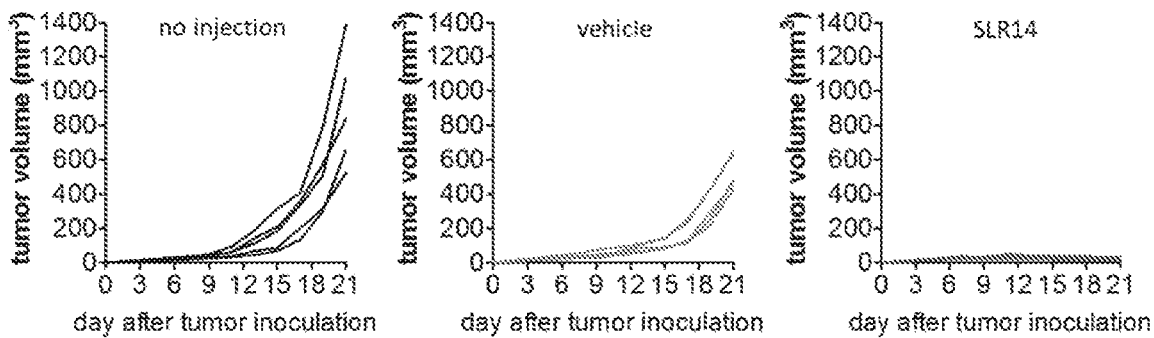
Figure 19D:
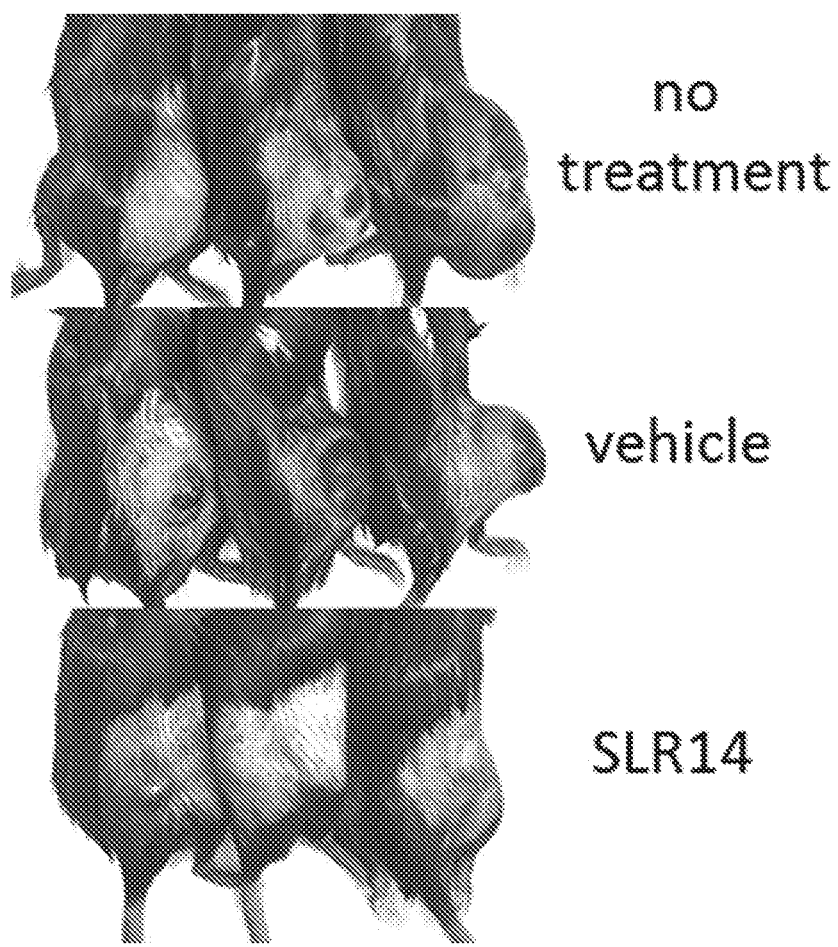
Figure 19E:
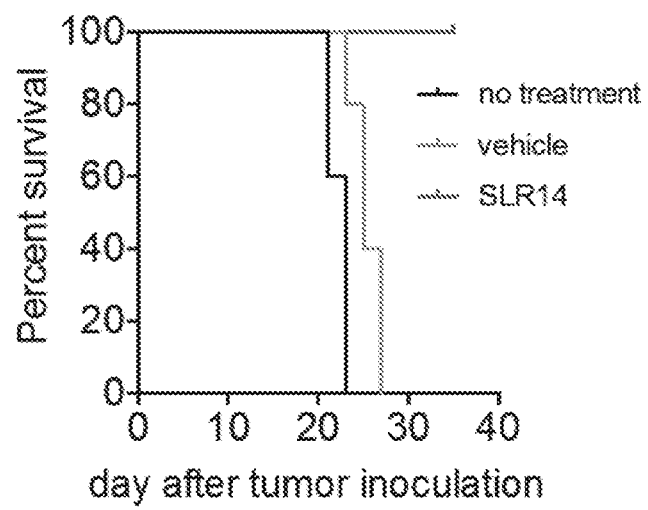

SLR14 Exhibits Robust Antitumor Effect in B16F10 Melanoma:

In experiments described elsewhere herein, immunogenic cancers YUMMER1.7 and MC38 were used to evaluate antitumor efficacy of SLR14 in vivo. To broadly assess the antitumor effect of SLR14, a poorly immunogenic B16F10 tumor was utilized in C57BL/6J mice and the effect of SLR14 treatment as assessed (FIG. 19A). The tumor growth in SLR14-treated mice was dramatically inhibited, whereas the tumors in the controls (vehicle-treated or 5% glucose) grew rapidly (FIGS. 19B-19C). Moreover, the sustained tumor growth inhibition in SLR14-treated mice could still be detected at 12 days post last treatment, when all tumors in the control mice already reached the euthanasia criteria (tumor volume >1 cm$^3$) (FIG. 19D). Accordingly, these SLR14-treated mice displayed a long-term survival (FIG. 19E). Thus, SLR14 has a robust antitumor activity against poorly immunogenic tumor B16F10.

Figure 20A:
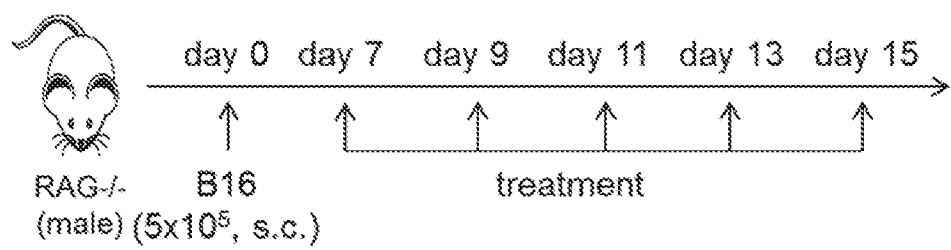
FIGS. 20A-20B illustrate the finding that antitumor effect of SLR14 in B16F10 melanoma is partially mediated by T cells.
Figure 20B:
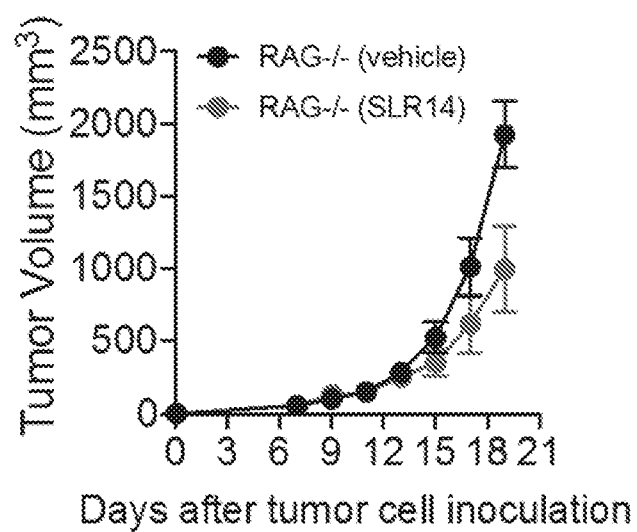

Antitumor Effect of SLR14 in B16F10 Melanoma Relies on Both T Cells and Non-T Cells:

SLR14 shows a more potent antitumor effect in poorly immunogenic B16F10 tumor. In certain non-limiting embodiments, SLR14's antitumor effect relied on cytotoxic T lymphocytes. To address this question, subcutaneous B16F10 tumors were first generated in RAG1−/− mice and the animals were treated i.t. with the same dose of SLR14 or vehicle as in the experiments with YUMMER1.7 (FIG. 20A). Compared to the vehicle-treated tumors, the SLR14-treated tumors showed a significant delay of tumor growth after 5-dose treatment even in RAGI$^{-/-}$ mice (FIG. 20B).

Figure 20C:
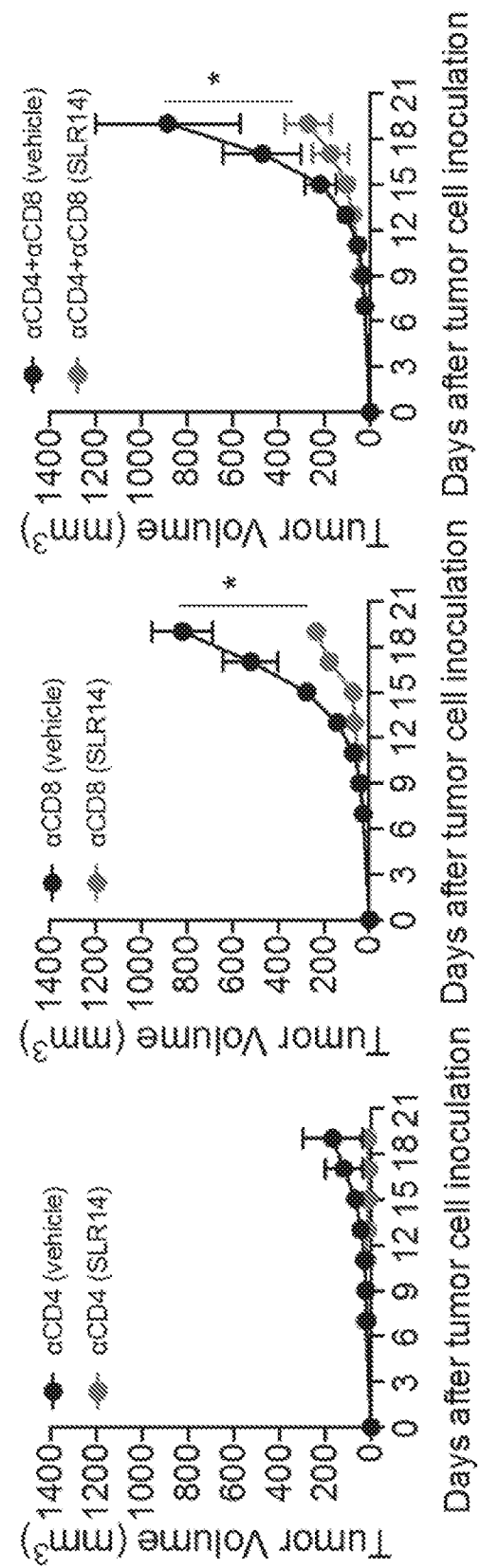
FIG. 20C: $5 \times 10^5$ B16F10 cells were injected s.c. into C57BL/6J mice as described in FIG. 20A. At 7 d.p.i., the mice with similar size of tumor were injected i.p. with T cell depletion antibodies (anti-CD4+, anti-CD8+, or both anti-CD4+ and anti-CD8+) at 200 µg/mouse, followed with i.t. injection of SLR14 or vehicle. In vivo T cell depletion was maintained every 3 days. Tumor growth was monitored. *: p<0.05.

This was different from what was observed in YUMMER1.7 model (FIG. 20C), suggesting that some non-T/B cells were involved in SLR14-induced antitumor response against B16F10. In parallel, subcutaneous B16F10 tumors weew established in naïve C57BL/6J mice. Starting from 7 days post injection, in vivo T cell depletion (CD4+, CD8+, or both CD4+ and CD8+) was performed, followed with i.t. injection of SLR14 or vehicle for a total of 5 doses. A significant growth delay in SLR14-treated mice with CD8+ T cell depletion was observed. The tumors in CD4+ T cell-depleted mice grew very poorly, with or without SLR14 treatment, likely reflecting Treg depletion leading to tumor control (FIG. 20C). Collectively, these results demonstrate that both T cells and non-T cells are involved in SLR14-induced antitumor response against B16F10.

Figure 21A:
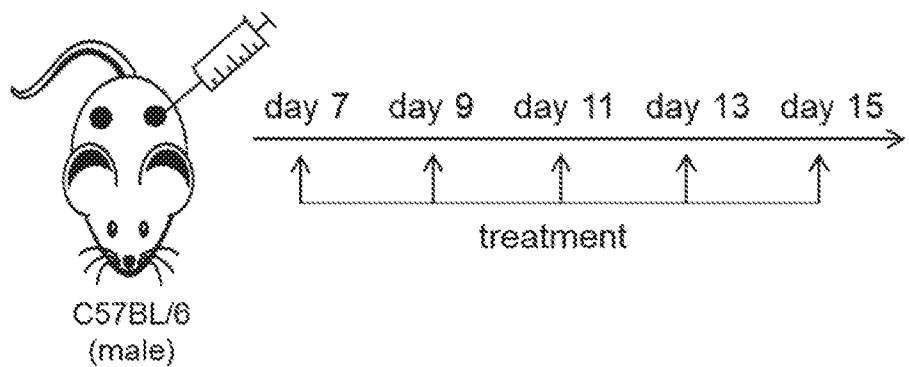
FIGS. 21A-21B illustrate the finding that intratumoral SLR14 delivery induces an effective abscopal effect on untreated distant tumor.
Figure 21B:
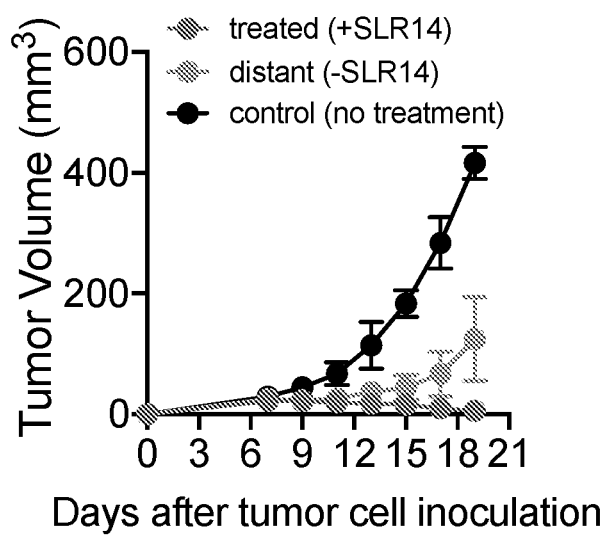

Intratumoral SLR14 Delivery Induces an Effective Abscopal Effect on Untreated Distant Tumors:

SLR14 can target many cells, including T and non-T cells, to induce robust antitumor responses against the SLR14-treated B16F10. In certain non-limiting embodiments, SLR14 can also induce a systemic antitumor immune response in B16F10-bearing mice. To investigate this possibility, bilateral subcutaneous B16F10 tumors were established in naïve C57BL/6J mice. At 7 days post tumor injection, the mice bearing two tumors with similar size were selected and only one of the tumors was treated i.t. with SLR14 (FIG. 21A). The treatment protocol here was exactly same as what we used in experiments described elsewhere herein. The growth of flank tumor received SLR14 treatment was dramatically inhibited, which is consistent with the results shown in FIGS. 19A-19E. The distant tumors that did not receive any SLR14 treatment were still bigger than those SLR-treated tumors. However, they showed an obvious growth delay when compared to un-treated controls (FIG. 21B). These results demonstrate that i.t. delivery of SLR14 can induce an effective abscopal effect on an untreated distant tumor.

Selected Comments:

The suppressive tumor microenvironment is an important barrier for the success of cancer immunotherapy. Due to the complex tumor microenvironment, tumor can be divided into two categories: immunogenic or non-immunogenic. Currently, immune checkpoint blockade (ICB) therapy has shown durable clinical benefit, but its efficacy is limited to a minority of cancer patients whose tumors are immunogenic and pre-infiltrated by T cells.

As demonstrated herein, after i.t. administration, the RIG agonists contemplated in the invention show potent antitumor activity both in immunogenic and in non-immunogenic tumors. In immunogenic tumor, the RIG agonists contemplated in the invention significantly increase the tumor-infiltrating CD8+ T cells and NK cells while also dramatically decreasing the suppressive CD4+FoxP3+ regulatory T cells. In certain embodiments, the RIG agonists contemplated in the invention profoundly change the proportions of cytotoxic lymphocytes over immunosuppressive cells in the tumor microenvironment, leading to a strong antitumor immune response. In addition, the combination therapy results indicate that the RIG agonists contemplated in the invention can serve as a powerful immune adjuvant to enhance the efficacy of other immunotherapies including ICB.

Surprisingly, in poorly immunogenic tumor the RIG agonists contemplated in the invention showed a remarkable antitumor efficacy: tumor growth inhibition and abscopal effect on untreated distant tumor, suggesting that RIG agonist i.t. treatment can change the local tumor microenvironment, convert non-immunogenic tumor into immunogenic tumor, and induce a systemic antitumor immunity. Both T cell-mediated ICD and non-T cell-mediated tumor cell death are elicited by RIG agonist monotherapy.

The RIG agonist is taken up by CD11b+ myeloid cells, and these myeloid cells are dominated by Ly6G+ tumor-associated neutrophils, although a few of them are tumor-associated DCs (including Ly6C+ inflammatory DC subset) and monocytes/macrophages. CD8+ T cell-mediated immune response is the major effector of antitumor efficacy of the RIG agonist. In addition, tumor cells also likely take up the RIG agonist as there are ~20% CD45-cells showing RIG agonist existence in their cytosol. Without wishing to be limited by any theory, this suggests that the RIG agonist may induce direct tumor cell apoptosis. The data from RAG1$^{-/-}$ mice indicate a small but significant T cell-independent antitumor activity elicited by the RIG agonist, presumably direct tumor cell death induced by the RIG agonist or induction of myeloid cell-dependent removal of the tumor.

The present results demonstrate that the synthetic RIG-I agonists contemplated in the invention induce a potent in vivo antitumor effect in immunogenic or poorly immunogenic cancers by activating the cytosolic RIG-I signaling pathway in different cell populations. These findings indicate that the synthetic RIG-I agonists are a promising therapeutic for a broad spectrum of cancer types.

ENUMERATED EMBODIMENTS

The following exemplary embodiments are provided, the numbering of which is not to be construed as designating levels of importance.

Embodiment 1 provides a method of treating or preventing a cancer in a subject, the method comprising administering to the subject a therapeutically effective amount of a RIG-I agonist.

Embodiment 2 provides the method of Embodiment 1, wherein the subject is further administered a therapeutically effective amount of an immune-checkpoint inhibitor, such as PD-1, PD-L1 or CTLA-4 blocking agents or antibodies.

Embodiment 3 provides the method of Embodiment 2, wherein the cancer is not significantly responsive to the immune-checkpoint inhibitor in the absence of the RIG-I inhibitor.

Embodiment 4 provides the method of any of Embodiments 2-3, wherein the immune-checkpoint inhibitor is a PD-1/PD-L1 blockade agent and/or a CTLA-4 blocking agent.

Embodiment 5 provides the method of Embodiment 4, wherein the PD-1/PD-L1 blockade agent and/or CTLA-4 blockade agent is a small molecule drug, a polypeptide, and/or an antibody or a biologically active fragment thereof.

Embodiment 6 provides the method of any of Embodiments 4-5, wherein the agent comprises at least one selected from the group consisting of durvalumab, atezolizumab, avelumab, nivolumab, AMP224 or GSK2661380, pidilizumab, pembrolizumab, BMS936559, RG7446, ipilimumab, and tremelimumab.

Embodiment 7 provides the method of any of Embodiments 1-6, wherein the RIG-I agonist is a polyribonucleic acid (RNA) molecule capable of inducing an interferon response in the subject.

Embodiment 8 provides the method of any of Embodiments 1-7, wherein the RNA molecule is (i) a double stranded duplex, or (ii) a single chain molecule comprising a first nucleotide sequence, which 5'-end is conjugated to one end of an element selected from a loop and a linker, wherein the other end of the element is conjugated to the 3'-end of a second nucleotide sequence, wherein the first nucleotide sequence is substantially complementary to the second nucleotide sequence, wherein the first nucleotide sequence and the second nucleotide sequence can hybridize to form a double-stranded section, whereby the RNA molecule forms a hairpin structure; wherein the number of base pairs in the double stranded section in (i) or (ii) is an integer ranging from 8 to 20.

Embodiment 9 provides the method of Embodiment 8, wherein the loop in (ii) comprises at least one nucleotide.

Embodiment 10 provides the method of any of Embodiments 8-9, wherein the linker in (ii) is free of a nucleoside, nucleotide, deoxynucleoside, or deoxynucleotide, or any surrogates or modifications thereof.

Embodiment 11 provides the method of any of Embodiments 8-10, wherein the linker in (ii) is free of a phosphate backbone, or any surrogates or modifications thereof.

Embodiment 12 provides the method of any of Embodiments 8-11, wherein the linker in (ii) comprises at least one selected from the group consisting of an ethylene glycol group, an amino acid, and an alkylene chain.

Embodiment 13 provides the method of any of Embodiments 8-12, wherein the linker comprises $(OCH_2CH_2)_n$, wherein n is an integer ranging from 1 to 10.

Embodiment 14 provides the method of any of Embodiments 8-13, wherein the hairpin in (ii) has a blunt end.

Embodiment 15 provides the method of any of Embodiments 8-14, wherein the molecule has a 3'-overhang.

Embodiment 16 provides the method of Embodiments 15, wherein the overhang comprises one, two, or three non-base pairing nucleotides.

Embodiment 17 provides the method of any of Embodiments 7-16, wherein the RNA molecule comprises a 5'-terminus group selected from the group consisting of a 5'-triphosphate and a 5'-diphosphate.

Embodiment 18 provides the method of any of Embodiments 7-17, wherein the RNA molecule comprises a modified phosphodiester backbone.

Embodiment 19 provides the method of any of Embodiments 7-18, wherein the RNA molecule comprises at least one 2'-modified nucleotide.

Embodiment 20 provides the method of Embodiment 19, wherein the at least one 2'-modified nucleotide comprises a modification selected from the group consisting of: 2'-deoxy, 2'-deoxy-2'-fluoro, 2'-O-methyl, 2'-O-methoxyethyl (2'-O-MOE), 2'-O-aminopropyl (2'-O-AP), 2'-O-dimethylaminoethyl (2'-O-DMAOE), 2'-O-dimethylaminopropyl (2'-O-DMAP), 2'-O-dimethylaminoethyloxyethyl (2'-O-DMAEOE), and 2'-O—N-methylacetamido (2'-O-NMA).

Embodiment 21 provides the method of any of Embodiments 7-20, wherein the RNA molecule comprises at least one modified phosphate group.

Embodiment 22 provides the method of any of Embodiments 7-21, wherein the RNA molecule comprises at least one modified base.

Embodiment 23 provides the method of any of Embodiments 7-22, wherein the double-stranded section comprises one or more mispaired bases.

Embodiment 24 provides the method of any of Embodiments 7-23, wherein the RNA molecule comprises at least one abasic nucleotide.

Embodiment 25 provides the method of any of Embodiments 1-24, wherein the cancer is immunogenic.

Embodiment 26 provides the method of any of Embodiments 1-24, wherein the cancer is not immunogenic.

Embodiment 27 provides the method of any of Embodiments 1-26, wherein the cancer is at least one selected from the group consisting of melanoma, breast cancer, prostate cancer, ovarian cancer, cervical cancer, skin cancer, pancreatic cancer, colorectal cancer, renal cancer, liver cancer, brain cancer, lymphoma, leukemia, and lung cancer.

Embodiment 28 provides the method of any of Embodiments 2-27, wherein the immune-checkpoint inhibitor and the RIG-I agonist are co-administered and/or administered at approximately the same time to the subject.

Embodiment 29 provides the method of any of Embodiments 1-28, wherein the RIG-I agonist is administered intratumorally to the subject.

Embodiment 30 provides the method of any of Embodiments 1-29, wherein the RIG-I agonist has abscopal effect in the subject.

Embodiment 31 provides a pharmaceutical composition comprising an immune-checkpoint inhibitor and a RIG-I agonist.

Embodiment 32 provides the pharmaceutical composition of Embodiment 31, wherein the RIG 1 RIG-I agonist is a RNA molecule capable of inducing an interferon response in a subject.

Embodiment 33 provides the pharmaceutical composition of any of Embodiments 31-32, wherein the RNA molecule is a single chain molecule and comprises a first nucleotide sequence, which 5'-end is conjugated to one end of an element selected from a loop and a linker, wherein the other end of the element is conjugated to the 3'-end of a second nucleotide sequence, wherein the first nucleotide sequence is substantially complementary to the second nucleotide sequence, wherein the first nucleotide sequence and the second nucleotide sequence can hybridize to form a double-stranded section, wherein the number of base pairs in the double stranded section is an integer ranging from 8 to 20, whereby the RNA molecule forms a hairpin structure.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of treating, or ameliorating a cancer in a subject, the method comprising administering to the subject a therapeutically effective amount of a retinoic acid-inducible gene I (RIG-I) agonist and a therapeutically effective amount of an immune-checkpoint inhibitor;
wherein the RIG-I agonist is a polyribonucleic acid (RNA) molecule capable of inducing an interferon response in the subject, wherein the RNA molecule is
(i) a double stranded duplex, or
(ii) a single chain molecule comprising a first nucleotide sequence, which 5'-end is conjugated to one end of an element selected from a loop and a linker, wherein the other end of the element is conjugated to the 3'-end of a second nucleotide sequence, wherein the first nucleotide sequence is substantially complementary to the second nucleotide sequence, wherein the first nucleotide sequence and the second nucleotide sequence can hybridize to form a double-stranded section, whereby the RNA molecule forms a hairpin structure,
wherein the number of base pairs in the double stranded section in (i) or (ii) is 8, 9, 10, 11, 12, 13, 14, 15, 16, 17, 18, 19, or 20, and
wherein the cancer is not immunogenic.

2. The method of claim 1, wherein the cancer is not significantly responsive to the immune-checkpoint inhibitor in the absence of the RIG-I inhibitor.

3. The method of claim 1, wherein the immune-checkpoint inhibitor is at least one selected from the group consisting of a programmed cell death protein 1 (PD-1)/programmed death-ligand 1 (PD-L1) blockade agent and a cytotoxic T-lymphocyte associated protein 4 (CTLA-4) blocking agent.

4. The method of claim 3, wherein the PD-1/PD-L1 blockade agent or CTLA-4 blockade agent is a small molecule drug, a polypeptide, or an antibody or a biologically active fragment thereof.

5. The method of claim 3, wherein the immune-checkpoint inhibitor comprises at least one selected from the group consisting of durvalumab, atezolizumab (RG7446), avelumab, nivolumab, AMP 224 (GSK2661380), pidilizumab, pembrolizumab, BMS936559, ipilimumab, and tremelimumab.

6. The method of claim 1, wherein at least one of the following applies:
the loop in (ii) comprises at least one nucleotide;
the linker in (ii) is free of a nucleoside, nucleotide, deoxynucleoside, or deoxynucleotide, or any surrogates or modifications thereof;
the linker in (ii) is free of a phosphate backbone, or any surrogates or modifications thereof;
the linker in (ii) comprises at least one selected from the group consisting of an ethylene glycol group, an amino acid, and an alkylene chain;
the linker in (ii) comprises $(OCH_2CH_2)_n$, wherein n is an integer ranging from 1 to 10;
the hairpin in (ii) has a blunt end;
the RNA molecule has a 3'-overhang;
the double-stranded section comprises one or more mispaired bases.

7. The method of claim 6, wherein the 3'-overhang comprises one, two, or three non-base pairing nucleotides.

8. The method of claim 1, wherein the RNA molecule comprises at least one of the following:
a 5'-terminus group selected from the group consisting of a 5'-triphosphate and a 5'-diphosphate;
a modified phosphodiester backbone;
at least one modified phosphate group;
at least one 2'-modified nucleotide;
at least one modified base;
at least one abasic nucleotide.

9. The method of claim 8, wherein the at least one 2'-modified nucleotide comprises a modification selected from the group consisting of: 2'-deoxy, 2'-deoxy-2'-fluoro, 2'-O-methyl, 2'-O-methoxyethyl (2'-O-MOE), 2'-O-aminopropyl (2'-O-AP), 2'-O-dimethylaminoethyl (2'-O-DMAOE), 2'-O-dimethylaminopropyl (2'-O-DMAP), 2'-O-dimethylaminoethyloxyethyl (2'-O-DMAEOE), and 2'-O—N-methylacetamido (2'-O-NMA).

10. The method of claim 1, wherein the cancer is at least one selected from the group consisting of melanoma, breast cancer, prostate cancer, ovarian cancer, cervical cancer, skin cancer, pancreatic cancer, colorectal cancer, renal cancer, liver cancer, brain cancer, lymphoma, leukemia, and lung cancer.

11. The method of claim 1, wherein the immune-checkpoint inhibitor and the RIG-I agonist are co-administered or administered at approximately the same time to the subject.

12. The method of claim 1, wherein the RIG-I agonist is administered intratumorally to the subject.

13. The method of claim 12, wherein the RIG-I agonist has abscopal effect in the subject.

\* \* \* \* \*

SEQUENCE LISTING

```
<160> NUMBER OF SEQ ID NOS: 17

<210> SEQ ID NO 1
<211> LENGTH: 32
<212> TYPE: RNA
<213> ORGANISM: Artificial Sequence
<220> FEATURE:
```

```
<223> OTHER INFORMATION: Chemically synthesized
<220> FEATURE:
<221> NAME/KEY: misc_feature
<222> LOCATION: (1)..(1)
<223> OTHER INFORMATION: 5-triphosphorylated

<400> SEQUENCE: 1
ggaucgaucg aucguucgcg aucgaucgau cc                                   32

<210> SEQ ID NO 2
<211> LENGTH: 20
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 2
ggcgcggcuu cggccgcgcc                                                 20

<210> SEQ ID NO 3
<211> LENGTH: 20
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 3
ggcgcggguu cgcccgcgcc                                                 20

<210> SEQ ID NO 4
<211> LENGTH: 22
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 4
ggcgccgggu ucgcccggcg cc                                              22

<210> SEQ ID NO 5
<211> LENGTH: 24
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5-triphosphorylated

<400> SEQUENCE: 5
ggacguacgu uucgacguac gucc                                            24

<210> SEQ ID NO 6
<211> LENGTH: 20
<212> TYPE: RNA
<213> ORGANISM: Artificial Sequence
```

```
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 6
ggcgacguuu cgacgucgcc                                                      20

<210> SEQ ID NO 7
<211> LENGTH: 22
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 7
ggcguacguu ucgacguacg cc                                                   22

<210> SEQ ID NO 8
<211> LENGTH: 32
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 8
ggaucgaucg aucggaaccg aucgaucgau cc                                        32

<210> SEQ ID NO 9
<211> LENGTH: 32
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 9
ggaucgaucg aucgcuugcg aucgaucgau cc                                        32

<210> SEQ ID NO 10
<211> LENGTH: 33
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 10
ggaucgaucg aucguuuuuc gaucgaucga ucc                                       33

<210> SEQ ID NO 11
<211> LENGTH: 35
<212> TYPE: RNA
```

<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 11
ggaucgaucg aucgacaaug ccgaucgauc gaucc    35

<210> SEQ ID NO 12
<211> LENGTH: 33
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated
<220> FEATURE:
<221> NAME/KEY: misc_feature
<222> LOCATION: (15)..(15)
<223> OTHER INFORMATION: abasic ribonucleotide
<220> FEATURE:
<221> NAME/KEY: misc_feature
<222> LOCATION: (16)..(16)
<223> OTHER INFORMATION: abasic ribonucleotide
<220> FEATURE:
<221> NAME/KEY: misc_feature
<222> LOCATION: (17)..(17)
<223> OTHER INFORMATION: abasic ribonucleotide
<220> FEATURE:
<221> NAME/KEY: misc_feature
<222> LOCATION: (18)..(18)
<223> OTHER INFORMATION: abasic ribonucleotide
<220> FEATURE:
<221> NAME/KEY: misc_feature
<222> LOCATION: (19)..(19)
<223> OTHER INFORMATION: abasic ribonucleotide

<400> SEQUENCE: 12
ggaucgaucg aucgnnnnnc gaucgaucga ucc    33

<210> SEQ ID NO 13
<211> LENGTH: 15
<212> TYPE: RNA
<213> ORGANISM: Artificial Sequence
<220> FEATURE:
<223> OTHER INFORMATION: Chemically synthesized
<220> FEATURE:
<221> NAME/KEY: misc_feature
<222> LOCATION: (1)..(1)
<223> OTHER INFORMATION: 5'-triphosphorylated

<400> SEQUENCE: 13
ggaucgaucg aucgu    15

<210> SEQ ID NO 14
<211> LENGTH: 15
<212> TYPE: RNA
<213> ORGANISM: Artificial Sequence
<220> FEATURE:
<223> OTHER INFORMATION: Chemically synthesized
<220> FEATURE:
<221> NAME/KEY: misc
<222> LOCATION: (1)..(1)
<223> OTHER INFORMATION: 5'-triphosphorylated

<400> SEQUENCE: 14
gcgaucgauc gaucc    15

```
<210> SEQ ID NO 15
<211> LENGTH: 12
<212> TYPE: RNA
<213> ORGANISM: Artificial Sequence
<220> FEATURE:
<223> OTHER INFORMATION: Chmeically synthesized

<400> SEQUENCE: 15
gcccagacca cc                                                           12

<210> SEQ ID NO 16
<211> LENGTH: 17
<212> TYPE: RNA
<213> ORGANISM: Artificial Sequence
<220> FEATURE:
<223> OTHER INFORMATION: Chemically synthesized

<400> SEQUENCE: 16
aaaaaggugg ucugggc                                                      17

<210> SEQ ID NO 17
<211> LENGTH: 24
<212> TYPE: RNA
<213> ORGANISM: Artificial Sequence
<220> FEATURE:
<223> OTHER INFORMATION: Chemically synthesized

<400> SEQUENCE: 17
ggacguacgu uucgacguac gugg                                              24
```